(12) United States Patent
Zhou et al.

(10) Patent No.: US 11,513,205 B2
(45) Date of Patent: Nov. 29, 2022

(54) SYSTEM AND METHOD ASSOCIATED WITH USER AUTHENTICATION BASED ON AN ACOUSTIC-BASED ECHO-SIGNATURE

(71) Applicant: The Research Foundation for the State University of New York, Albany, NY (US)

(72) Inventors: Bing Zhou, Centereach, NY (US); Fan Ye, East Setauket, NY (US)

(73) Assignee: THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 217 days.

(21) Appl. No.: 16/754,416

(22) PCT Filed: Oct. 29, 2018

(86) PCT No.: PCT/US2018/057951
§ 371 (c)(1),
(2) Date: Apr. 8, 2020

(87) PCT Pub. No.: WO2019/089432
PCT Pub. Date: May 9, 2019

(65) Prior Publication Data
US 2020/0309930 A1   Oct. 1, 2020

Related U.S. Application Data

(60) Provisional application No. 62/734,557, filed on Sep. 21, 2018, provisional application No. 62/680,035,
(Continued)

(51) Int. Cl.
*G01S 7/539*   (2006.01)
*G06K 9/62*   (2022.01)
(Continued)

(52) U.S. Cl.
CPC ............ *G01S 7/539* (2013.01); *G06K 9/6256* (2013.01); *G06N 3/0454* (2013.01); *G06V 40/171* (2022.01); *G06V 40/172* (2022.01)

(58) Field of Classification Search
None
See application file for complete search history.

(56) References Cited

U.S. PATENT DOCUMENTS 5,291,560 A   3/1994 Daugman
6,745,156 B2   6/2004 Cook
(Continued)

FOREIGN PATENT DOCUMENTS

CN   105550636 A   5/2016
CN   110610719 A   12/2019
(Continued)

OTHER PUBLICATIONS

Taigman, Y., et al., "Deepface: Closing the Gap to Human-Level Performance in Face Verification", In Proceedings of the IEEE Conference on Computer Vision and Pattern Recognition, pp. 1701-1708, 2014.
(Continued)

*Primary Examiner* — Leon Flores
(74) *Attorney, Agent, or Firm* — Hoffmann & Baron, LLP

(57) ABSTRACT

A system associated with predicting authentication of a device user based on a joint features representation related to an echo-signature associated with a device is disclosed. The system performs operations that include emitting acoustic signals in response to a request for processing of a profile associated with the device. The system receives a set of echo acoustic signals that are tailored based on reflection of the acoustic signals from unique contours of one or more depth portions associated with the user relative to a discrete epoch. One or one or more region segments associated with the
(Continued)

echo acoustic signals are extracted in order to train a classification model. A classification model is generated based on the one or more region segments as extracted. A joint features representation based on the classification model is generated. A vector-based classification model is used in the prediction of the joint features representation. The system determines whether the joint features representation is associated with the echo-signature based on the prediction of the joint features representation.

A corresponding method and computer-readable device are also disclosed.

23 Claims, 29 Drawing Sheets

Related U.S. Application Data filed on Jun. 4, 2018, provisional application No. 62/578,724, filed on Oct. 30, 2017.

(51) Int. Cl.
*G06N 3/04* (2006.01)
*G06V 40/16* (2022.01)

(56) References Cited

U.S. PATENT DOCUMENTS

| | | | |
|---|---|---|---|
| 8,428,945 | B2 | 4/2013 | Zakarauskas |
| 9,008,329 | B1 | 4/2015 | Mandel et al. |
| 9,173,025 | B2 | 10/2015 | Dickins et al. |
| 9,343,073 | B1 | 5/2016 | Murgia et al. |
| 9,558,762 | B1 | 1/2017 | Sieracki |
| 9,972,339 | B1 | 5/2018 | Sundaram |
| 10,309,936 | B2 | 6/2019 | Zalev et al. |
| 10,803,881 | B1 | 10/2020 | Fazeli et al. |
| 10,964,315 | B1 | 3/2021 | Wu et al. |
| 11,004,461 | B2 | 5/2021 | Howard |
| 11,295,119 | B2 | 4/2022 | Andreou et al. |
| 2004/0081020 | A1 | 4/2004 | Blosser et al. |
| 2005/0149296 | A1 | 7/2005 | Sieracki |
| 2007/0253604 | A1 | 11/2007 | Inoue et al. |
| 2016/0371555 | A1 | 12/2016 | Derakhshani et al. |
| 2017/0061969 | A1 | 3/2017 | Thornburg et al. |
| 2018/0373357 | A1 | 12/2018 | Wu et al. |
| 2020/0118458 | A1 | 4/2020 | Shriberg et al. |
| 2020/0265215 | A1 | 8/2020 | Wang et al. |
| 2020/0364854 | A1 | 11/2020 | Fedewa et al. |
| 2021/0207974 | A1 | 7/2021 | Zhou et al. |
| 2021/0327431 | A1 | 10/2021 | Stewart et al. |
| 2022/0007965 | A1 | 1/2022 | Tiron et al. |
| 2022/0044671 | A1 | 2/2022 | Kapoor et al. |

FOREIGN PATENT DOCUMENTS

| | | |
|---|---|---|
| CN | 114175144 A | 3/2022 |
| EP | 3401908 A1 | 11/2018 |
| EP | 3811245 A1 | 4/2021 |
| EP | 3978949 A2 | 4/2022 |
| EP | 4003156 A1 | 6/2022 |
| EP | 4004906 A1 | 6/2022 |
| WO | 2012109384 A1 | 8/2012 |
| WO | 2013064571 A1 | 5/2013 |
| WO | 2019210292 A1 | 10/2019 |
| WO | 2019236588 A1 | 12/2019 |
| WO | 2021021683 A1 | 2/2021 |
| WO | 2021041144 A1 | 3/2021 |
| WO | 2021054901 A1 | 3/2021 |
| WO | 2021234037 A1 | 11/2021 |

OTHER PUBLICATIONS

Valstar, M., et al., "Facial Point Detection Using Boosted Regression and Graph Models", In 2010 IEEE Computer Society Conference on Computer Vision and Pattern Recognition, pp. 2729-2736, Jun. 2010.

Wagner, A., et al., "Toward a Practical Face Recognition System: Robust Alignment and Illumination by Sparse Representation," IEEE Transactions on Pattern Analysis and Machine Intelligence, 34(2), pp. 372-386, 2012.

Sun, Y., et al., "Deepid3: Face Recognition With Very Deep Neural Networks", arXiv preprint arXiv:1502.00873, 2015.

Turk, M., et al., "Face Recognition Using Eigenfaces", In 1991 Proceedings IEEE Computer Society Conference on Computer Vision and Pattern Recognition, pp. 586-587, Jan. 1991.

Wright, J., et al., "Robust Face Recognition Via Sparse Representation", IEEE Transactions on Pattern Analysis and Machine Intelligence, 31(2), pp. 210-227, 2009.

Lewis, J., "Fast Normalized Cross-Correlation", In Vision Interface, vol. 10, pp. 120-123, 1995.

Platt, J. "Probabilistic Outputs for Support Vector Machines and Comparisons to Regularized Likelihood Methods", Advances in Large Margin Classifiers, 10(3), pp. 61-74, 1999.

Tari, F., et al., "A Comparison of Perceived and Real Shoulder-Surfing Risks Between Alphanumeric and Graphical Passwords", In Proceedings of the Second Symposium on Usable Privacy and Security, pp. 56-66, Jul. 2006.

Duc, N. M., et al., "Your Face is Not Your Password Face Authentication Bypassing Lenovo—Asus—Toshiba", Black Hat Briefings, 4, p. 158, 2009.

Usakli, A. B., et al., "Fast Face Recognition: Eye Blink as a Reliable Behavioral Response", Neuroscience Letters, 504(1), pp. 49-52, 2011.

Stein, C., et al., "Fingerphoto Recognition with Smartphone Cameras", In 2012 BIOSIG—Proceedings of the International Conference of Biometrics Special Interest Group, pp. 1-12, IEEE, Sep. 2012.

Kunze, K., et al., "Symbolic Object Localization Through Active Sampling of Acceleration and Sound Signatures", In International Conference on Ubiquitous Computing, pp. 163-180, Springer, Berlin, Heidelberg Sep. 2007.

Zhou, B., et al., "BatMapper: Acoustic Sensing Based Indoor Floor Plan Construction Using Smartphones", In Proceedings of the 15th Annual International Conference on Mobile Systems, Applications, and Services, pp. 42-55, Jun. 2017.

Birant, D., et al., "ST-DBSCAN: An Algorithm for Clustering Spatial-Temporal Data", Data & Knowledge Engineering, 60(1) pp. 208-221, 2007.

Derpanis, K. G., "Overview of the RANSAC Algorithm", Image Rochester NY, 4(1), pp. 2-3, 2010.

Logan, B., "Mel Frequency Cepstral Coefficients for Music Modeling", In Ismir, vol. 270, pp. 1-11, Oct. 2000.

Muller, M., et al., "Audio Matching Via Chroma-Based Statistical Features", In ISMIR, vol. 2005, p. 6th, Sep. 2005.

Jiang, D., et al., "Music Type Classification by Spectral Contrast Feature", In Proceedings. IEEE International Conference on Multimedia and Expo, vol. 1, pp. 113-116, IEEE, Aug. 2002.

He, K., et al., "Deep Residual Learning for Image Recognition", In Proceedings of the IEEE Conference on Computer Vision and Pattern Recognition, pp. 770-778, 2016.

Simonyan, K., et al., "Very Deep Convolutional Networks for Large-Scale Image Recognition", 2014 arXiv preprint arXiv:1409.1556.

Abadi, M., et al., "Tensorflow: A System for Large-Scale Machine Learning", In 12th {USENIX} Symposium on Operating Systems Design and Implementation, OSDI vol. 16, pp. 265-283, 2016.

Chang, C. C., et al., "LIBSVM: A Library for Support Vector Machines", ACM Transactions on Intelligent Systems and Technology, (TIST), 2(3), pp. 1-27, 2011.

Ping, W., et al., "Deep Voice 3: Scaling Text-to-Speech with Convolutional Sequence Learning Representations", arXiv preprint 2017 arXiv:1710.07654, 2018.

Chauhan, J., et al., "BreathPrint: Breathing Acoustics-Based User Authentication", In Proceedings of the 15th Annual International Conference on Mobile Systems, Applications, and Services, pp. 278-291, Jun. 2017.

Keselman, L., et al., "Intel Realsense Stereoscopic Depth Cameras", In Proceedings of the IEEE Conference on Computer Vision and Pattern Recognition Workshops, pp. 1-10, 2017.

(56) References Cited

OTHER PUBLICATIONS

Peng, C., et al., "Beepbeep: A High Accuracy Acoustic Ranging System Using Cots Mobile Devices", In Proceedings of the 5th International Conference on Embedded Networked Sensor Systems, ACM SenSys., pp. 1-14, Nov. 2007.
Zhang, Z., et al., "Swordfight: Enabling a New Class of Phone-to-Phone Action Games on Commodity Phones", In Proceedings of the 10th International Conference on Mobile Systems, Applications and Services, ACM, pp. 1-14, Jun. 2012.
Liu, J., et al., "Snooping Keystrokes With MM-Level Audio Ranging on a Single Phone", In Proceedings of the 21st Annual International Conference on Mobile Computing and Networking, ACM, pp. 142-154, Sep. 2015.
Yang, J., et al., "Detecting Driver Phone Use Leveraging Car Speakers," In Proceedings of the 17th Annual International Conference on Mobile Computing and Networking, ACM MobiCom, pp. 97-108, Sep. 2011.
Tung, Y. C., et al., "Echotag: Accurate Infrastructure-Free Indoor Location Tagging With Smartphones", In Proceedings of the 21st Annual International Conference on Mobile Computing and Networking, pp. 525-536, Sep. 2015.
Liu, H., et al., "Push the Limit of WiFi Based Localization for Smartphones", In Proceedings of the 18th Annual International Conference on Mobile Computing and Networking, ACM MobiCom, pp. 305-316, Aug. 2012.
Liu, K., et al., "Guoguo: Enabling Fine-Grained Indoor Localization Via Smartphone", In Proceeding of the 11th Annual International Conference on Mobile Systems, Applications, and Services, ACM, pp. 235-248, Jun. 2013.
Wang, J., et al., "Ubiquitous Keyboard for Small Mobile Devices: Harnessing Multipath Fading for Fine-Grained Keystroke Localization", In Proceedings of the 12th Annual International Conference on Mobile Systems, Applications, and Services, pp. 14-27, Jun. 2014.
Yun, S., et al., "Turning a Mobile Device Into a Mouse in the Air", In Proceedings of the 13th Annual International Conference on Mobile Systems, Applications, and Service, pp. 15-29, May 2015.
Nandakumar, R., et al., "Fingerio: Using Active Sonar for Fine-Grained Finger Tracking", In Proceedings of the 2016 CHI Conference on Human Factors in Computing Systems, pp. 1515-1525, May 2016.
Wang, W., et al., "Device-Free Gesture Tracking Using Acoustic Signals", In Proceedings of the 22nd Annual International Conference on Mobile Computing and Networking, pp. 82-94, Oct. 2016.
Lu, H., et al., "Stresssense: Detecting Stress in Unconstrained Acoustic Environments Using Smartphones", In Proceedings of the 2012 ACM Conference on Ubiquitous Computing, pp. 351-360 Sep. 2012.
Nandakumar, R., et al., "Contactless Sleep Apnea Detection on Smartphones", In Proceedings of the 13th Annual International Conference on Mobile Systems, Applications and Services, pp. 45-57, May 2015.
Mao, W., et al., "CAT: High-Precision Acoustic Motion Tracking", In Proceedings of the 22nd Annual International Conference on Mobile Computing and Networking, pp. 69-81, Oct. 2016.
Zhang, H., et al., "DopEnc: Acoustic-Based Encounter Profiling Using Smartphones", In Proceedings of the 22nd Annual International Conference on Mobile Computing and Networking, pp. 294-307, Oct. 2016.
Google. Android Pay, https://www.android.com/pay/.
Apple, Apple Pay. https://www.apple.com/apple-pay/.
How to Fool a Fingerprint Security System as Easy as ABC, http://www.instructables.com/id/how-to-fool-a-fingerprint-security-system-as-easy-/.
About Face ID Advanced Technology, https://support.apple.com/en-us/ht208108.
Iphone X: This is How Much it Costs to Make One, In Components, http://www.zdnet.com/article/iphone-x-this-is-how-much-it-costs-to-make-in-components/.
Galaxy S8 Face Recognition Already Defeated with a Simple Picture, https://arstechnica.com/gadgets/2017/03/video-shows-galaxy-s8-face-recognition-can-be-defeated-with-a-picture/.
Google. Introduction to Mobile Vision, https://developers.google.com/vision/introduction.
Reisinger, Don "Does Apple iPhone X Face ID Have a Sunlight Problem?" Fortune.com, Oct. 31, 2017, https://finance.yahoo.com/news/does-apple-iphone-x-face-155907355.html.
Tycoyoken_"How to Fool a Fingerprint Security System As Easy As ABC," Instructables.com, Dec. 3, 2007. https://www.instructables.com/id/How-To-Fool-a-Fingerprint-Security-System-As-Easy-/.
Abreu, JM Martin, et al., "Ultrasonic Echoes from Complex Surfaces: an Application to Object Recognition," Sensors and Actuators A: Physical 31, No. 1-3, pp. 182-187 (1992).
Amos, Brandon, et al., "Openface: A General-Purpose Face Recognition Library with Mobile Applications," CMU School of Computer Science 6, No. 2 (2016).
Baltrusaitis, Tadas, et al., "Openface: An Open Source Facial Behavior Analysis Toolkit", In 2016 IEEE Winter Conference, in Applications of Computer Vision (WACV), pp. 1-10. IEEE, (2016).
Dror, Itiel E., et al., "Using Artificial Bat Sonar Neural Networks for Complex Pattern Recognition: Recognizing Faces and the Speed of a Moving Target", Biological Cybernetics 74, No. 4, pp. 331-338 (1996).
Kalgaonkar, Kaustubh, et al., "Recognizing Talking Faces from Acoustic Doppler Reflections," In 2008 8th IEEE International Conference on Automatic Face & Gesture Recognition, pp. 1-6 IEEE, (2008).
McKerrow, Phillip, et al., "Classifying Still Faces with Ultrasonic Sensing," Robotics and Autonomous Systems 55, No. 9, pp. 702-710, (2007).
McKerrow, Phillip J., et al., "Face Classification with Ultrasonic Sensing," (2006).
Wang, Xuyu, et al., "SonarBeat: Sonar Phase for Breathing Beat Monitoring with Smartphones," In 2017 26th International Conference on Computer Communication and Networks (ICCCN), pp. 1-8. IEEE, (2017).
Zhou, Bing, et al., "BatTracker: High Precision Infrastructure-Free Mobile Device Tracking in Indoor Environments." In Proceedings of the 15th ACM Conference on Embedded Network Sensor Systems, pp. 1-14, (2017).
Zhou, Bing, et al., "Acoustic Sensing Based Indoor Floor Plan Construction Using Smartphones," In Proceedings of the 23rd Annual International Conference on Mobile Computing and Networking, pp. 519-521 (2017).
International Search Report and Written Opinion dated Jan. 17, 2019 issued in International Application No. PCT/US2018/057951.
Wang, Y., et al., "Facial Feature Detection and Face Recognition from 2D and 3D Images," Pattern Recognition Letters, 23(10), 1191-1202 (2002).
Abreu, J. M., et al., "Ultrasonic Echoes from Complex Surfaces: an Application to Object Recognition," Sensors and Actuators A: Physical, 31(1-3), 182-187 (1992).
Ifeachor, E. C., et al., "Digital Signal Processing: a Practical Approach," Pearson Education (2002) . . . .
Weber, M., et al., "On the Finite Difference Analogue of Rodrigues' Formula," The American Mathematical Monthly, 59(3), 163-168 (1952).
Chollett, Francois, et al. "Keras". urlhttps://github.com/keras-team/keras, 2015.
Qualcomm, "Fingerprint Sensors," https://www.qualcomm.com/solutions/mobile-computing/features/security/fingerprint-sensors.
Stove, et al., "Linear Fmcw Radar Techniques". in IEEE Proceedings F-Radar and Signal Processing, vol. 139, 343-350, IET, 1992.

FIG. 6A

| Layer | Layer Type | Output Shape | # Param |
|---|---|---|---|
| 1 | Conv2D + ReLU | (33,61,32) | 320 |
| 2 | Conv2D + ReLU | (31,59,32) | 9248 |
| 3 | Max Pooling | (15,29,32) | |
| 4 | Dropout | (15,29,32) | |
| 5 | Batch Normalization | (15,29,32) | 128 |
| 6 | Conv2D + ReLU | (15,29,64) | 18496 |
| 7 | Conv2D + ReLU | (13,27,64) | 36928 |
| 8 | Max Pooling | (6,13,64) | |
| 9 | Dropout | (6,13,64) | |
| 10 | Batch Normalization | (6,13,64) | 256 |
| 11 | Flatten | (4992) | |
| 12 | Dense + ReLU | (128) | 639104 |
| 13 | Batch Normalization | (128) | 512 |
| 14 | Dense + Softmax | (50) | 5547 |

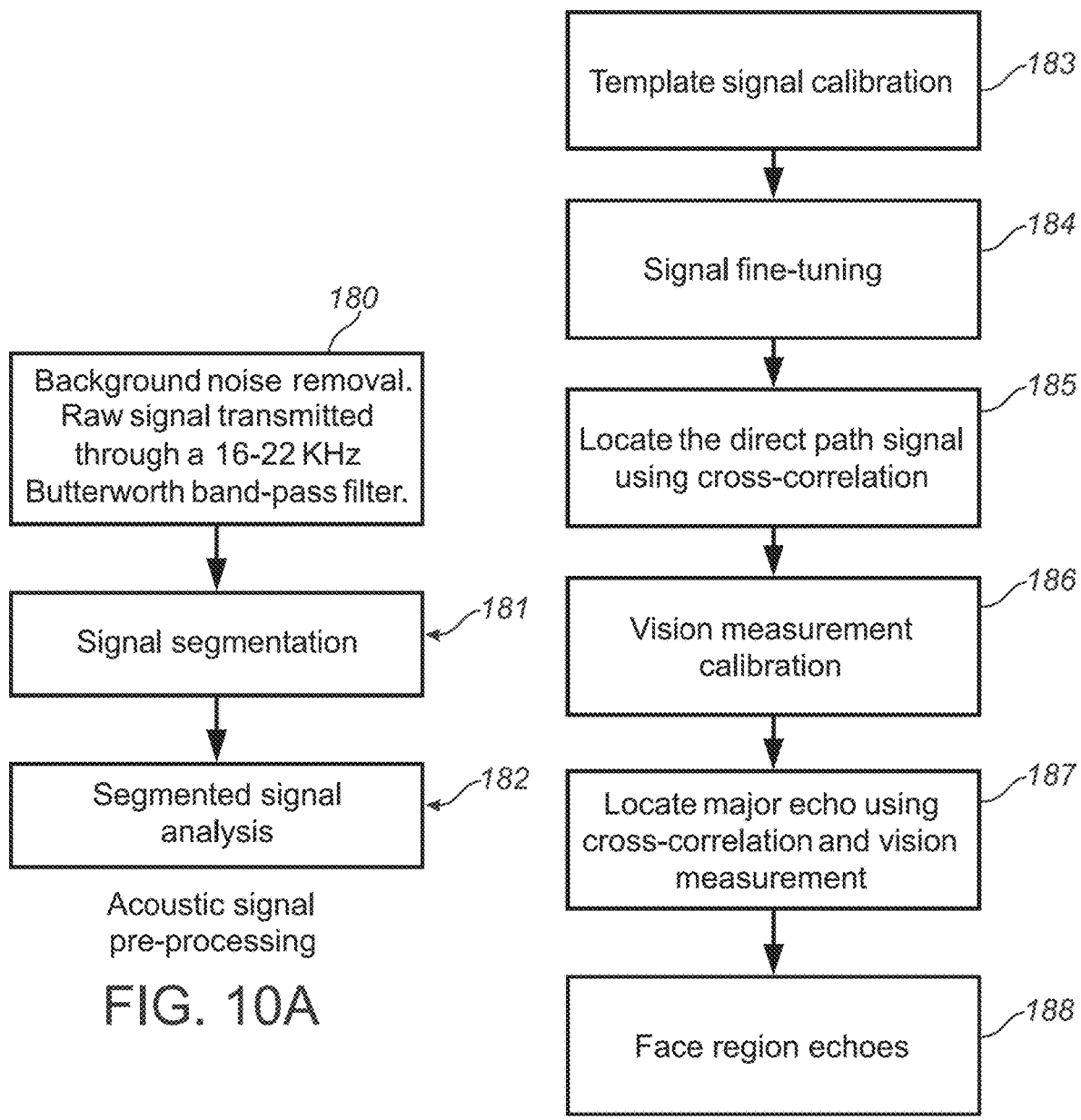

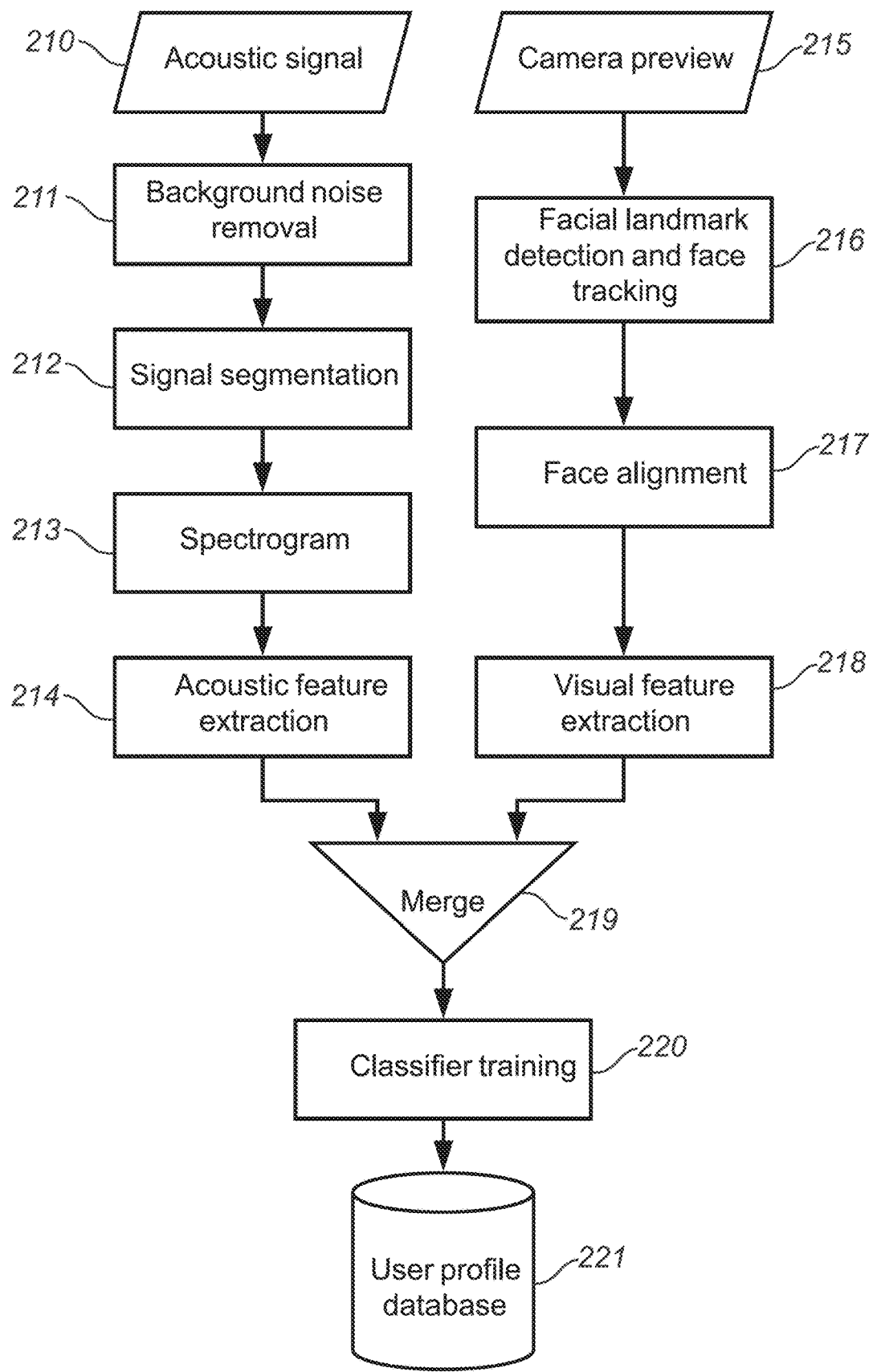
User registration.  FIG. 12

Acoustic feature extraction.

Face alignment.

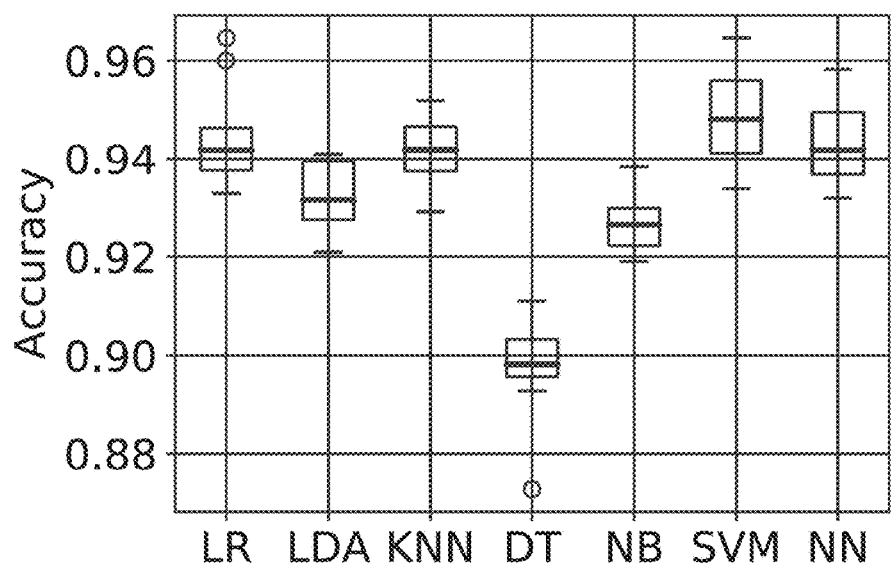
FIG. 15A
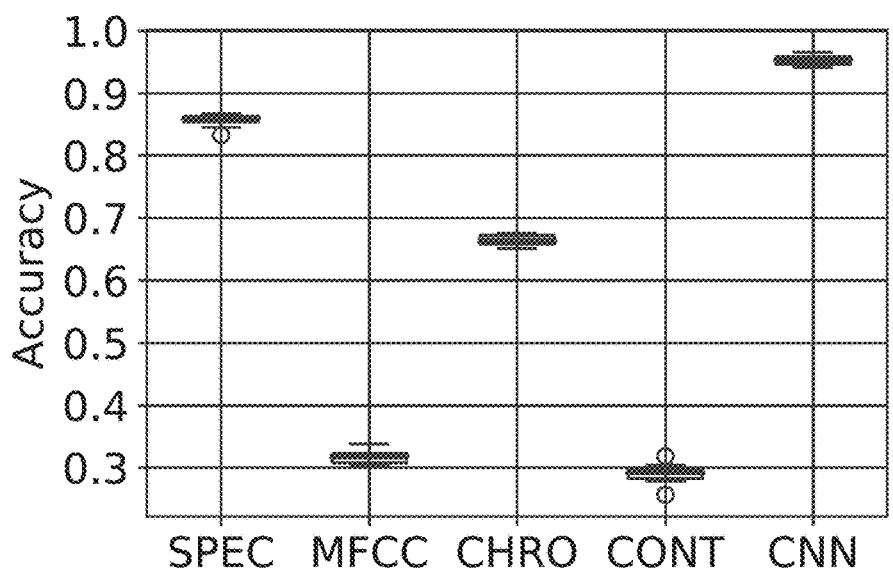
FIG. 15B
FIG. 15C
|  | Vision | Acoustic | Joint |
|---|---|---|---|
| Precision (%) | 72.53 / 80.32 | 86.06 / 99.41 | 88.19 / 99.75 |
| Recall (%) | 64.05 / 64.04 | 89.82 / 89.84 | 84.08 / 90.10 |
| F-score (%) | 65.17 / 69.19 | 85.39 / 94.31 | 83.74 / 93.23 |
| BAC (%) | 81.78 / 81.83 | 94.79 / 94.88 | 91.92 / 95.04 |

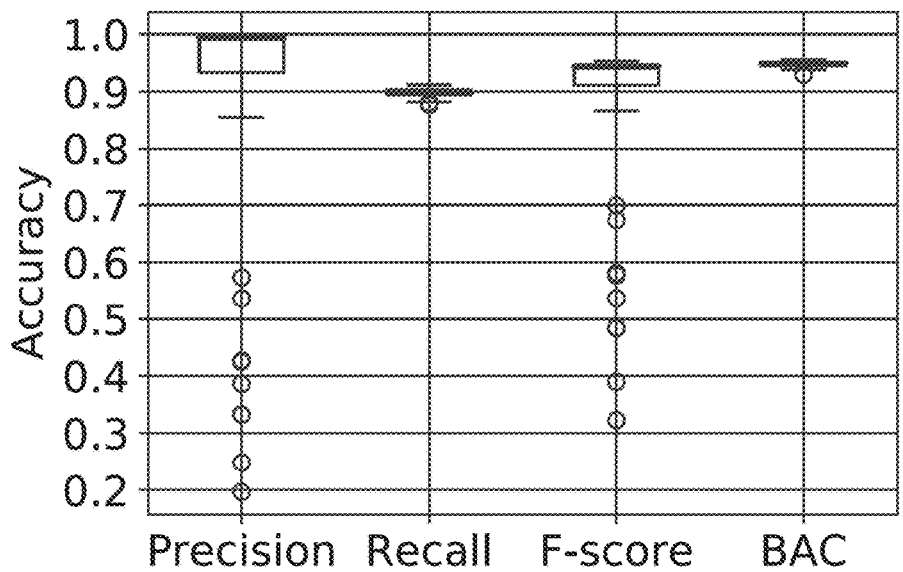
FIG. 16A
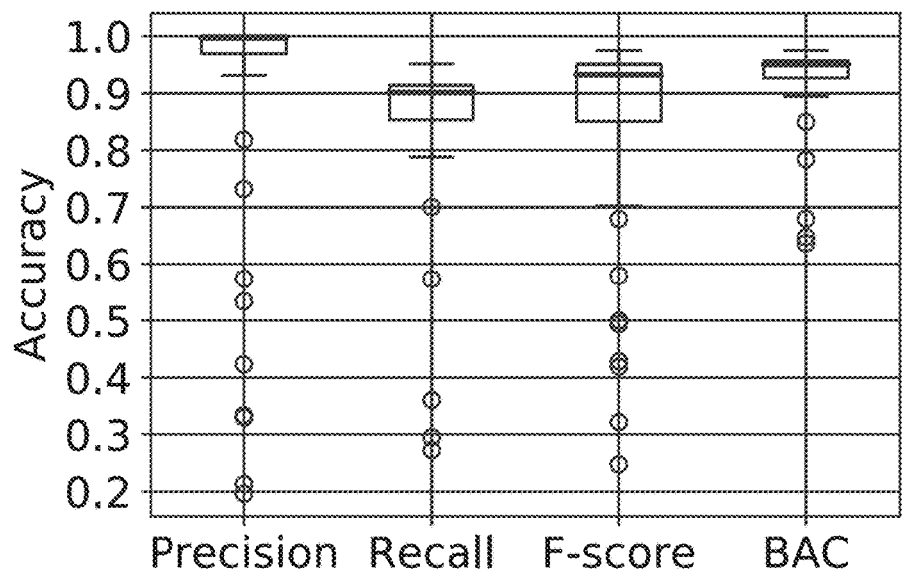
FIG. 16B
FIG. 16C
|  | Mean | Median | Standard Deviation |
|---|---|---|---|
| Precision (%) | 98.05 | 99.21 | 2.78 |
| Recall (%) | 89.36 | 89.91 | 1.62 |
| F-score (%) | 93.50 | 94.33 | 1.68 |
| BAC (%) | 93.75 | 94.52 | 0.85 |

| Device | Memory (*MB*) | CPU (*ms*) | Delay (*ms*) |
|---|---|---|---|
| *S7* | 22.0 / 50.0 | 6.42 / 31.59 | 44.87 / 91 |
| *S8* | 20.0 / 45.0 | 5.14 / 29.04 | 15.33 / 35 |
| *P9* | 24.0 / 53.0 | 7.18 / 23.87 | 32.68 / 86 |

| Device | ULP (*mW*) | LP (*mW*) | Two-factor (*mW*) | Vision (*mW*) |
|---|---|---|---|---|
| *S7* | 305 | 1560 | 2485 | 1815 |
| *S8* | 215 | 1500 | 2255 | 1655 |
| *P9* | 265 | 1510 | 2375 | 1725 |

SYSTEM AND METHOD ASSOCIATED WITH USER AUTHENTICATION BASED ON AN ACOUSTIC-BASED ECHO-SIGNATURE

CROSS-REFERENCE TO RELATED APPLICATIONS

The present application is the U.S. National Phase of International Patent Application No. PCT/US2018/57951, filed on Oct. 29, 2018, which claims the benefit of U.S. Provisional Application No. 62/578,724, filed on Oct. 30, 2017, U.S. Provisional Application No. 62/680,035, filed on Jun. 4, 2018, and U.S. Provisional Application No. 62/734,557, filed on Sep. 21, 2018, the specifications of which are each incorporated by reference herein in their entirety for all purposes.

STATEMENT OF GOVERNMENT LICENSE RIGHTS

This invention was made with government support under contract number NSF 1730291 awarded by the National Science Foundation. The government has certain rights in the invention.

FIELD OF THE DISCLOSURE

The present disclosure relates to a system and method associated with generating an acoustics-based echo-signature, a unique echo-based print associated with an original user of a device that is implemented during prediction for authentication of the current user of a device. Even more particularly, the present invention relates to a novel system and method that trains and augments a classification model in order to predict the respective authentication of a joint features representation including acoustic features and visual landmark features of the user relative to an epoch during authentication of a current user profile of the device.

BACKGROUND

Historically, user authentication on smartphones is pivotal to many important daily applications, such as social networks, shopping, banking and other modern-based activities. Central to the user authentication is the balancing between desired security and convenience. A solution must be secure yet easy to implement. A series of efforts have been undertaken to address this problem.

The most basic and traditional method, using a PIN number, has both usability (e.g., the pass code forgotten by the user) and security (e.g., shoulder-surfing attacks) issues. Face based authentication can be easily spoofed by images or videos of the user. For example, any simple twists such as requiring eye blinks are vulnerable to video attacks. Iris scan is probably the most secure method; however, it requires special sensors currently unavailable on most commercially available mobile devices.

Fingerprint sensors, while convenient for authentication, are facing the practical challenge posed by the trend of ever-increasing screen size, which leaves little space for fingerprint sensors. Another example, Apple's FaceID®, packs a dot projector, a flood illuminator and an infrared depth sensor in a small area in order to sense the 3D shape of the face, thus generally achieving effective security while saving space. However, the special sensors still use precious frontal space and costs extra (~5% of its bill of materials) on an already expensive device for consumers.

Hence, efficient and effective user authentication on smartphones or other mobile devices should satisfy both security and convenience to the user, which remains an inherently difficult balancing art. As mentioned, Apple's Face ID® is the latest of such efforts, but comes at the cost of additional hardware requiring dot projector, flood illuminator and infrared camera.

In particular, the history of smartphone authentication includes using traditional Personal Identification Number (PIN) or a text/graphical password that is the earliest and still most widely used for smartphone user authentication. Despite the simplicity, the PIN or password can be easily peeked by someone close by the user device. Speech recognition is easy to spoof when the voice is recorded, or the voice is otherwise closely imitated by advanced learning algorithms. BreathPrint® senses the user's breath sound, which may change significantly when the user has intense exercises. Vision based face recognition is vulnerable to camouflaged images. Although eye blinks can enhance its security, a recorded video can still spoof the system. Fingerprint sensors have achieved great security and convenience. However, the sensor takes a lot of precious space, and forging one from fingerprints from the user has proven to be a practical solution. More advanced fingerprint sensors use ultrasonics to penetrate the skin and construct 3D imaging, but such sensors are generally not available on most smartphones, and would increase costs. Apple's FaceID® uses special TrueDepth sensors, bringing extra hardware costs and requiring significant design changes. Intel's RealSense® is a similar technology, but it is costly and power-computation heavy, unsuitable for mobile devices.

Hence, there is a need for an acoustics echo-signature based authentication system that leverages active and novel acoustic sensing of unique facial depth of a user combined with visual features for user authentication, which can achieve high balanced accuracy using existing hardware.

In order to achieve resilient, secure and easy-to-use authentication using acoustic signals and visual aspects, the following remain challenges: 1) echo signals are highly sensitive to the relative position between the user's face and the device (i.e., pose), which makes it more difficult to extract reliable pose-insensitive features for robust authentication; 2) smartphones usually include multiple speakers and microphones. The determination of which are most suitable, and what are the best sound signals to implement remain critical to authentication performance; and 3) sophisticated signal processing, feature extraction and machine-learning techniques are required for expedient user registration and real-time authentication.

Therefore, it is desirable to implement a user authentication system embedded in the smartphone or mobile device without requiring any additional hardware such as sensors.

It is further desirable to implement an acoustic based echo-signature authentication system and related method that emits nearly inaudible sound signals from the earpiece speaker of the user's smartphone device in order to "illuminate" the user's face. The extracted acoustic features from the echoes are combined with visual facial landmarks detected from the frontal camera and used to authenticate the user, without requiring any additional hardware components are added to existing smartphone devices.

Since the echo-signature acoustics features depend on unique 3D facial geometries of a user, the echo signature system cannot be easily spoofed by images or videos as 2D visual face recognition systems. Such systems can be implemented with only commodity hardware, thus avoiding the extra costs of special sensors in solutions implemented by for example, Apple® Face ID®. Experiments with both humans and non-human objects such as images, photos, and sculptures indicate that echo-signature performs with 93.75% balanced accuracy and 93.50% F-score, while the average precision is 98.05%, and no image/video based attack was observed to succeed in any spoofing.

It is further desirable to implement a novel user authentication system that creates an echo signature by leveraging an existing earpiece speaker and frontal camera, which can be readily deployed on most phones. Costly special sensors (e.g., depth or iris) are not required that also require more hardware space to embed such components in the devices. The echo-signature authentication system combines acoustic features from a customized CNN feature extractor and facial landmark features from vision algorithms as the joint feature description of the user.

It is further desirable to implement authentication that does not require the user to remember and use any passcode, thus avoiding the usability issues as PIN numbers. The acoustic features depend on 3D facial geometries of the individual user and thus is more resilient to image/video attacks that easily spoof 2D visual based approaches. Similar to FaceID, echo signature does not require direct touching of the screen or phone by the user, thus avoiding issues such as for example, moist fingers that pose difficulties to fingerprint sensors.

It is further desirable to implement an acoustic emitting signal suitable for considerations including any hardware limitations, sensing resolution, and audibility to humans. In certain embodiments or aspects, novel acoustic signal processing techniques are implemented for reliable segmentation of echoes from the face.

It is further desirable to implement a novel user authentication system, which leverages acoustics and/or vision for secure, convenient and effective user authentication, without requiring any additional special hardware other than a known smartphone device.

It is further desirable to implement a novel echo signature authentication system that actively emits almost inaudible acoustic signals from the earpiece speaker of the smartphone device in order to "illuminate" the user's face, and authenticate the user by the unique features extracted from any of the echoes and acoustic signals that bounce off the 3D facial contour of a user's face.

It is further desirable to effectively combat the required changes in phone-holding poses and instead implement the echoes (i.e. acoustic signals) that bounce off the 3D facial contours of a user. In certain aspects or embodiment an end-to-end hybrid machine learning framework is implemented, which extracts representative acoustic features using a convolutional neural network, and fuses vision and acoustic features to a support vector machine (SVM) for final authentication.

In certain aspects or embodiments, a Convolutional Neural Network (CNN) is trained to extract reliable acoustic features, which may also be further combined with visual facial landmark locations that are in turn, input into a binary Support Vector Machine (SVM) classifier for the final layer of authentication of the user.

SUMMARY OF THE INVENTION

In accordance with an embodiment or aspect, the present technology is directed to a system and method associated with predicting an echo-signature associated with a user during registration and/or user authentication.

In particular, in accordance with an embodiment or aspect, the presently disclosed technology is directed to a system and method associated with predicting authentication of a device user based on a joint features representation relative to an echo-signature associated with the device. The system comprises an echo-signature engine including a processor that performs various operations.

In accordance with an embodiment or aspect, disclosed is a system and method that includes the processor perform operations that include emitting acoustic signals in response to a request for processing of a profile associated with the device. The system and method further includes receiving a set of echo acoustic signals that are tailored based on reflection of the acoustic signals from unique contours of one or more depth portions associated with the user relative to a discrete epoch. The system and method further includes extracting one or more region segments associated with the echo acoustic signals in order to train a classification model. The system and method further includes generating the classification model based on the one or more region segments as extracted. The system and method yet further includes extracting a joint features representation based on the classification model. The system and method yet further includes generating a vector-based classification model used in the prediction of the joint features representation. The system and method yet further includes determining whether the joint features representation is associated with the profile associated with the device based on the prediction of the joint features representation.

The system and method in accordance with additional embodiments or aspects, further includes operations which are provided herein below respectively. In yet a further disclosed embodiment, the system and method further includes that the joint features representation associated with the user profile includes acoustic features. The system and method further includes that the joint features representation associated with the user profile includes extracted landmark coordinates associated with the unique contours of one or more depth portions relative to a discrete epoch. The system and method further includes that the joint features representation associated with the user profile includes extracted acoustic features associated with the unique contours of one or more depth portions relative to a discrete epoch. The system and method further includes that the request for processing of the profile associated with a computing device comprises initial registration of an original user profile or authentication of a user profile relative to a current epoch for access to a computing device. The system and method further includes that the request for processing of the profile associated with the computing device further comprises authenticating a current user profile for access to the computing device by comparison of vector features associated with the joint feature representation of the original user profile with vector features associated with the joint feature representation of the current user profile relative to the current epoch.

The system and method yet further includes authenticating the current user profile based on whether the vector features associated with the joint feature representation of the current user profile is above a threshold with respect similarity to vector features associated with the joint feature representation of the original user profile. The system and method yet further includes that the operation of extracting the one or more region segments associated with the echo acoustic signals further comprises identifying a direct path segment in the one or more region segments associated with received acoustic echo signals. The system and method yet further includes that the operation of extracting the one or more region segments associated with the echo acoustic signals further comprises identifying a major echo segment in the one or more region segments associated with the received echo acoustic signals. The system and method yet further includes that generating the joint features representation associated with the user profile further comprises augmenting the joint features representation with synthesized acoustics features and augmented landmark coordinates associated with the unique contours of one or more depth portions associated with the user relative to a varied discrete epoch. The system and method yet further includes that one or more varied vector features associated with the synthesized acoustic features and/or augmented landmark coordinates are extracted for generating the joint features representation relative to the varied discrete epoch.

In accordance with yet another disclosed embodiment, a computer readable device is disclosed storing instructions that, when executed by a processing device, performs various operations. Further disclosed operations include emitting acoustic signals in response to a request for processing of a profile associated with the device. Further disclosed operations include receiving a set of echo acoustic signals that are tailored based on reflection of the acoustic signals from unique contours of one or more depth portions associated with the user relative to a discrete epoch. Further disclosed operations include extracting one or more region segments associated with the echo acoustic signals in order to train a classification model. Further disclosed operations include generating the classification model based on the one or more region segments as extracted. Yet further disclosed operations include extracting a joint features representation based on the classification model. Yet further disclosed operations include generating a vector-based classification model used in the prediction of the joint features representation. Yet further disclosed operations include determining whether the joint features representation is associated with the profile associated with the device based on the prediction of the joint features representation.

In yet another disclosed embodiment, the joint features representation associated with the user profile includes acoustic features. Yet a further disclosed embodiment includes that the joint features representation associated with the user profile includes extracted landmark coordinates associated with the unique contours of one or more depth portions relative to a discrete epoch. Yet a further disclosed embodiment includes the joint features representation associated with the user profile includes extracted acoustic features associated with the unique contours of one or more depth portions relative to a discrete epoch.

These and other purposes, goals and advantages of the present application will become apparent from the following detailed description read in connection with the accompanying drawings.

BRIEF DESCRIPTION OF THE DRAWINGS

The patent or application file may contain at least one drawing executed in color. Copies of this patent or patent application publication with any color drawing(s) will be provided by the respective Patent Office upon request and payment of any necessary fee.

Some embodiments or aspects are illustrated by way of example and not limitation in the figures of the accompanying drawings in which:

FIG. 6A provides a tabular representation of the various CNN layers, layer type, output shape and parameter amounts.

FIG. 10A illustrates a flowchart of any exemplary method of acoustic signal pre-processing in accordance with an embodiment of the disclosed system and method.

FIG. 10B illustrates a flowchart of any exemplary method of signal segmentation which forms part of the method of acoustic signal pre-processing illustrated in FIG. 10A, in accordance with an embodiment of the disclosed system and method.

FIG. 12 illustrates a flowchart of an exemplary method of user profile registration, also described in connection with FIG. 2A, in accordance with an embodiment of the disclosed system and method.

FIG. 15A illustrates a graphical representation of different classifiers performance on extracted features from CNN, in accordance with an embodiment of the disclosed system and method.

FIG. 15B illustrates a graphical representation of SVM performance using different features, in accordance with an embodiment of the disclosed system and method.

FIG. 15C provides a tabular representation of mean/median accuracy with vision, acoustic and joint features.

FIG. 16A provides a graphical representation of the precision, recall, F-score and BAC of one-class SVM model using acoustic features only.

FIG. 16B provides a graphical representation of the precision, recall, F-score and BAC of one-class SVM model using joint features only.

FIG. 16C provides a tabular representation of authentication accuracy of new users.

Figure 1:
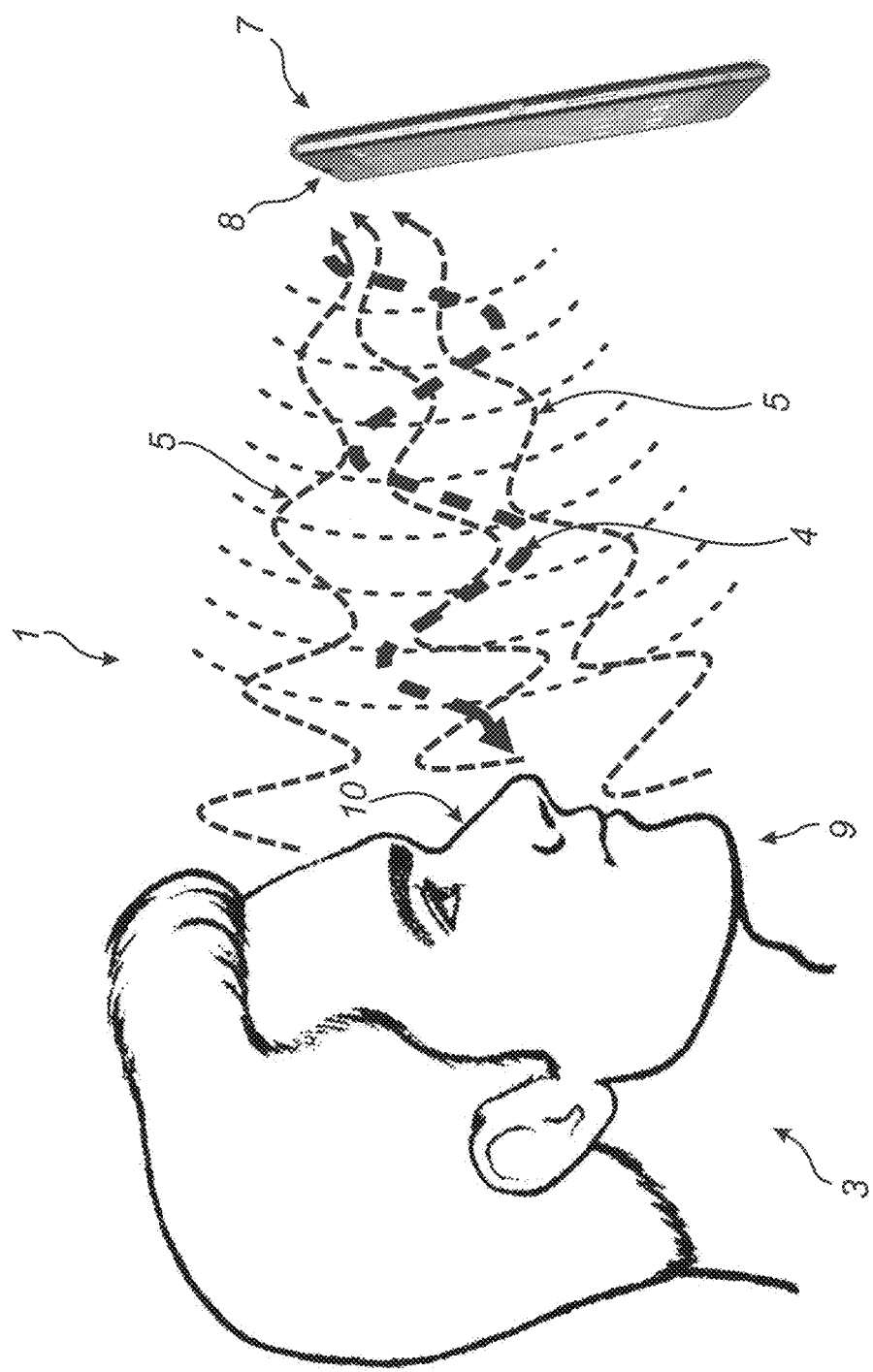
FIG. 1 illustrates an example of echo signature system in which sound signals are emitted from the earpiece speaker in order to generate an acoustic signature to authenticate a user, in accordance with an embodiment of the disclosed system and method.

It should be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

In the following description, for the purposes of explanation, numerous specific details are set forth in order to provide a thorough understanding of example embodiments or aspects. It will be evident, however, to one skilled in the art, that an example embodiment may be practiced without all of the disclosed specific details.

The present disclosure relates to a system and method associated with generating an acoustics-based echo-signature print associated with an original user of a device that is implemented during prediction for authentication of the current user of a device. Even more particularly, the present invention relates to a novel system and method that trains and augments a classification model in order to predict the respective authentication of a joint features representation including acoustic features and visual landmark features of the user during authentication of a user of the device.

In certain aspects or embodiments, contemplated is an end-to-end hybrid machine-learning framework, which extracts representative acoustic features using a convolutional neural network, and fuses vision and acoustic features to SVM for final authentication.

Further contemplated is a data augmentation scheme for generating "synthesized" training samples, which significantly reduces false negatives with limited training sample size, thus, saving the efforts by a user in generating a new profile registration.

Disclosed are three novel authentication modes, ultra low-power presence detection, low-power continuous authentication and two-factor one-pass authentication for different application scenarios, balancing any tradeoffs between security, user convenience and power consumption.

The disclosed system and method is able to achieve 93.75% balanced accuracy and 93.50% F-score, while the precision is at a level of 98.05%. In addition, there is not instance of image and/or video-based attack observed that succeeds in spoofing the disclosed system or method.

In fact, the disclosed echo-signature based authentication system and method, is the first to leverage active acoustic sensing combined with vision features for smartphone user authentication, hence, demonstrating robust performance without requiring any additional special sensor(s) or hardware to achieve the same level of secure authentication.

Existing authentication are subject to information leaks. Critical PIN numbers or passwords can be leaked or stolen easily. As an example, in shoulder-surfing attacks, it is not uncommon for someone standing close by to peek the whole PIN typing. Other kinds of attacks are replay attacks. In such attacks, 2D image based face recognition systems suffer from replay attacks by images or videos of the user face. As an example, the face recognition system on Samsung's flagship Galaxy S8 is reported to be spoofed by a simple picture. Yet another form of attack is biometric duplication. Fingerprint is the mainstream biometric used for authentication solutions. However, fingerprints are widely left on objects (e.g., glasses) touched by the user, and can be duplicated with reasonable efforts and skill in order to fool the sensor.

More particularly, disclosed is a system and method associated with user authentication based on acoustic based facial recognition that using a created facial echo-signature that is unique to and associated with a particular user. In certain embodiments or aspects, the disclosed system implements existing hardware widely available on most smartphones or personal digital assistants (PDA devices), so that it can be deployed on a large scale rapidly with minimum added or no hardware costs. In addition, the disclosed facial echo-signature system and method implements a biometric that is pervasive to every human being.

The human face has been widely used as a biometric because it is distinctive. However, most existing 2D visual based systems can be spoofed by images or videos. Thus, the disclosed system and method leverages the 3D information of the facial contours for much higher security and better performance in user authentication.

The biometric cannot change much over time in order to implement a secure form of authentication. Biometrics such as for example, heartbeat, breathing, gait, and/or posture are highly affected by the user's physical conditions (e.g., running vs. walking). Hence, these types of biometrics are not considered optimal choices for robust authentication. In contrast, the human face geometries are not likely to change significantly over shorter time periods. However, daily changes like wearing hats or glasses can be easily accommodated in the disclosed system and method.

The level of difficulty in the ability of a user to circumvent the existing authentication system is considered an important component for any authentication system to function with and ensure a high security level. Implementation of existing authentication approaches, such as PIN numbers, 2D based face recognition, and/or fingerprint sensors carry some requisite risks of being circumvented during authentication. However, implementing the disclosed two-factor authentication analyzes both acoustic and visual features simultaneously, and any attempt at circumventing would require duplicating both 3D facial geometries and acoustic reflections properties close enough to the human face, which would be much more difficult to accomplish than in existing authentication approaches.

Hence, the disclosed echo-signature based authentication system and method, is more secure, resilient and implements in certain embodiments, a two-factor authentication system and method that may be implemented in most existing smartphones without requiring any additional special sensors and/or other hardware components. In order to accommodate differing application scenarios, disclosed are different authentication modes that include trade-offs between security, convenience and power consumption. While light-weight vision algorithms should be used to minimize computation complexity, future integration with state-of-the-art vision solutions are also contemplated. Such "free" acoustic-aided authentication certainly will play important role in future mobile authentication development.

Referring to FIG. 1A, shown is an illustration of the acoustic signals implemented in accordance with an embodiment of the disclosed echo-signature based system and method. The system 1 emits nearly inaudible sound signals 4 shown emanating from the earpiece speaker 8 of the device 7, which signals 4 illuminate the user's face 9. The extracted acoustic features from the echoes that reflect from the user's face 9 are combined with visual facial landmarks detected from the front camera of the device 7 in order to authenticate the user 3 (as described in greater detail in connection with FIGS. 2A and 7).

Figure 7:
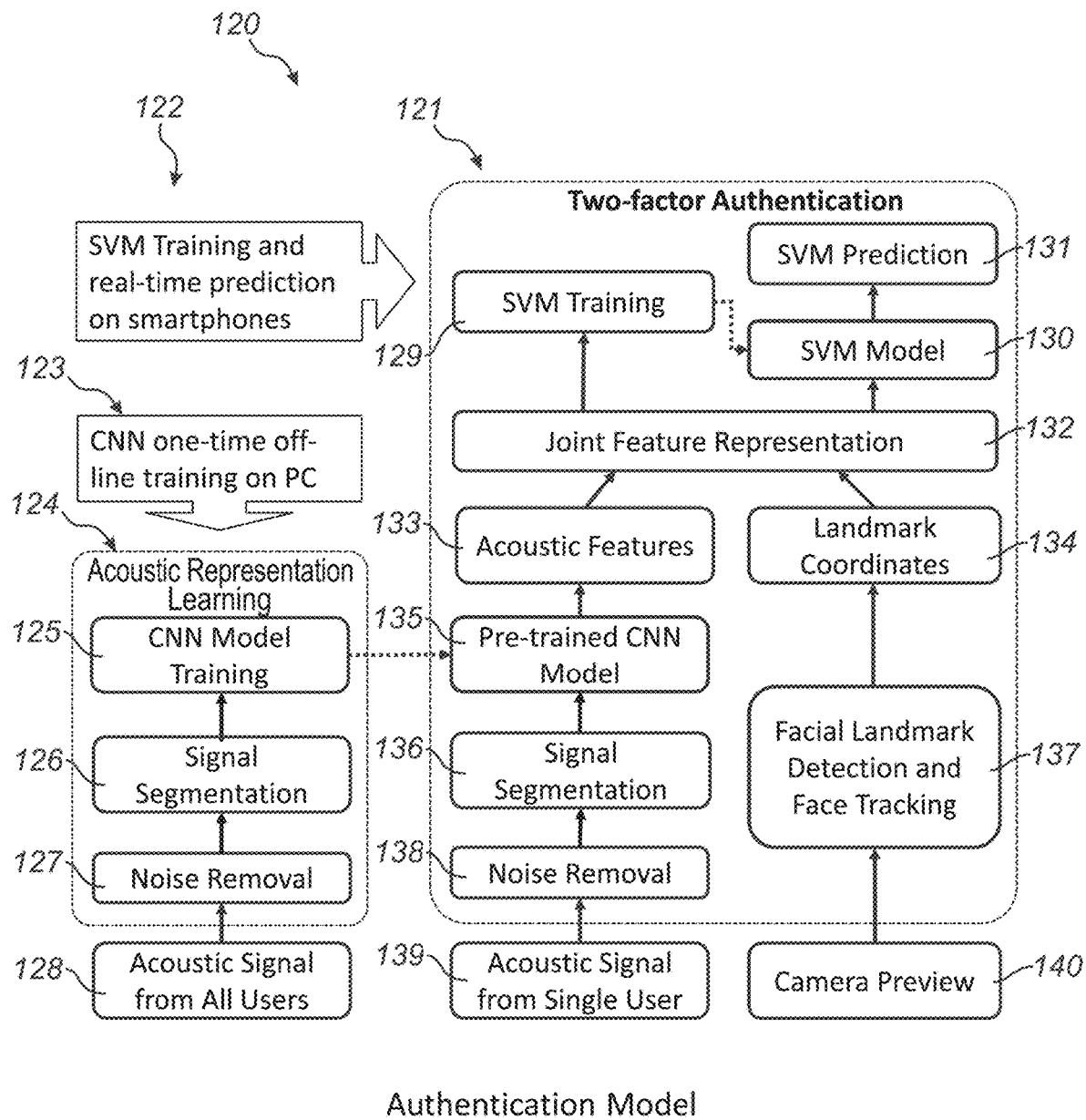
FIG. 7 provides an example overview illustrating workflow of an end-to-end hybrid machine-learning framework for authentication, in accordance with an embodiment of the disclosed system and method.
Figure 7A:
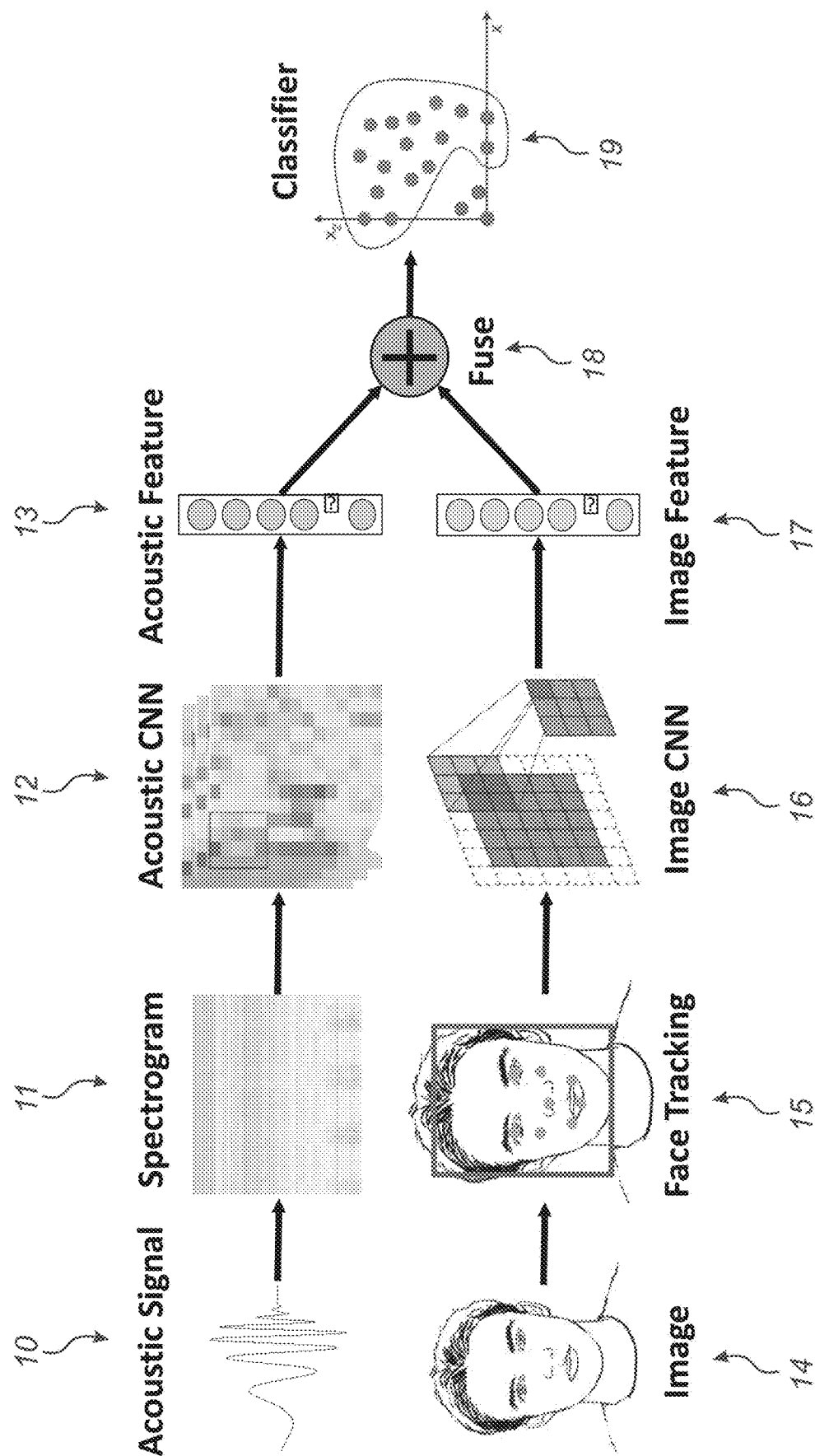
FIG. 7A illustrates an example overview of the workflow associated with generating an image-based CNN and acoustics-based CNN, by extracting and fusing both acoustics features and image features in generating a classifier, in accordance with an embodiment of the disclosed echo-signature authentication system and method.

Referring to FIG. 7A, shown is an illustration of an example overview of the workflow associated with generating a classifier 19 based on a sophisticated image-based CNN 16 and acoustics-based CNN 12, extracting acoustics features 13 and image features 17 and fusing both features 13, 17 in generating a classifier 19, in accordance with an embodiment of the disclosed echo-signature authentication system and method. In a contemplated embodiment, the reflected echo-acoustic signal 10 is processed and generated as a spectrogram representation 11. An acoustic CNN 12 is next generated that is related to the major echo segment 109 and direct path segment 107 of the face region echoes segment 108 as discussed hereinbelow in FIG. 4. The acoustic features 13 are next generated and fused 18 with image features 17 (generated in parallel track in steps 14-17). The image of the user 14 is obtained from the camera 103 and processed with respective face and landmarks tracking 15 as shown. An image CNN 16 is next generated. The sophisticated image features 17 are extracted from the image CNN 16 and fused with acoustic features 13. Once fused in step 18, a classifier is generated and is used during authentication of the user profile. Alternatively, sophisticated visual features from existing image face recognition solutions, such as a pre-trained face recognition neural network, may be generated and used as the image features for fusion with the acoustic features in generating the classifier.

In certain embodiments or aspects, the disclosed system implements the speakers/microphones associated with the smart device 7 for acoustic sensing. The frontal camera 103 as shown in FIG. 3, is used for facial landmarks detection (for example, eyes, mouth). The device 7 extracts acoustic features from echo signals using a deep learning approach and fuses such features with facial landmarks as a joint representation for authentication, in accordance with an embodiment of the process shown in FIG. 2A. The system 1 leverages detected acoustic signal(s), visual landmark features and components for secure and convenient user authentication. In particular, the echo-signature system actively emits almost inaudible acoustic signals 4 from the earpiece speaker 8 to "illuminate" the user's face 9 and authenticates the user by the unique features extracted from the echoes 5 bouncing off or reflecting from the 3D facial contour(s) or 3D geometry 10 of the user's face 9.

As described further hereinbelow with respect to FIG. 2A, in order to contend with any changes, for example, resulting from variations in phone-holding poses, a Convolutional Neural Network (CNN) is trained to extract reliable acoustic features. These reliable acoustic features are further combined with visual facial landmark locations to feed a binary Support Vector Machine (SVM) classifier for final authentication. Because the echo features depend on 3D facial geometries 9 of the user 3, the disclosed system can be easily spoofed by images or videos similar to 2D visual face recognition systems.

Figure 2A:
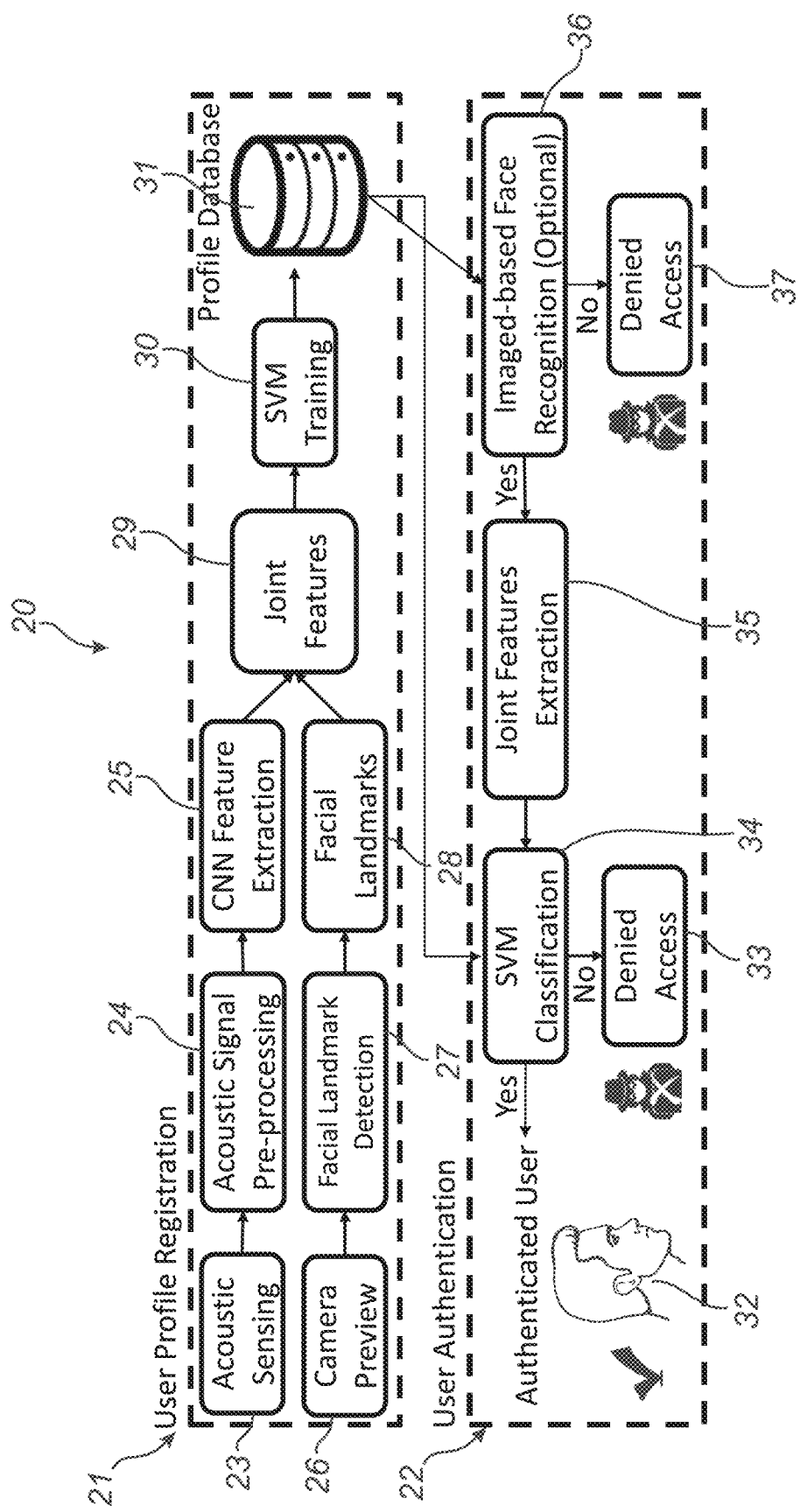
FIG. 2A provides an example overview of the workflow of the pre-trained CNN which extracts acoustic features and combines them with visual facial landmarks, in accordance with an embodiment of the disclosed echo-signature authentication system and method.
Figure 3:
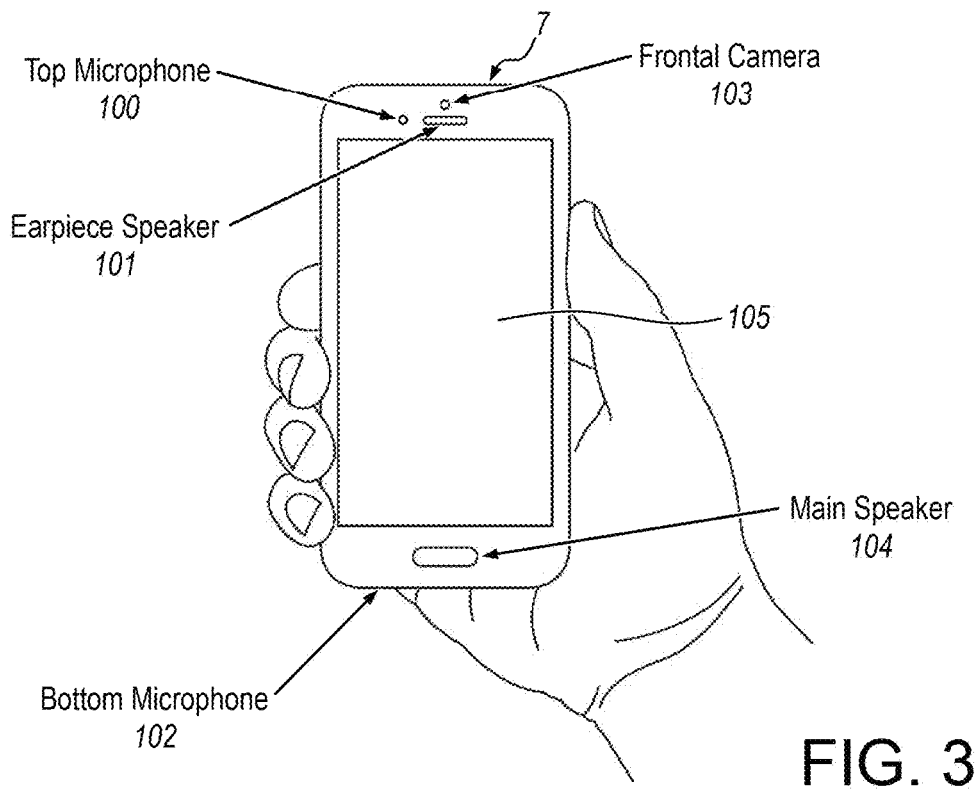
FIG. 3 illustrates a device 7 including in certain embodiments, speakers, microphones and a camera layout generally included in an example device 7.

More particularly, shown in FIG. 2A is an overview 20 of an embodiment of the disclosed system design, which consists of two major phases: user registration 21 and user authentication 22. During user profile registration 21, the echo-signature system uses a pre-trained CNN to extract acoustic features during acoustic sensing 23, which are combined with visual facial landmarks as joint features. An SVM classifier 30 is then trained to authenticate a registered user. SVM classifiers are generally considered effective for general-purpose pattern recognition processing including facial images whether frontal poses or other views of the face 9. It is further noted that generally, respective facial geometry features are expressed as vectors.

During the registration phase, the echo-signature system detects facial landmarks (for example, eyes, mouth, eyebrows, cheekbones, nose) using the frontal camera of the device 7. Meanwhile, the earpiece speaker 8 emits designed acoustic signals that are generated by the echo-signature system module or echo-signature system processor or engine, in order to "illuminate" the user's face 3. Echoes bouncing back or reflecting from the user's face 9 are received by the microphone of the device 7. A pre-trained CNN model 25 is then used to extract acoustic features that are resilient to any phone pose changes, which are combined with detected facial landmarks 28 as a joint feature representation 29, which are then transmitted and fed into an SVM classifier 30 for model training.

During the user authentication phase 22, the user holds the smartphone in front of the face 9 for facial landmarks detection 28 and acoustic sensing 23. The joint features are extracted during joint features extraction phase 35 and fed into the trained SVM classifier 34 for final authentication. If the features are not recognized by the system, the user is denied access in step 33. Otherwise, the user is authenticated in step 32 and allowed access to the device. Optionally, an image-based face recognition system 36 can be integrated in an embodiment of the echo-signature system 20 for pre-screening during user authentication 22. If the user image is not recognized by the system 20, access is denied in step 37. Otherwise, if the image is recognized the system proceeds to joint features extraction in step 35. The joint features are next extracted in step 35 and fed into the trained SVM classifier in step 34 for the next layer of authentication.

In particular, in certain embodiments, the echo-signature system implements a pre-trained CNN to extract acoustic features, which are combined with visual facial landmarks as joint features. Such extraction of joint features occurs in step 35. The SVM classifier is trained in step 34 to authenticate a registered user using the extraction of joint features in step 35. In the registration phase 21, a pre-trained CNN model is used to extract acoustic features resilient to phone pose changes, which are combined with facial landmarks 28 as a joint features representation in step 29, and then fed into an SVM classifier for SVM model training during step 30 of user profile registration 21. The trained data is then stored in the profile database in step 31.

During the acoustic sensing 23 process, which occurs during user profile registration 21 phase as shown in FIG. 2A, acoustic echo signals 4 reflecting from the human face 9 are detected and are determined to generally exhibit highly distinctive characteristics from one human face to another. The echoes 4 (for example, detected in the form of acoustic signals) are generally sensitive to the relative position and/or distance between the user face 9 and device 7. Each 3D facial contour 10 exhibits a unique set of multiple reflecting surfaces, which create a unique sum of individual echoes. The different materials absorb, and attenuate sound waves differently, hence, permitting the system to distinguish objects of similar geometry, but different materials (e.g., a stone sculpture). The facial region contours 10 of the face 9 include a 3D surface and hence, a certain depth. As an example, regardless of distance of the phone to the user, when in a frontal full-face pose, the tip of the nose is closest to the phone, while the ears of the user 3 are generally the farthest. The major echo assumes that the face is a flat surface. In order to cover the depth of the face 9, the system extends the major face signal to two ends. An embodiment of this process is described in greater detail hereinbelow in connection with FIG. 8A.

FIG. 2 B provides an additional overview of user profile registration in accordance with an embodiment of the disclosed system and method. In certain aspects or embodiments, the system leverages the front camera on smart phones for face recognition, and one or more speaker(s)/microphone(s) for acoustic verification stage of user profile registration. The example system design consists of two major phases: user profile registration and user authentication.

Figure 2B:
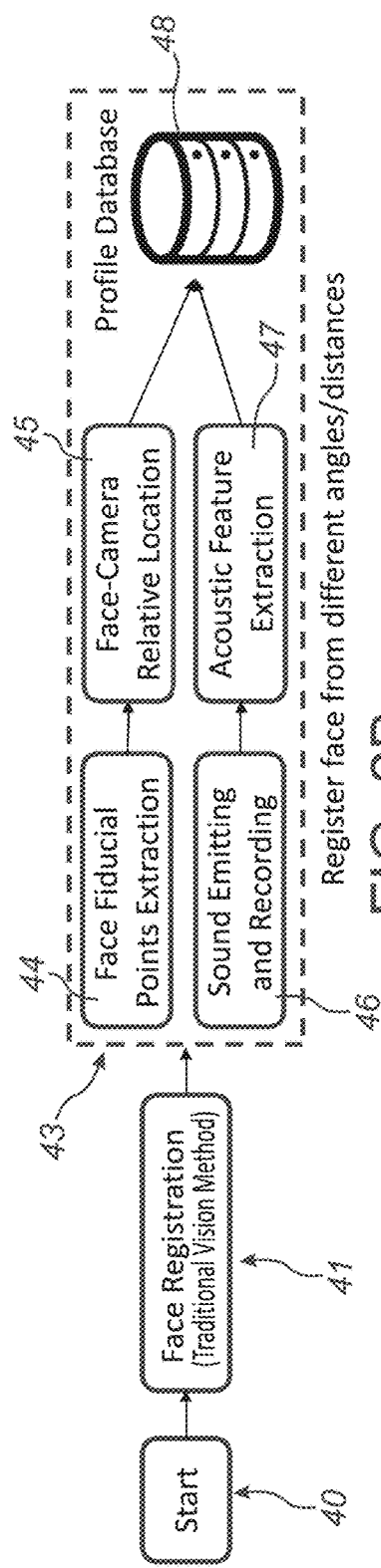
FIG. 2B provides an example overview of user profile registration in accordance with an embodiment of the disclosed system and method.

During user profile registration as shown in FIG. 2B, the system allows users to register his/her personal biometric information into the profile database 48, with both images and acoustics being recorded. This example registration process consists of two steps. First, the system begins the process at step 40 by implementation of image-based facial recognition methods 41 in order to register a user face 9. Such facial image-based recognition can be used later for first-round recognition during authentication phase. Second, the system proceeds to the next registration phase 43 in which it registers the sound features with the device 7 at different angles/distances to a user's face 9, along with the corresponding face fiducial points with corresponding spatial locations on the screen. Such facial fiducial points extraction 44 are extracted using various algorithms. Existing APIs for fiducial points detection may be used in example embodiments. In such example system, the user may need to move the phone in front of his/her face in order to collect enough data for effecting the registration.

During face registration 41, the system registers a user's face 9 using traditional image based face recognition methods. The registered image based profile can then be used for first round recognition, and also for retrieving a user's acoustic profile for a second level of verification. Respective facial fiducial points are extracted during step 44 using for example, existing algorithms. The system records the locations of such facial fiducial points using for example, a descriptor associated with the relative location/orientation between the smart device 7 and the user's face 9. Based on the locations of the fiducial points that are received by the system processor, the relative location between the face 9 and the camera is determined during step 45. A system processor, echo-signature processing device, echo-signature engine or processor, or a computing device associated with the echo-signature registration and/or authentication platform, can compute such values.

The system can be further configured to design customized sound signals in step 46 sound emitting and recording step, for example, in a high frequency range 17-24 KHz, which is almost inaudible to humans. Different customized sound signals can be designed and emitted randomly to enhance the security during step 46. In example embodiments, during the authentication phase, the system randomly emits a designed signal and verifies the corresponding reflection signal reflect from the user's facial contours 10. In certain embodiments, during step 46, the speaker on the front panel (example, earpiece speaker) of the device 7 (e.g., smartphones) is used for sound emitting signals, and any reflecting signals are captured by the microphone 8 using the smart device 7.

During acoustic feature extraction, in step 47, the system extracts the reflection signal segment from the human face by identifying the signal amplitude. Due to the relative location between a user's face and the speaker/microphone, a reflection signal from the user's face exhibits high amplitude. Next, the system can extract and identify this signal segment as the unique acoustic profile for a user. Acoustic features can be extracted manually or automatically by machine learning approaches such as for example, deep neural networks. The respective profiles and extracted information is stored in profile database 48 shown in FIG. 2B.

Figure 2C:
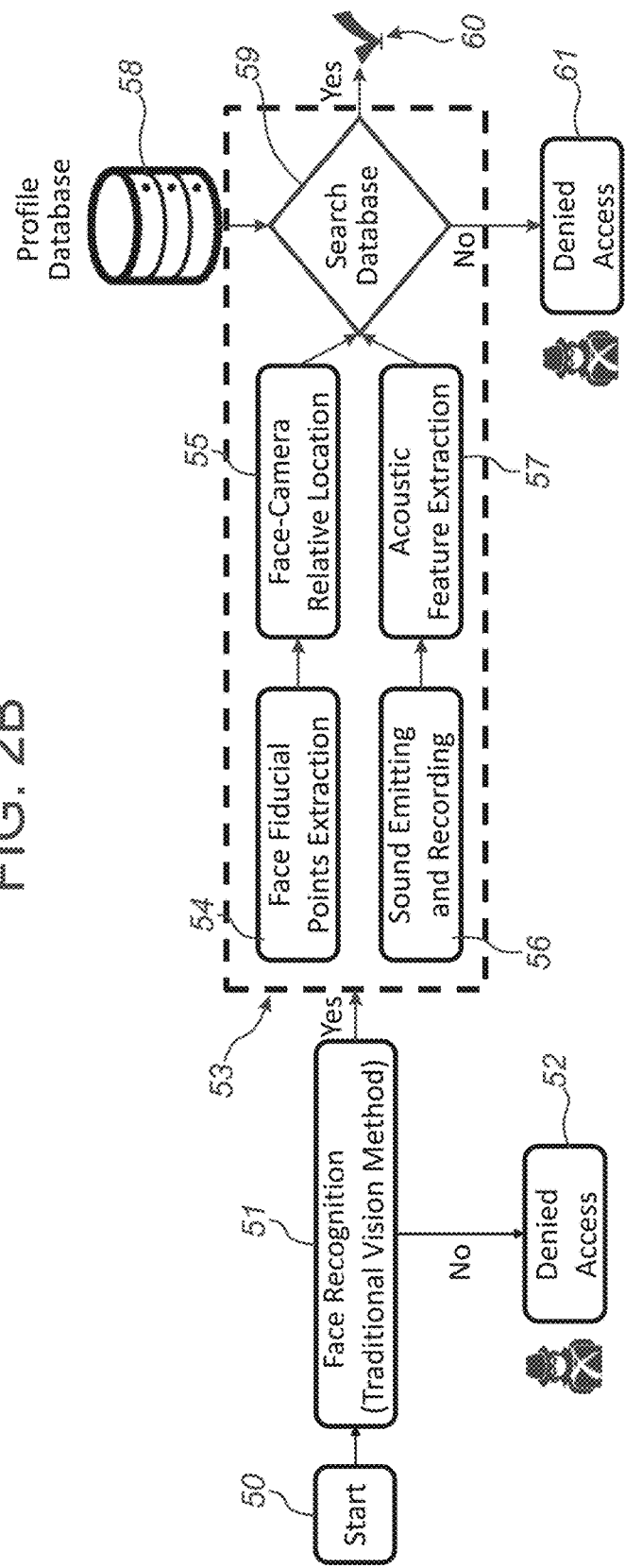
FIG. 2C provides an example overview of user profile registration and authentication using both image and acoustic features, in accordance with an embodiment of the disclosed system and method.

During an example user authentication process as shown for example in FIG. 2C, users would need to pass both traditional face recognition and acoustic verification process in order to attain or achieve system access to the device 7. First the user's face 9 is compared to the image profiles in the database for pre-screening, following for example, traditional face recognition methods. If a matched profile is found in step 49, this will trigger the face fiducial points detection and acoustic sensing module, which finds the relative location between face and camera, emits a designed signal and records the reflection signal. Then, a system algorithm extracts features from the reflection signals and matches the features given the relative location. This can be achieved by computing similarity metrics using correlation or machine learning regression algorithms. If the similarity is above a certain threshold, (for example, 75%, 85%, 95% similarity to) authentication is approved during authentication phase 53. Otherwise, user access is denied in step 61.

Similar to FIG. 2B, shown in FIG. 2C are similar initial steps of facial recognition 51, but with the added step shown of denying access in step 52, based on for example, traditional image-based facial recognition methods. Other methods of implementing image-based facial recognition are contemplated as well. During step 51, shown in FIG. 2C, the system performs image face recognition using existing approaches that allows the system to pre-screen users, and retrieve his/her profile from a respective database for matching thereto.

During user profile registration as shown in FIG. 2C, the system allows users to register his/her personal biometric information into the profile database 58, with both images and acoustics being recorded. This example registration process consists of two steps. First, the system begins the process at step 50 by implementation of image-based facial recognition methods 51 in order to register a user face 9. Such facial image-based recognition can be used later for first-round recognition during authentication phase. Second, the system proceeds to the next registration phase 53 in which it registers the sound features with the device 7 at different angles/distances to a user's face 9, along with the corresponding face fiducial points with corresponding spatial locations on the screen. Such facial fiducial points extraction 54 are extracted using various algorithms. In such example system, the user may need to move the phone in front of his/her face in order to collect enough data for effecting the registration.

During face registration 51, the system register a user's face 9 using traditional image based face recognition methods. The registered image based profile can then be used for first round recognition and also for retrieving a user's acoustic profile for a second level of verification. Respective facial fiducial points are extracted during step 54 using for example, existing algorithms. The system records the locations of such facial fiducial points using for example, a descriptor associated with the relative location/orientation between the smart device 7 and the user's face 9. Based on the locations of the fiducial points that are received by the system processor, the relative location between the face 9 and the camera is determined during step 55. A system processor, echo-signature processing device, system engine, processor, and/or or a computing device associated with the echo-signature registration and/or authentication platform, can compute such values.

The system can be further configured to design customized sound signals in step 56 sound emitting and recording step, for example, in a high frequency range 17-24 KHz, which is almost inaudible to humans. Different customized sound signals can be designed and emitted randomly in order to enhance the security during step 56. In example embodiments, during the authentication phase, the system randomly emits a designed signal and verifies the corresponding reflection signal reflect from the user's facial contours 10. In certain embodiments, during step 56, the speaker on the front panel (example, earpiece speaker) of the device 7 (e.g., smartphones) is used for sound emitting signals, and any reflecting signals are captured by the microphone 8 using the smart device 7.

During acoustic feature extraction, in step 57, the system extracts the reflection signal segment from the human face by identifying the signal amplitude. Due to the relative location between a user's face and the speaker/microphone, a reflection signal from the user's face exhibits high amplitude. Next, the system can extract and identify this signal segment as the unique acoustic profile for a user. Acoustic features can be extracted manually or automatically by machine learning approaches such as for example, deep neural networks. The respective profiles and extracted information are stored in profile database 58, as shown in FIG. 2C.

The system next extracts the features from an acoustic recording, and matches them to the registered features at the given location in the database. This matching process during step 59 can leverage existing algorithms such as Euclidean distance between two vectors, correlation of two signals, and other similarity metrics used in machine learning algorithms.

In certain aspects or embodiments, enhanced facial recognition is implemented than known traditional methods by using deep neural networks, which are more accurate than traditional approaches, and can be implemented to enhance the current image facial recognition methods. Liveness detection features can also be implemented by instructing the user to blink eyes, open mouth, etc., which can also be integrated as another layer of security. Note that it's not too difficult for attackers to get around such security using videos. However, videos will not pass the disclosed two-factor authentication system and method implementing image recognition and acoustics echo-signature.

In addition, in certain aspects or embodiments, the system can implement enriched acoustic features by designing more sophisticated, complex emitting signal(s). A simple solution is that the system may emit multiple sound pulses each time it performs authentication. Then the system examines all the received signals in order to reduce the false alarms.

In other embodiments or aspects, the echo-signature system and method, implements a shuffling emitting signal. As the system actively emits sound signals, it can control the signal at each time point. The system can implement multiple sound signals at different frequencies, different combinations, and different patterns. The respective training data is collected for each of the design signal(s), and the model is respectively trained. During authentication phase, the system can randomly select one or mixing multiple signals for testing. Since attackers won't be able to predict the emitting signal, it renders the system difficult to circumvent such type of acoustic based authentication. While even the response signal(s) can be perfectly recorded and replayed by attackers (but, usually impossible due to the imperfection of hardware performance), the disclosed system and method is still able to overcome such challenges as the received signal will comprise a mix of an attacker's response and a replayed signal making it rather difficult to circumvent the acoustic-based security features.

By lowering the threshold, the system can also maintain real-time authentication with minimum power consumption. When a user is out of the detection zone of the sound signal, the phone will be locked automatically. This further improves the security since the system and the device requires less accuracy and able to create inaudible sound signals for continuous detection without annoying the users. It is noted that the threshold is a similarity metric between the measure features and registered features. Hence, if the threshold is set at a lower predetermined value, it is easier for the user to pass authentication without attempting too many times. Accordingly, if the threshold is set a higher value predetermined value, it would be more difficult for the user to pass authentication and may require more attempts to seek entry into the device.

Acoustic echoes from the human face are highly distinctive. The echoes are very sensitive to the relative position between the user face and device. Each 3D facial contour is a unique set of multiple reflecting surfaces, which create a unique sum of individual echoes. Different materials absorb, attenuate sound waves differently thereby allowing the system to distinguish objects of similar geometry but of different materials (e.g., a stone sculpture verses a live human face).

Shown in FIG. 3 is a device 7 including in certain embodiments, speakers, microphones and a camera layout generally included in an example smartphone device. Shown are two speakers, a main speaker 104 at the bottom of the device 7 and an earpiece speaker 101 at the top for making phone calls. There is also one microphone 102 at the bottom, and another microphone 100 located at the top for noise cancellation.

The mobile device 7 shown in FIG. 3, can be handheld by a user 3 in a manner and position such that the device 7 is unlocked or remains unlocked by detecting a user's face 9. The device 7 may be any one of several different types of small consumer electronic devices that can be easily held in the user's hands during normal use. In particular, the device 7 may be any camera-equipped mobile device, such as a cellular phone, a smart phone, a media player, or a tablet-like portable computer, all of which may have a built-in camera. The device 7 may have an exterior front face in which there is a front-facing camera 103 and a display screen 105. As will be more fully explained below, camera 103 is used to capture an image of the device user 3 while the user is facing the display screen 105, in order to unlock the device 7 or to keep the device unlocked. Camera 103 may also be used to capture an image of the user 3 that may later be used to authenticate the user as an authorized user of the device 7, in accordance with one or more embodiments of the echo-signature based authentication system and method.

FIG. 3 shows the typical layout of speakers, microphones and camera on smartphone devices 7. In certain embodiments, the top microphone 100 is used as the receiver because it is close to earpiece speaker 101, and is less affected by the user's hand holding the device. As shown in FIG. 3, the hand is closer to the bottom microphone 102. Even slight hand movements can create noises and variations in sound signals received by the bottom microphone 102 of the device 7.

In certain embodiments or aspects, as shown in FIG. 3, the earpiece speaker 101, top microphone 100, and frontal camera 103 are implemented individually or in combination for even more robust acoustic/visual sensing. The earpiece speaker 101 may selected for sound emitting for generally two reasons: 1) it is a design that exists on most smartphone devices. The location for the top microphone 100 is suitable for "illuminating" the user's face. Alternatively, the main speaker 104 comprises a more diverse design, either located at the bottom or on the back of the device 7; and 2) the earpiece speaker 101 is close to frontal camera 103, which minimizes alignment errors when the frontal camera is used for adjusting the phone pose relative to the user 3.

The echo-signature system determines the formation of the acoustic signal taking into account the following considerations in the emitting signal configuration. First, in the disclosed embodiment, the system facilitates isolation of the segment of interest (for example, echoes from the face) from the other reflections, such as interferences from clutters and self-interference from the speaker(s) 101, 104. This configuration requires the signal to be short enough so that echoes from objects at different distances have little overlap in time domain. Second, the acoustic signal should be as inaudible as possible to human ears to minimize annoyances. In certain embodiments or aspects, the implemented frequency range is generally over 20 KHz. The designed signal frequency range is generally apart from ambient noises (for example, under 8 KHz), to enable noise removal (e.g., using band-pass filters) with improved robustness thereof.

In certain disclosed embodiments, it was determined that a comfortable distance from human eyes to the phone is 25-50 cm, corresponding to a time delay of ~1.4-2.8 ms at the speed of sound. Based on experiments, when the frequency is above 20 KHz, serious power attenuation and worse signal to noise ratio occurs, and any echoes from faces are obscured, masked or buried by noises. Considering all these findings, a pulse signal with a length of 1 ms was selected with linear increasing frequencies from 16-2 KHz. A Hanning window is applied to re-shape the pulse envelop in order to increase its peak-to-side lobe ratio, thereby producing higher SNR for echoes. In authentication modes that require continuous sound-emitting phase, a delay of 50 ms for each pulse may be implemented, such that echoes from two consecutive pulses do not overlap.

In certain embodiments or aspects, the background noise is removed during background Noise Removal. The received raw signal goes through a 16-22 KHz Butterworth band-pass filter to filter out and remove background noises, such that weak echoes reflecting from human faces will not be buried or obscured by the noise.

Figure 4:
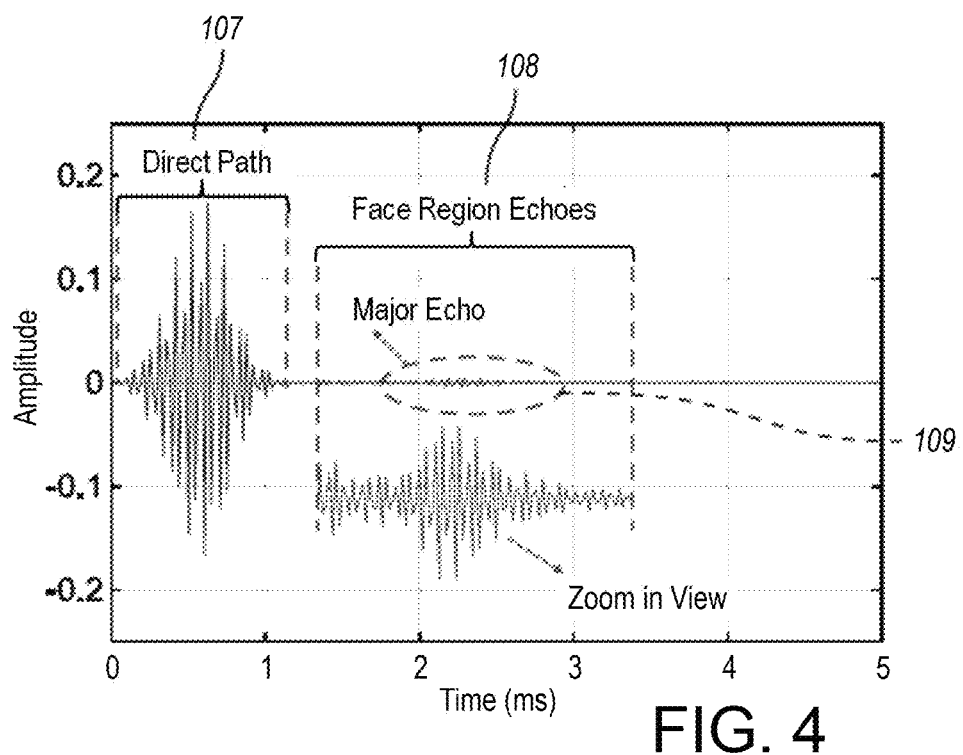
FIG. 4 illustrates a graphical representation of a sample recording segment of a received signal after noise removal, in accordance with an embodiment of the disclosed system and method.

A graphical representation of a sample recording segment of a received signal after noise removal is shown in FIG. 4. The direct path segment is defined as the emitting signal traveling from speaker to the microphone directly, which ideally should be a copy of the emitting signal and exhibits the highest amplitude, in certain embodiments. The major echo corresponds to the mix of echoes from the major surfaces (e.g., cheek, forehead) of the face. Other surfaces of the face (e.g., nose, chin) at different distances to the phone also produce echoes, arriving earlier/later than the major echo. The face region echoes include all these echoes, capturing the full information of the face. Accurate segmenting of the face region echoes is critical to minimize the disturbances from dynamic clutters around the phone, and reduce the data dimension for model training and performance.

In certain aspects or embodiments, during signal segmentation there are two steps associated with extracting the face region segment which include 1) locating the direct path segment in raw recordings; and 2) locating the major echo thus face region segment which is located in a time-sampling representation along the x-axis, after the direct path segment.

The first step of locating the direct path implements a basic assumption that a constant gap exists between the emitting and recording phases, thus the direct path can be located after that constant gap. However, both emitting and recording must undergo through multiple layers of hardware and software processing in the operating system, many of which have unpredictable, varying delays. Thus, locating the direct path using a constant delay is extremely unreliable. Instead, since the direct path signal usually has the highest amplitude, using cross-correlation to locate it is more reliable. Based on experiments, occasional offsets of direct path signal still occur after cross-correlation, which are due to ambiguities from comparable peak values in the cross-correlation result. Two techniques are disclosed herein below in order to enhance the stability: 1) template signal calibration; and 2) signal fine-tuning.

In certain aspects or embodiments Template Signal Calibration is used to enhance the stability of the direct path signal. Due to the hardware (for example, speaker/microphone) imperfections, the received sound signal is usually slightly different from the designed emitting signal that is generated. In order to achieve an accurate "template" signal for cross-correlation, the system perform emitting and recording in a quiet environment, so that the direct path signal can be reliably detected and saved as a calibrated template for future cross-correlation.

In certain aspects or embodiments, Signal Fine-tuning is used to enhance the stability of the direct path signal. In addition to the Hanning window, the system may implement manual tuning in order to tune the signal slightly to make the key peaks/valleys more prominent, which reduces cross-correlation ambiguity significantly. In the disclosed embodiment, only the central portion (15 samples) of the template signal is used in cross-correlation, further enhancing resilience to residual noises.

In accordance with an example embodiments or aspect, locating the Major Echo signal segment is described. One method for locating the major echo is to find cross-correlation peak location corresponding to a typical phone holding distance (for example, 25-50 cm) after the direct path location. However, human face echoes 188 (and their respective echo signals) can be so weak that echoes from larger obstacles faraway can have comparable amplitudes. This makes the estimation unstable and leads to occasional location "jumping", thus outliers (for example, distance measurements differing from all other measurements) occur in distance measurements.

Figure 5:
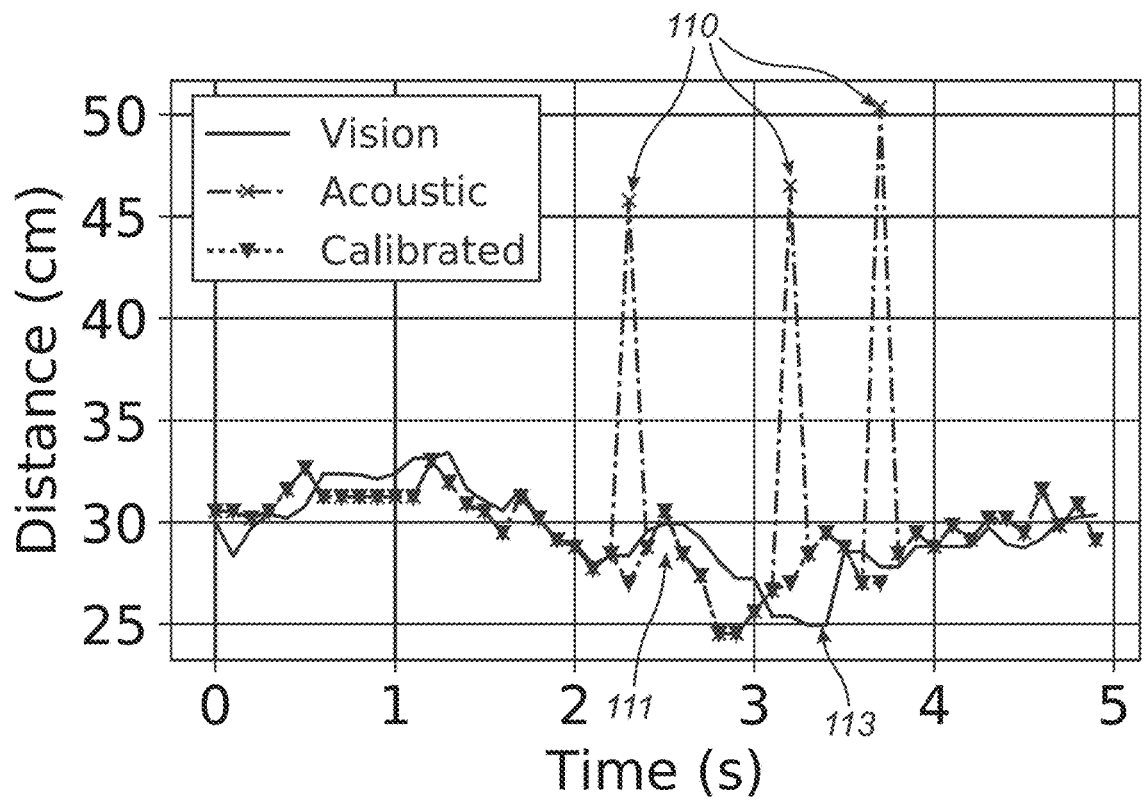
FIG. 5 illustrates a graphical representation of distance measurements from acoustics, vision and calibrated acoustics, in accordance with an embodiment of the disclosed system and method.

FIG. 5 is a graphical representation of distance measurements from acoustics, vision and calibrated acoustics. The dotted line in FIG. 5 shows the distance measurements from acoustics while the device 7 is being moved back and forth from the face 9. It can be observed that some outliers due to such "jumping" of the outliers 110 from the general grouping 111 of the acoustic signals. In order to solve this problem with "jumping", a vision-aided major echo locating technique can be implemented comprising of two steps in certain disclosed embodiments.

The first step comprises Vision Measurement Calibration. Applying the camera image projection principle, the closer the device 7 is positioned relative to the face 9, the larger the image and larger the distances between facial landmarks, and vice versa. The distance between the eyes or ears, for example, does get smaller or wider depending on the distance of the face to the camera 103. Thus, the distance from face 9 to device $d_v$, can be formulated as equation (1) provided herein below:

$$d_v = \tau \cdot \frac{1}{d_p} \tag{1}$$

where in equation (1), $d_p$ is the distance between two facial landmarks and $\tau$ is an unknown scale factor specific to the user 3.

The system selects $d_p$ as the pixel distance between two eye landmarks since they are generally widely separated and can be detected reliably. In order to estimate the scale factor τ, the system calculates $\tau_i$ for each pair-wise $d'_{v,i}$ from acoustic distance measurements and $d_{p,i}$ in pixels. In order to eliminate errors caused by acoustic distance measurement outliers, the system first determines the major cluster of $\{\tau_i\}$ using for example, density-based spatial clustering algorithm DBSCAN. It is noted that DBSCAN is generally a well-known clustering algorithm. The echo-signature system can be implemented by other clustering algorithms such as KNN or simple majority voting scheme. The system next implements leveraging linear regression to find the best τ that minimizes the offset between $d'_v$ and $$\tau \cdot \frac{1}{d_p}.$$

FIG. 5 illustrates outliers 110 that are extracted and removed in the vision calibrated acoustic distance measurements 113.

A second step in accomplishing the removal of the outliers' problem is implementation of vision-aided major echo locating technique. Although vision based distance measurement is generally considered more stable than acoustics, vision based measurements cannot capture the error caused by rotations of either the smartphone device 7 or user's face 9. Thus, the vision calibrated distance measurement is used in certain embodiments, in order to narrow down the major echo searching range and reduce any respective outliers. The system still implements cross-correlation to find the exact major peak location within this range. However, that the device user 3 face 9 cannot rotate to extreme angles, otherwise facial landmark detection may fail.

Since the depth of human face is limited, the system in certain embodiments extends for example, 10 sample points before and after the major echo segment to cover the entire face 9 region (allowing a depth range of ~7 cm). The sample points, which determine face region, can be later used by the system as inputs for machine models during authentication. It is noted that an average human face generally has seven (7) depths from which the acoustic signals echo, for example, the nose, face, cheeks, forehead, eyes, chin, mouth. The nose is considered closest to the camera 103, while the face is furthest from the camera. The cheeks are generally considered about mid-way distance. Hence, the face is considered a 3D object with generally seven (7) depths.

Figure 6:
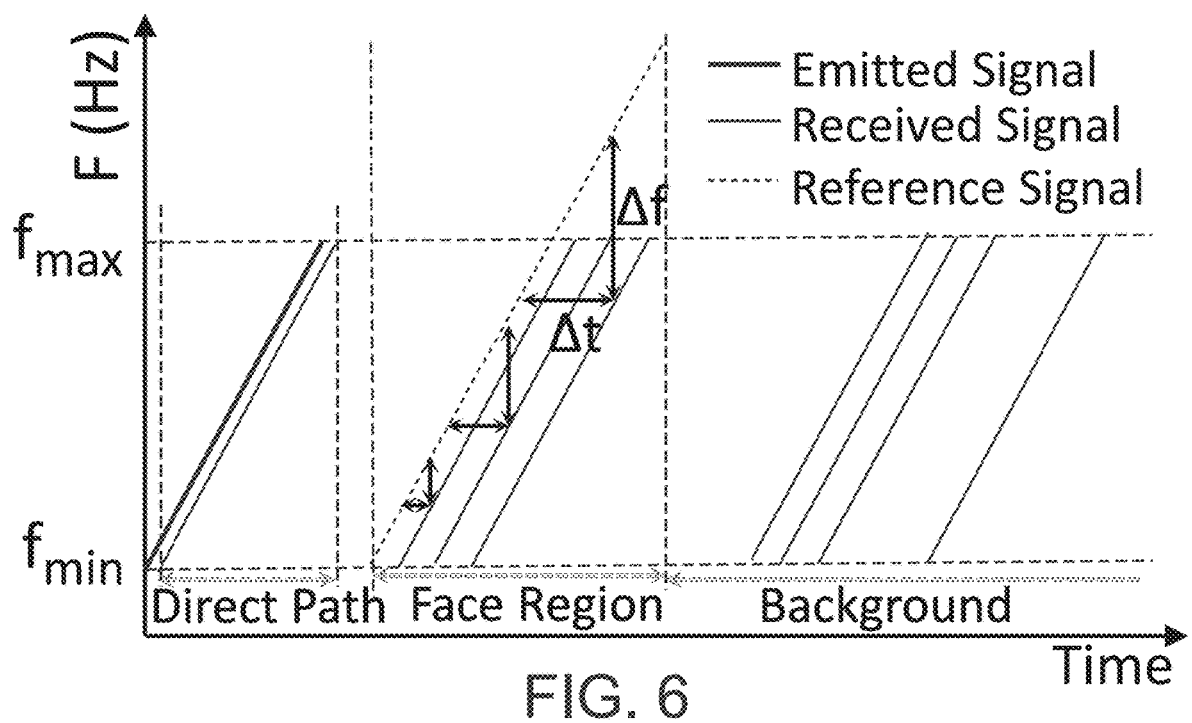
FIG. 6 illustrates a graphical representation of measuring the arrival time of each echo by using frequency-modulated continuous wave (FMCW) to determine the frequency shift $\Delta f$ and respective distance measurements, in capturing minute surface geometries on the face, by using segmented signal analysis, in accordance with an embodiment of the disclosed system and method.

FIG. 6 illustrates a graphical representation of measuring the arrival time of each echo by using frequency-modulated continuous wave (FMCW) to determine the frequency shift Δf and respective distance measurements, in capturing minute surface geometries on the face, by using segmented signal analysis, in accordance with an embodiment of the disclosed system and method.

Segmented Signal Analysis is implemented by the system, in order to isolate and identify individual echoes 4 in the time domain that eliminate any noise therefrom and can be used to estimate distances from an object, in accordance with an embodiment. The face 9 region echoes 4 are a combination of individual echoes with different amplitudes and phases, thus isolating individual echoes in the time domain can be difficult due to noise. Hence, in accordance with an embodiment, the system measures the arrival time of each echo signal using a technique Frequency-Modulated Continuous Wave (FMCW) used in radars. In traditional FMCW, the speaker 101, 104 transmits continuous chirp signals with linear increasing frequency, from $f_{min}$ to $f_{max}$. In order to estimate the distance from an object, FMCW compares the frequency of the echo signal 4 to that of a reference signal using a technique called signal mixing, to determine the frequency shift Δf (for example as shown in FIG. 6), which is proportional to the distance. Thus, determining Δf provides the distance (for example, use Δf multiplying a constant coefficient).

In order to capture any minute surface geometries on the face 9, the FMCW distance measurement resolution is critical. The resolution in Δf is equal to the size of one bin in the fast Fourier transform (FFT) (for example, an algorithm that samples a signal over a period of time (or space) and divides it into its frequency components). These components are single sinusoidal oscillations at distinct frequencies each with their own amplitude and phase, which depends on the bandwidth used. In certain embodiments, a wide frequency of 16-22 KHz is implemented by the system, though it may be lightly audible to some users 3. As shown in FIG. 6, the FFT is taken over a duration of the face region with length T and hence the size of one FFT bin is 1/T. Given a minimum measurable frequency shift $\Delta f_{min}=1/T$, the minimum measurable distance resolution can be computed using the slope of signals, which is the total swept bandwidth B divided by the sweep time T. Thus the distance resolution $d_r$ is defined in accordance with equation (2) hereinbelow:

$$d_r = C\frac{TOF_{min}}{2} = C\frac{\Delta f_{min}}{2 \times \text{slope}} = \frac{C}{2B} \quad (2)$$

wherein C is the speed of sound. Assuming C=343 m/s at 20° Celsius, thus $d_r$ is $$\frac{343 \text{ m/s}}{2 \times 6000 \text{ s}^{-1}} = 2.88 \text{ cm.}$$

Note that this is the resolution at which the FMCW can separate mixed echoes 4. The resolution of a major echo location corresponds to one single acoustic sample, which is $$\frac{C}{2Fs} = 3.57 \text{ mm,}$$

wherein $F_s$=48 KHz is the recording sampling frequency. The spectrogram of the segmented face region echoes 4 after FMCW signal mixing is generated and is then used as an input for CNN training during the authentication phase 22, as described in connection with at least FIG. 2A hereinabove, and FIG. 7 as further described herein below.

FIG. 7 provides an illustration of an end-to-end hybrid machine-learning framework for authentication, which consists of two major components (shown in FIG. 7): a CNN based acoustic representation learning and an SVM based two-factor authentication phase.

Shown in FIG. 7 is a workflow associated with Acoustic Representation Learning.

Traditional acoustic features such as mel-frequency cepstral coefficients [32], chromagram, and spectral contrast have been proven to be effective in human speech recognition and voice-based authentication, but not in active acoustic sensing. Recently, deep learning approaches (especially CNNs) have been successful in a variety of challenging tasks such as image classification due to their powerful automatic feature extraction. In accordance with the embodiment shown in FIG. 7, a CNN based neural network is implemented which takes the spectrogram of the segmented signal as input, and trains it on a large data set collected from users. Such extracted features outperform all traditional features.

The authentication framework 120 shown in FIG. 7 consists of two major components: acoustic representation learning (as shown in references 122-128) and two-factor authentication 121.

In accordance with a customized CNN architecture designed for acoustic feature learning as shown in FIG. 6A, the system performs acoustic representation learning in accordance with the authentication model as illustrated in FIG. 7. The various CNN layers, layer type, output shape and parameter amounts are provided in FIG. 6A.

FIG. 7 illustrates two major sub-processes associated with the disclosed echo-signature based system: 1) CNN one-time off-line training on a PC 123; and 2) two-factor authentication 121 (including sub-processes: SVM training 129 and real-time prediction 131 on smartphone devices 7). In an embodiment, the system trains the CNN model for feature extraction using acoustic signals extracted from multiple users 128. The system filters out the acoustic signals with noise removal techniques 127, and next performs signal segmentation 126 in order to extract the face region segment 108. The face region segment 108 is the signal segment corresponding to the face area (whereby the face has a certain depth) as also shown and described in connection with FIG. 4. As depicted in FIG. 4, the face region segment comprises the face region echoes 108 (i.e. Face Region Echoes segment). Basically, in accordance with an embodiment, the face region segment includes a mixed combination of echoes from different face sub-areas. Such face areas can include the major echo portion 109 including a mix of echoes from the major surfaces (for example, cheek and forehead of the face). Other surfaces of the face (for example, nose and chin) arrive at different distances relative to the phone, but also produce echoes that arrive earlier or later than the major echo portion (shown as the dotted area in FIG. 4).

It is noted that the body portion in the above-embodiment is the facial area, but it is noted that the signal segmentation analysis (including without limitation any phases of user registration and/or user authentication phase) is applicable to the analysis of echo acoustic signals generated from the emissions of acoustic signals towards and reflected other unique body portions of the device user. These other unique body portions include but are not limited to for example, the hand, one or more fingers, neck or other generally visible body portion region comprising requisite depths for processing of echo-acoustic signals in a discrete epoch (for example discrete time period) therefrom (and further, without necessitating the requirement for the device user to remove any outerwear, or otherwise alter their current appearance, etc.).

The face region echoes represented as face region echoes segment 108 in FIG. 4, include all the respective echo signals and unique parameters (for example, amplitude, frequency values, time-axis values, density, etc.) that capture the full information associated with the face. Accurately segmenting the face region echoes is important to minimize disturbances from dynamic clutters surrounding and associated with the phone and reduce the data dimension for respective phases such as model training and performance.

Following this step of signal segmentation 126, during the process of acoustic representation learning in step 124, the system next uses the acoustic signal information including the face region echoes segment 108, and major echo segment 109 in order to train a CNN model as a feature extractor 125. It is further noted that in order to deal with any changes in phone holding poses, a Convolutional Neural Network (CNN) is trained to extract reliable acoustic features, and are further combined or fused with visual facial landmark locations or features, to feed a binary Support Vector Machine (SVM) classifier for final authentication during two-factor authentication 121.

This trained CNN model 125 is transmitted to the pre-trained CNN model 135. The system next extracts acoustic features from acoustic signals associated with a single user in step 139 during the two-factor authentication phase 121. The system next performs noise removal in step 138. Signal segmentation is next performed in step 136 in which the face region echoes are determined and correspond to the mix of echoes from the major surfaces of the face (for example, cheek and forehead) and may include other surfaces of the face (for example, nose and chin). This mix of echoes is used in the example embodiment, in generating a unique echo-signature print (for example similar to a user fingerprint) that is unique to the individual user 3 and reflects his unique identity to unlock the device 7 during the authentication phase 22. It is noted that in an example embodiment, the system can indeed augment the echo-signature print with additional projected pose(s) and/or looks of the user so that the user is not tied to just one pose/look in order to unlock the device 7.

The system in parallel will also detect the visual image of the user's 3 face 9 with the camera 103, which image is next used to detect facial landmarks and track facial position 137 from the camera preview 140. The system next processes a face alignment module as will be described in greater detail in connection with FIGS. 8A and 8B. The detected facial landmarks are mainly used for face alignment, which is important for robust acoustic sensing. While such facial landmarks are not intended to greatly improve recognition accuracy, the echo signature system and process in certain embodiments is an acoustic based approach that can incorporate more sophisticated facial features, for example, features from a deep neural network trained on a huge face image dataset. Those trained features would have a higher impact on performance improvement and reliability during the authentication phase 22.

Referring to FIG. 7A, shown is an illustration of an example overview of the workflow associated with generating a classifier 19 based on a sophisticated image-based CNN 16 and acoustics-based CNN 12, extracting acoustics features 13 and image features 17 in generating a classifier 19, in accordance with an embodiment of the disclosed echo-signature authentication system and method. In a contemplated embodiment, the reflected echo-acoustic signal 10 is processed and generated as a spectrogram representation 11. An acoustic CNN 12 is next generated that is related to the major echo segment 109 and direct path segment 107 of the face region echoes segment 108 as discussed hereinbelow in FIG. 4. The acoustic features 13 are next generated and fused 18 with image features 17 (generated in parallel track in steps 14-17). The image of the user 14 is obtained from the camera 103 and processed with respective face and landmarks tracking 15 as shown. An image CNN 16 is next generated. The sophisticated image features 17 are extracted from the image CNN 16 and fused with acoustic features 13. Once fused in step 18, a classifier is generated and is used during authentication of the user profile. Alternatively, sophisticated visual features from existing image face recognition solutions, such as a pre-trained face recognition neural network, may be generated and used as the image features for fusion with the acoustic features in generating the classifier.

The 2D coordinates of facial landmarks on the image are concatenated with the corresponding 128-dimensional CNN features as joint features in step 132 for the final authentication phase 22. The system next trains 129 an SVM model 130 in step 129 for each individual registered user 3, and uses the trained SVM model 130 to perform SVM prediction 131 for final authentication. The SVM training generally occurs just one in step 129 to train the SVM model 130, which is then used for SVM prediction 130. In particular, a Convolutional Neural Network (CNN) is trained to extract reliable acoustic features, which are further combined with visual facial landmark locations. Such joint feature representation 132 is, in turn transmitted to a binary Support Vector Machine (SVM) classifier 130 for final authentication. During such phase, the system fuses vision and acoustic features (as a joint features representation 132) to the SVM for training 129 and SVM prediction 131 for final authentication 22 of the user 3. During the authentication phase, the user just needs to hold the smartphone in front of the face for facial landmarks detection and acoustic sensing. The joint features are extracted and fed into the trained SVM classifier 130 during final authentication. Optionally, or in conjunction, the system can implement prior to or in parallel with authentication, an existing image-based face recognition system that can be integrated in the acoustic based echo-signature system for pre-screening.

The joint acoustic and visual features are used during two-factor authentication phase 121. The joint features phase 132 comprises the system processing using the received 2D coordinates associated with the facial landmarks on the image, which are concatenated with the corresponding 128-dimensional CNN features as the joint features 132 for final authentication 22. Both acoustic 133 and vision data 135 (for example, landmark coordinates) are collected simultaneously so that they are well-synchronized, ensuring the correspondence between facial landmarks distribution on the screen and relative device position, based on the received and processed acoustic echo signals. It is noted that the joint features, in particular facial geometry may be expressed as vectors. For example, during acoustic representation learning, the CNN may be trained for 50 classes and extract features that can be used to distinguish far more classes beyond those 50. In order to use the trained model as a general acoustic feature extractor, the last layer, which is used for final classification, may be removed. Thus, the remaining network outputs a 128-dimensional feature vector. The trained model can have 710539 parameters, and a size of 5.47 MB, that is portable enough for mobile devices for real-time processing and authentication. The proposed CNN is just one example of neural networks. It is not that other neural network architectures or variations of such network model may also be implemented. There exist even more sophisticated neural networks that are contemplated to be implemented in the disclosed system.

In certain disclosed embodiments, during classification, a one-class SVM is used and implements an unsupervised algorithm that learns a decision function for novelty detection: classifying new data as similar or different to the training set. The system detects the soft boundary of the training set so as to classify new samples as belonging to that set or not. Next, the system implements one-class SVM with radial basis function (RBF) kernel function for final classification. This allows the system to train 129 an SVM classifying model for a new user (or the same user in different configuration, for example, wearing new hats or glasses) on mobile devices 7 more easily, without requiring large amounts of training data as in CNN.

Ideally, a user should move the device at various relative positions to the face so as to collect sufficient training data during user registration. In practice, this imposes more efforts on the user, and it is more difficult to determine when sufficient data has been collected. Insufficient training data will cause higher false negatives (i.e., denial of the legitimate user). Thus, in certain embodiments, a data augmentation technique, populates the training data in step 130 by generating "synthesized" training samples based on facial landmark transformation and acoustic signal prediction in step 131. During this process, the system transforms measured facial landmarks and acoustic signals into synthesized ones, by assuming different poses of the phone and augments the data training set so it reflects a more robust representation of the user in different poses relative to the phone or device and/or altered appearance or visual looks (for example, evening look, make-up, hairstyle changed, sunglasses, eyeglasses, running headband, etc).

In accordance with an embodiment, two-factor one-pass authentication, the system implements a mode in which the user 3 must hold the phone properly to align his face within the valid area rectangle 151, 153, as shown on the screen 105 (referring to for example, further description hereinbelow in connection with FIGS. 8A & 9). As described hereinabove, both visual facial landmarks from camera images (including landmark coordinates) 134 and acoustic features 133 extracted by the trained CNN 135 are fed to the SVM Model 130 for recognition. However, such processing can comprise heavier computation, energy costs, but providing the highest security level suitable for scenarios such as phone unlock and/or account log in.

In certain embodiments or aspects, the acoustic-based facial echo-signature system implements a rectified linear unit (ReLU) as an activation function for convolutional layers, a popular choice especially for deep networks to speed up training. Two max pooling layers with a size of 2×2 are used to down-sample the input representations from their previous activation layers. This saves computational costs by reducing the number of parameters for both training and inference, which is critical when the CNN model is to be deployed on mobile devices. Dropout layers are added after each max-pooling layer to prevent over-fitting. Batch normalization normalizes the output of a previous layer by subtracting the batch mean and dividing by the batch standard deviation, which increase the stability of the neural network and speeds up training (~6× speedup in our case). Categorical cross-entropy is used as the loss function. The dense layer with softmax activation function outputs the probability of each class.

In an embodiment, the CNN is trained on a data set that contains acoustic samples from 50 classes (45 users and 5 non-human classes). Although the CNN is trained for 50 classes in certain example embodiments, the objective of the trained model is to extract features that can be used to distinguish far more classes beyond those 50. In order to implement the trained model as a general acoustic feature extractor, the last layer, which is used for final classification, is removed. Thus, the remaining network outputs a 128-dimensional feature vector. The trained model has 710539 parameters, and a size of 5.47 MB, which is portable enough for mobile devices for real-time inference.

Facial landmark detection 27 is another phase of user profile registration, phase 21, as previously described in connection with user profile registration 21 and user authentication 22 phases in connection with FIG. 2A.

More particularly, in accordance with an embodiment, during facial landmark detection 27, the disclosed acoustic-based facial echo-signature system, extracts lightweight visual features of the face in order to complement the extracted acoustic features and process both features during authentication 22. The visual techniques serve two purposes: 1) detecting facial landmarks which are later used as basic visual features; and 2) tracking the user's face 9 on the smartphone screen device 7 so that the user 3 can hold the device within some "valid" zone relative to the distance as illustrated for example by rectangles 151, 153 shown in FIG. 8A. The valid zone 151, 153 comprises distance and/or orientation relative to the user face 9 and smart device 7 for respective data collection and processing in user profile registration 21 and then user authentication 22.

Figure 8A:
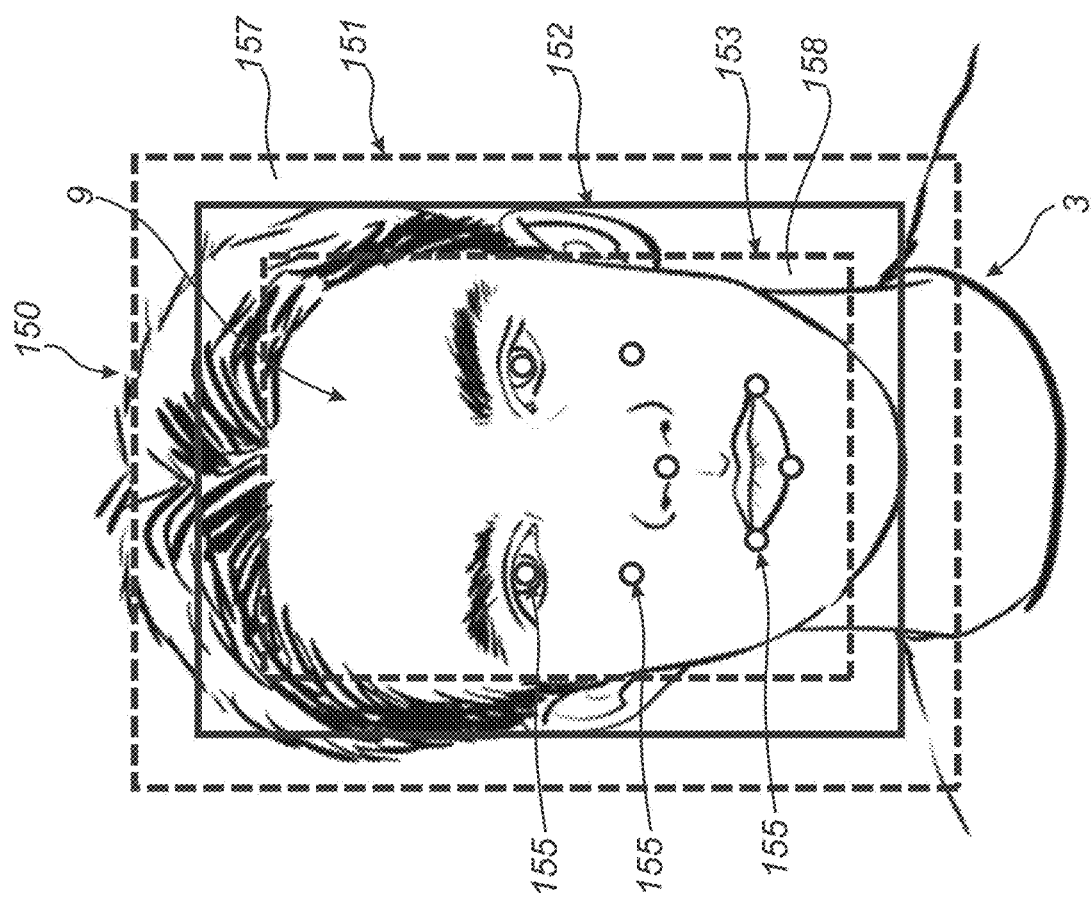
FIG. 8A provides an illustration of determining facial landmarks and respective face tracking, in accordance with an embodiment of the disclosed system and method.
Figure 8B:
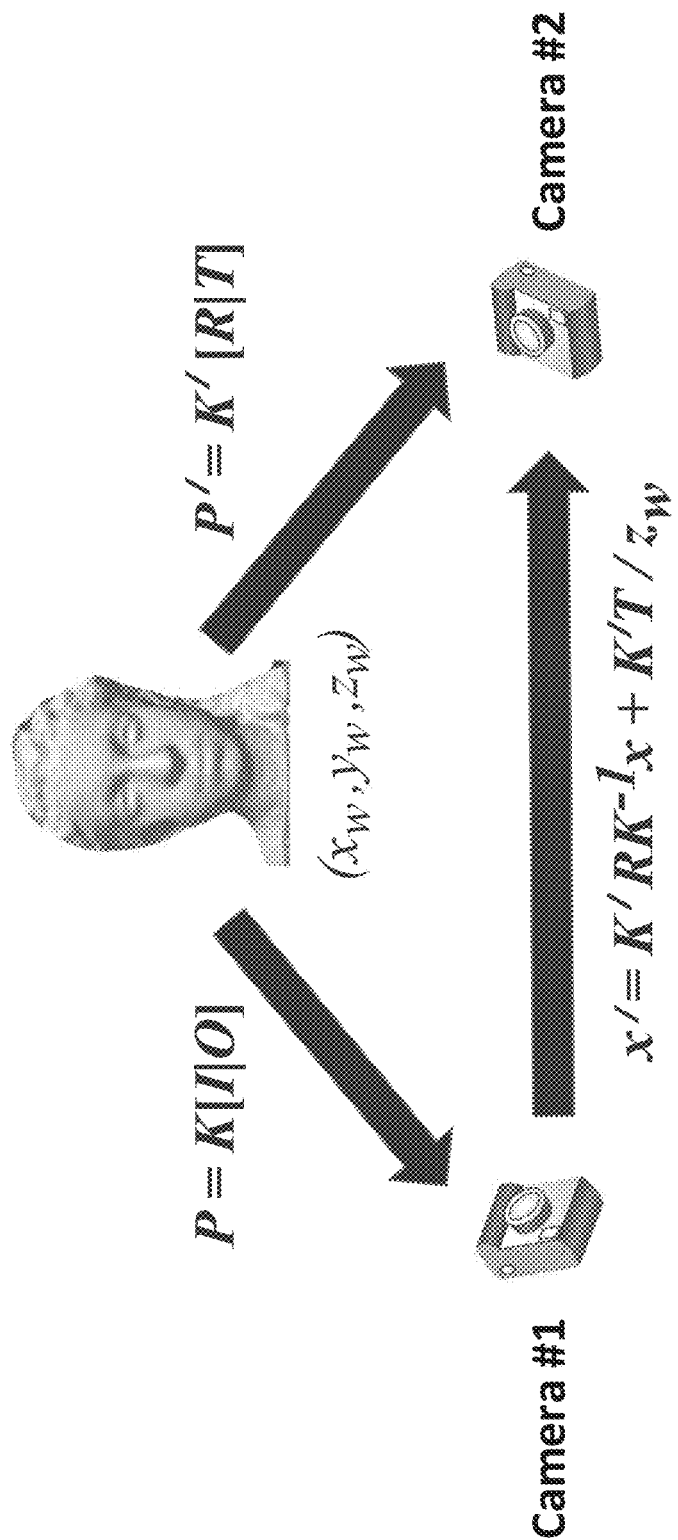
FIG. 8B provides an illustration of processing the detected facial landmarks and face tracking according to FIG. 8A, and determining respective landmark(s) transformation between camera positions from an original image to a shifted image, in accordance with an embodiment of the disclosed system and method. In addition, side-by-side illustrations of FIGS. 8A and 8B are also provided in the next drawing sheet for sake of further clarification of the illustrated subject matter.

FIG. 8A provides an illustration of determining facial landmarks and respective face tracking, in accordance with an embodiment of the disclosed system and method. FIG. 8B provides an illustration of processing the detected facial landmarks 155 and face tracking according to FIG. 8A, and determining respective landmark(s) transformation between camera positions, from an original image (camera #1) to a shifted image (camera #2) in accordance with an embodiment of the disclosed system and method.

In FIG. 8A, the system detects the 2D coordinates (for example (x,y) coordinate pairs) of respective facial landmarks 155 (e.g., corners/tips of eyes, center of eyes, nose, cheeks, and mouth, hairline, eyebrows) on the image as facial features. This detection can be accomplished for example, using the mobile vision API from Google® on an Android platform. The face is also tracked by at least one bounding rectangle that is formed about an area of the face 9. The respective landmarks 155 are associated with critical geometry features (eye, cheeks, nose, mouth, chin, forehead, eyebrows, hairline, etc.) of the face 9, and respective locations associated with the relative position and/or distance of the device 7 to the face 9. The system may implement the acoustic-based facial echo-signature system and method on multiple Android smartphones, including SamSung S7 Edge, SamSung S8, and HuaWei P9. FIG. 9 is an illustration of an example user interface 177 during implementation of authentication and/or registration selection in accordance with an embodiment. The prototype consists of three major modules: facial landmark detection, acoustic sensing, and machine learning pipeline for authentication. The "predict/train" switch 175 is used for authentication/registration selection.

During facial landmark detection shown in FIG. 8A, the system may implement such detection using, for example Google® mobile vision API for real-time facial landmark detection and face tracking. The frame rate in such example is set at 30 fps with a resolution of 1024×768.

Figure 9:
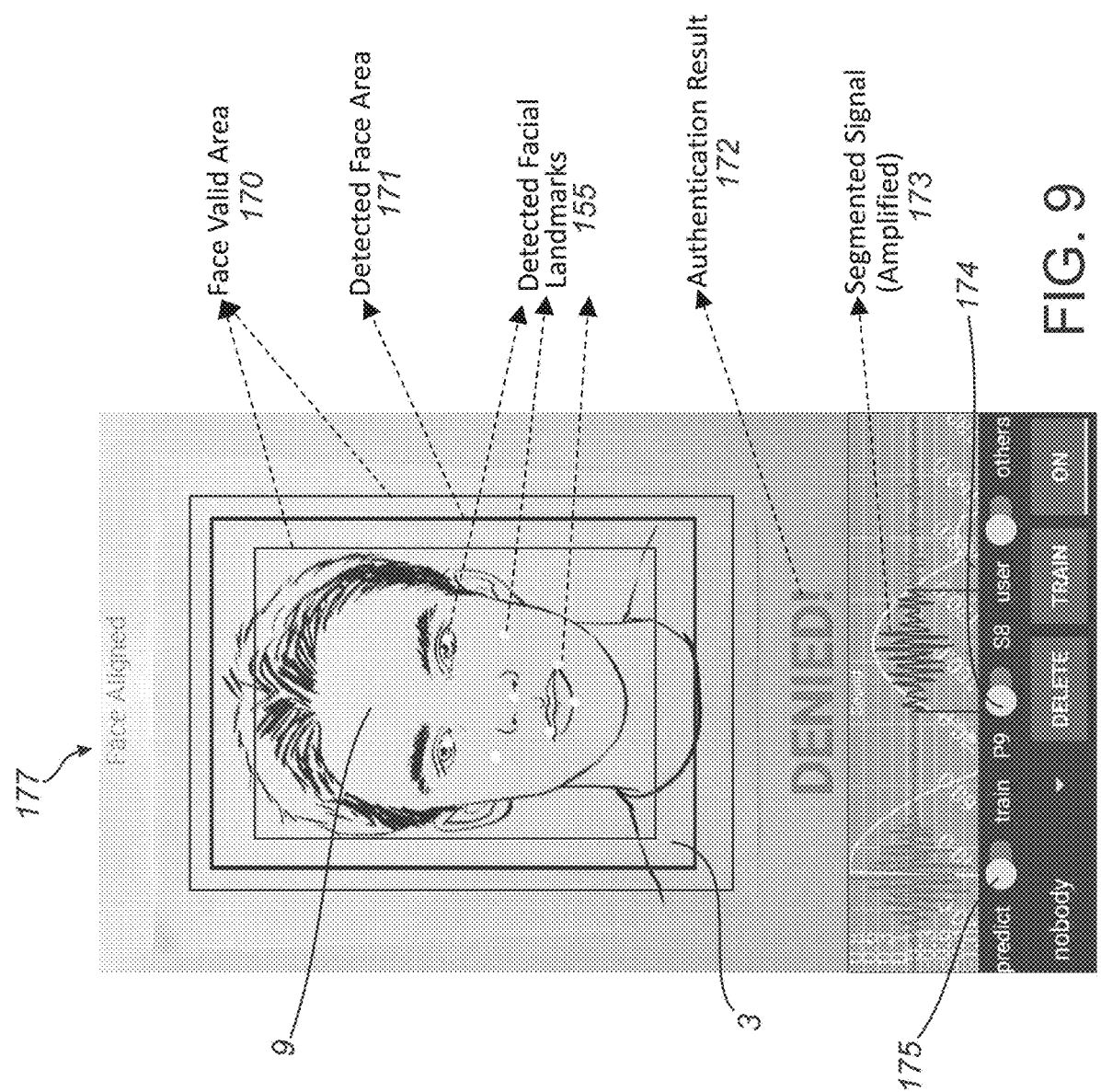
FIG. 9 provides an illustration of user authentication during an example implementation of an embodiment of the acoustic-based facial echo-signature system and method.

More particularly, shown in FIGS. 8A and 9, (including side-by-side versions as shown in the next drawing sheets of the Figures) include an image snapshot 150 of a middle (red) rectangle denoted as solid rectangle 152 that denotes the detected facial area 9 of the device user 3, and two (green) rectangles denoted as dotted line rectangles 153, 151 are considered the inner bounds 158 and outer bounds 157 of face valid areas 153, 151, which are fixed. In the example embodiment, the user face 9 is aligned within the two (green) dotted line rectangles 153, 151, during data collection and processing. Otherwise, if the face 9 fails to align within the boundaries of the two (green) dotted line rectangles 153, 151, the acoustic data are discarded. The landmark dots 155 as shown in FIG. 8A, and the lighter (yellow) dots 155 as shown in FIG. 9, are the system detected facial landmarks, that are saved as pixel coordinates, for example, generally in 2D (x,y) pixel coordinate pairs or alternatively 3D (x,y,z) coordinates.

The 2D coordinates of facial landmarks 155 on the image 150 are concatenated with the corresponding 128-dimensional CNN features as the joint features representation 132 for final authentication. Both acoustic and vision data are collected simultaneously so that they are well synchronized, which ensures correspondence between facial landmarks 155 distribution on the screen 105 and the relative device position, hence, the echo signals.

Data Augmentation is the process used by the acoustic-based facial echo-signature system for determining the landmark transformation between two or more camera positions as shown in FIG. 8B and side-by side views of both FIGS. 8A and 8B. Applying projective geometry, the projection matrix P of a 3D point $(x_w, y_w, z_w)$ in the world coordinate system onto the image plane in the camera 103 is modeled as Equations (3) and (4) listed herein below:

$$\lambda \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} x_w \\ y_w \\ z_w \\ 1 \end{bmatrix} \quad (3)$$

$$= K \cdot [R|T] \cdot \begin{bmatrix} x_w \\ y_w \\ z_w \\ 1 \end{bmatrix} = P \cdot \begin{bmatrix} x_w \\ y_w \\ z_w \\ 1 \end{bmatrix} \quad (4)$$

wherein $\lambda$ is the scale factor for homogeneous coordinates, (u,v) denotes its pixel coordinate on image, $$K = \begin{bmatrix} f_x & s & c_x \\ 0 & f_y & c_y \\ 0 & 0 & 1 \end{bmatrix}$$

is the intrinsic matrix of the camera, e.g., the focal length $f_x$ and $f_y$, skew s, and image center $(c_x, c_y)$ in pixels. [R|T] represents the extrinsic matrix of the camera, for example, the camera's pose in the world coordinate system, where R is a 3×3 matrix for its 3D orientation, and T is a 3×1 matrix for its 3D translation.

As shown in FIG. 8B, in the example embodiment, two cameras (camera 31 and camera #2) take images of the same object at different distances/angles (for example shown as camera #1 with respective transformed images, at camera #2), using equation (5) defined herein below as:

$$x=[u,v,1]^T \text{ and } x'=[u',v,1]^T \quad (5)$$

represents the object's pixel coordinates on two images. Without loss of generality, the first camera is defined as the world origin, thus the projection matrix of two cameras (camera #1 and camera #2 in FIG. 8B) are defined herein below by equation (6):

$$P=K[I|0], P'=K'[R|T] \quad (6)$$

wherein I is a 3×3 identity matrix.

Based on the above description of the projective geometry determination, the system transforms the landmark 155 pixel coordinates in one camera to those of any other or new camera pose(s) of the user 3, thus augmenting a particular training set for one or more users to cover multiple contemplated poses which is an automated formatting of a more robust training set associated with the user 3 echo-signature for that particular user 3 (rather than having the user 3 manually register with multiple poses) for later retrieval during authentication phase.

In accordance with an embodiment the system computes the landmark's world coordinates as shown in FIG. 8B. Given the projection matrix P and landmark pixel coordinates x of the first camera, the system can compute the landmark's world coordinates as $(x_w, y_w, z_w)^T = z_w K^{-1} x$, where $z_w$ is the distance of the landmark from camera center, which can be measured via acoustic sensing module.

The system next transforms the landmarks 155 onto new images. From the projection matrix of the new detected camera pose, the system can compute the corresponding pixel coordinates of the landmark by implementing the following equation defined as equation (7) herein below:

$$x' = K'RK^{-1}x + K'T/z_w \qquad (7)$$

This transform equation (7) consists of two parts: the first term depends on the image position alone, i.e., x, but not the landmark's depth $z_w$; the second term depends on the depth and takes into account the camera translation. In the case of pure translation (R=I, K'=K), equation (7) reduces to equation (8) provided herein below $$x' = x + KT/z_w. \qquad (8)$$

During the next step of authentication, Data augmentation, the echo-signature system and method, augments the created training set based on Equation (8) listed hereinabove. Prior to such data collection and related processing, the system first calibrates the camera with a benchmark paper printing of a chessboard with a known size. Hence, the system is able to identify and generate its intrinsic matrix $\underline{K}$. When a new camera pose is detected, the system identifies a value for θ, wherein θ=(T,φ), where T represents its 3D coordinates and φ=(α,β,γ) for any of its rotation angles along three axes of the smartphone. The system next transforms φ to the 3×3 rotation matrix R based on for example, using Rodrigues's Formula.

In Rodrigues's Formula, if v is a vector in $\mathbb{R}^3$ and k is a unit vector describing an axis of rotation about which v rotates by an angle θ according to the right hand rule, the Rodrigues formula for the rotated vector is defined by equation (9) as follows:

$$v_{rot} = v\cos\theta + (k \times v)\sin\theta + k(k \cdot v)(1 - \cos\theta). \qquad (9)$$

An alternative statement is to express the axis vector as a cross product a×b of any two nonzero vectors a and b which define the plane of rotation, and the sense of the angle θ being measured away from a and towards b. Defining α to denote the angle between these vectors, the two angles θ and α are not necessarily equal, but they are measured in the same sense. Then the unit axis vector can be determined according to the equation (10) herein below.

$$k = \frac{a \times b}{|a \times b|} = \frac{a \times b}{|a||b|\sin\alpha} \qquad (10)$$

The system next computes x' in Equation (8). Hence, as for a given new camera pose that is detected, the system identifies a value for θ, wherein θ=(T,φ), where T represents its 3D coordinates and φ=(α,β,γ) for any of its rotation angles along three axes of the smartphone. The system next transforms φ to the 3×3 rotation matrix R based on for example, the Rodrigues's Formula using at least equations (9) and (10) listed hereinabove.

Accordingly, following the sound propagation inverse-square law, the face region signal segment is shifted by the same distances, with the amplitude adjusted by the scale equal to the inverse of the square of distance. Due to the omni-directional property of a smartphone device 7 speaker(s) 101, 104 and microphone 8, a slight device 7 rotation from a fixed position causes negligible changes in the signal, thus only device position changes account for any such acoustic signal transform.

FIG. 9 provides an illustration of user authentication during an example implementation of an embodiment of the acoustic-based facial echo-signature system and method. An example implementation of the user screen or user interface 3 during user authentication as shown in FIG. 9, comprises implementation of three major modules: 1) facial landmark detection, 2) acoustic sensing, and 3) machine learning pipeline for authentication. For example, a "predict/train" 175 switch is used for authentication/registration selection as shown on the bottom of user interface screen 177 in FIG. 9. An example P9/S8 selection switch 174 is used for selecting microphones (top vs. bottom microphones). User interface buttons P9 and S8 174 are just opposite, thus requiring manual selection in the shown example.

In order to implement Facial Landmark Detection, the system may use for example, Google® mobile vision API for real-time facial landmark detection and face tracking. The frame rate is set at 30 fps with a resolution of 1024×768. The bounding middle (red) darker shaded rectangle 171 (FIG. 9) defines the detected face area 9 of the user 3 within the boundary lines of user interface 177. The two (green) lighter shaded rectangles 170 define the inner and outer bounds of face valid areas 170, which are fixed in the shown example embodiment. The user face 9 is aligned within the two (green) dotted rectangles 170 shown in FIG. 9 during user registration and/or user authentication and related data collection; otherwise, the acoustics data is discarded, as the system requires the user face 9 be aligned to perform authentication accurately. In this two-factor authentication mode, the user 3 must hold the phone 7 properly to align his face within the valid area rectangle 170 as shown on the screen 177 of FIG. 9. The lighter circled dots (yellow dots) 155 shown in FIG. 9 are the detected facial landmarks 155, which are identified and saved by the system processor as pixel coordinates.

During acoustic sensing in order to determine facial landmarks, the acoustic signal is pre-processed and displayed on the user-interface screen 177 in real-time, and the segmented signal from the face is highlighted in signal segment section 173 (in blue). The system can be amplified by 3× for better visualization after the direct path signal. The authentication result 172 in the shown example of FIG. 9, is denied and the user is denied access to the device 7.

During implementation of the Machine Learning Pipeline of acoustics representation 124, the system requires at least one CNN acoustic feature extractor and one SVM classifier. The system trains the CNN model off-line on a PC for example, with Intel i7-8700K CPU, 64 GB memory and GTX 1080 Ti GPU, Keras with Tensorflow backend used for CNN construction and training. The trained model is frozen and deployed on mobile devices. Using acoustic features extracted from the CNN, an SVM classifier using LibSVM is trained on mobile devices. Both CNN and SVM inferences are performed on mobile devices 7 in real-time.

Figure 2D:
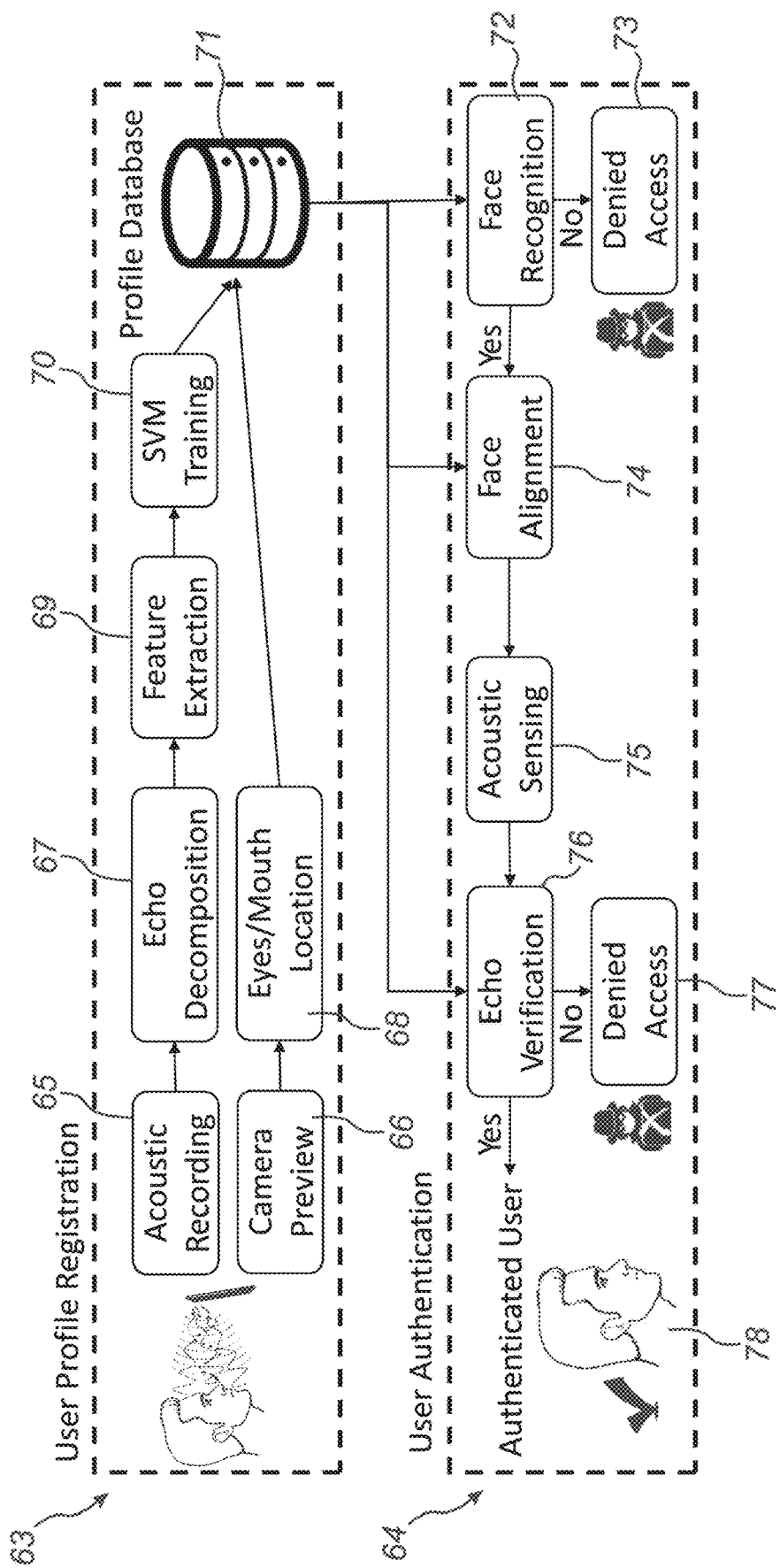
FIG. 2D provides another example overview of user profile registration and authentication using both image and acoustic features, in accordance with an embodiment of the disclosed system and method.

FIG. 2D provides another example overview of user profile registration and authentication using both image and acoustic features, in accordance with an embodiment of the disclosed system and method. In the example embodiment, the user profile registration state 63 comprises both acoustic recording 65 and camera preview 66 performed in parallel. The acoustic recording path 65 includes echo decomposition 67, features extraction 69, SVM training 70 and storage in respective database 71 for later retrieval during use authentication phase 64. The camera preview 66 path includes determination of location of eyes/mouth and other facial features in step 68. Next, the system proceeds to user authentication phase in step 64. In the example embodiment the system performing facial recognition in step 72 by accessing the training set associated with the user in profile database 71. If the facial recognition module fails to pass muster, the system denies access to the user in step 73. If the facial recognition module passes, the system proceeds to facial alignment in step 74, acoustic sensing in step 75, echo verification module in step 76. If the echo verification step fails, the user is denied access in step 77. If the echo verification module 76 passes, the system has authenticated the user 3 and allows access in step 78.

Figure 2E:
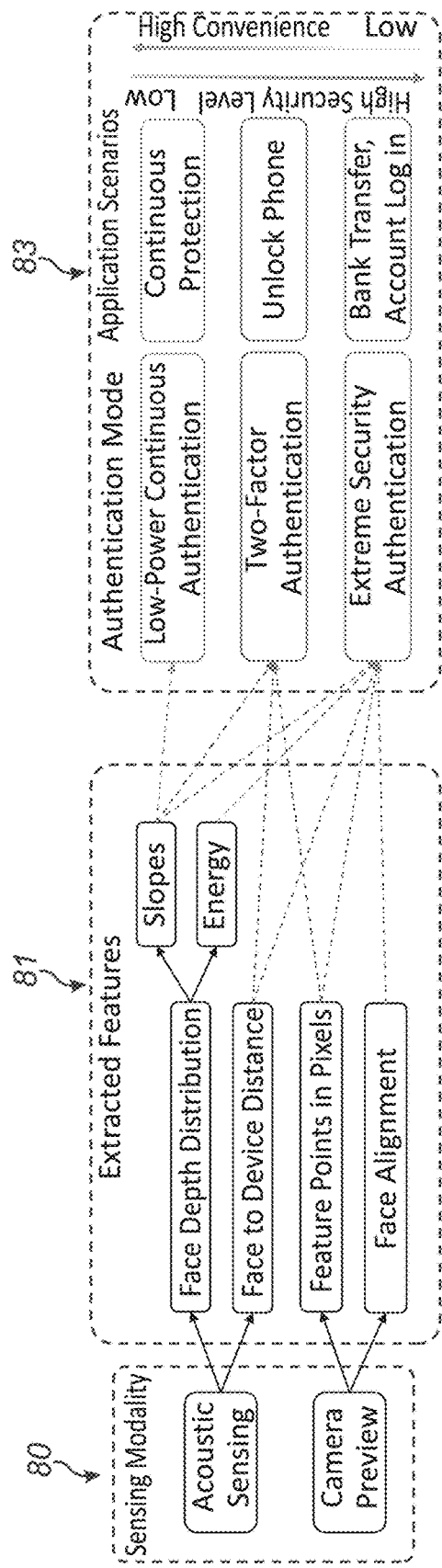
FIG. 2E provides an example overview of three authentication modes and related application scenarios, in accordance with an embodiment of the disclosed system and method.

FIG. 2E provides an example overview of three authentication modes and related application scenarios, in accordance with an embodiment of the disclosed system and method. Shown in FIG. 2E, are sensing modality 80 including acoustic sensing and camera preview stages. In stage 81, extracted features 81 module is performed including acoustic sensing module 80 that comprises face depth distribution (including respective slopes and energy levels) and face to device distance determination module. Also performed during stage 81 is camera preview sending modality 81 extraction of features including feature points in pixels and respective face alignment module. The authentication modes 83 as shown in FIG. 2E include: 1) low-power continuous authentication which provides continuous protection but low security level; 2) two-factor authentication for use in unlock phone application with mid-level security level and mid convenience factor with mid-level power usage; and 3) extreme security authentication mode which provides higher security level for bank transfer, accounts log-in, etc. but lower convenience in higher power usage.

Figure 2F:
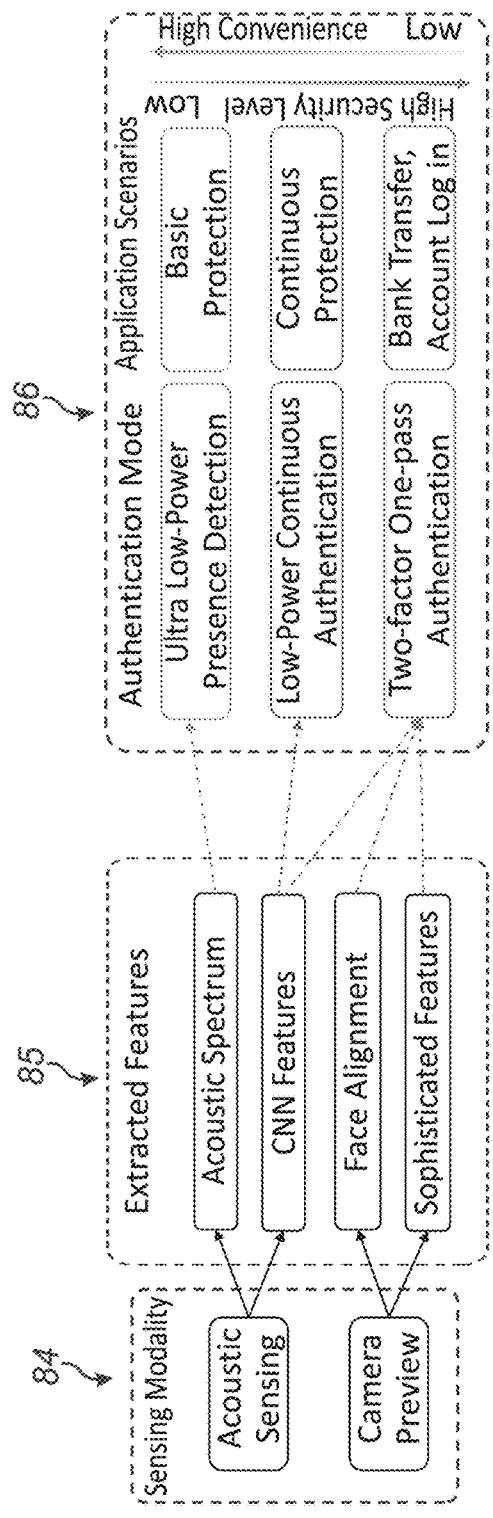
FIG. 2F provides an example overview of three authentication modes and related application scenarios, in accordance with an embodiment of the disclosed system and method.

FIG. 2F provides an example overview of three authentication modes and related application scenarios, in accordance with an embodiment of the disclosed system and method.

Referring to FIG. 2F, three authentication modes are contemplated in certain aspects or embodiments. The three authentication modes shown in dotted box 86 include: 1) two-factor one-pass authentication, 2) low-power continuous authentication and 3) ultra low-power presence detection, suitable for scenarios requiring progressively less security level but more user convenience and power efficiency. As shown in FIG. 2F, the system implements two phases sensing modality 84 with acoustic sensing and camera preview. During acoustic sensing the system is sensing echo-features for extraction for use in the extracted features phase 85. Specific to acoustic sensing, is implementation of the acoustic spectrum, for use during ultra low-power presence detection. CNN features extracted from acoustic sensing 84 are implemented during low-power continuous authentication. During camera preview during the sensing modality phase 84, face alignment and other sophisticated features 85 are extracted and implemented during two-factor one-pass authentication.

During two factor one-pass authentication mode, the user 3 must hold the phone 7 properly to align his face within the valid area rectangles 170 shown as dotted rectangles on the user interface screen 177 of FIG. 9. Both visual facial landmarks from camera images and acoustic features extracted by the trained CNN are transmitted to the SVM for recognition. This mode generally requires more computation, energy costs, but providing the highest security level suitable for scenarios such as phone unlock, account log in, other security-based features, etc. During such example mode, both acoustic and visual features are used. The extracted facial and acoustic features 132 are compared against pre-trained CNN features 135 that occurs during two-factor authentication 121, during real-time prediction 122, 131 using the SVM model 130, as shown for example in FIG. 7.

During low-power continuous authentication (LP mode), acoustic features extracted from the CNN are used in one-class SVM classification. This avoids power consuming cameras and heavier real-time video processing, but providing reduced security level suitable for scenarios such as continuous access/browse of private data in banking transactions after login is completed. The user needs to hold the phone in various position ranges similar to training data collection.

During ultra low-power presence detection (ULP mode), the system uses acoustic signals only and an SVM model to detect the presence of the user face. In order to minimize computation and energy costs, the spectrum of a set of samples (e.g., the first 80 after the direct path signal) instead of CNN extracted features are transmitted to the SVM. Data collected to train the SVM include positive samples while holding the device before the user's face, negative samples when putting the device on tables, in pockets, or holding it away from the user. This mode consumes the least power and is suitable for scenarios like auto screen lockup when the user face is not available or present.

The ultra low-power presence detection mode provides basic security protection but higher convenience in terms of lower power usage. The low-power continuous authentication mode provides continuous protection with a mid-level of security and mid-level convenience for power consumption. The two-factor one-pass authentication mode offers the highest security level and can be implemented for bank transfers, account log-ins but offering lower convenience since higher power consumption is required for such two-factor one-pass authentication mode.

Turning to FIG. 10A, disclosed is an example flowchart delineating the steps of acoustic signal pre-processing. In the first step of the process, step 180, the echo-signature processing device performs background noise removal. The raw signal undergoes noise removal in step 180 by transmission through a band-pass filter, for example, a 16-22 KHz Butterworth band-pass filter. Hence, while being transmitted through the band-pass filter, the filter passes frequencies of the raw signal falling within a certain range and rejects (or attenuates) frequencies that fall outside that range.

Next, the filtered signal undergoes signal segmentation in step 181. Each of the steps of the process of signal segmentation 181 are further detailed in the flowchart of FIG. 10B which illustrates each of steps performed by the echo-signature processor and/or engine 381 (referring to FIG. 24) during signal segmentation 181. Next in FIG. 10A, the system performs segmented signal analysis in step 182, which is delineated in greater detail in the steps illustrated by FIG. 10C.

In accordance with an embodiment, signal segmentation shown in step 181, and further delineated in FIG. 10B, overall comprises two steps in identifying and extracting the face region segment: 1) locating the direct path segment in raw recordings (see for example, FIG. 4 direct path segment of the signal between times 0-1.3 ms); and 2) locating the major echo (see circled portion in FIG. 4 located between approximately 1.8 ms-2.9 ms). Hence, the face region segment is determined after the direct path segment is determined as shown for example, in FIG. 4.

More particularly, locating the direct path 185 is based generally on the assumption that a constant gap exists between the emitting and recording signals. Hence, the direct path can be located after that constant gap. However, both emitting and recording signals are processed multiple layers of hardware and software processing in the operating system (OS) of the device, many of which have unpredictable, varying delays. Thus, locating the direct path using a constant delay is generally considered unreliable.

Instead, since the direct path signal usually has the highest amplitude, using cross-correlation to locate it is more reliable. Occasional offsets of direct path signal still occur after cross-correlation, due to ambiguities from comparable peak values in the cross-correlation result. However, in certain embodiments, the following techniques are employed to compensate for such ambiguities.

One such technique is Template Signal Calibration 183. Due to the hardware (speaker/microphone) imperfections, the received sound signal is usually slightly different from the designed emitting signal. In order to obtain an accurate "template" signal for cross-correlation, the system performs both emitting and recording in a quiet environment, so that the direct path signal can be reliably detected and saved as a calibrated template for future cross-correlation.

Another such technique is Signal Fine-tuning 184. In addition to the Hanning window, the system manually tunes the signal slightly to generate the key peaks/valleys more prominently, which reduces cross-correlation ambiguity significantly. Only the central portion (for example, 15 samples) of the template signal is used in cross-correlation, further enhancing resilience to residual noises.

Next, the system performs signal segmentation by locating the Major Echo segment portion 187 of the acoustic signal. In certain aspects or embodiments, the system is able to locate the major echo is by identifying the cross-correlation peak location 185 corresponding to a typical phone holding distance (e.g., 25-50 cm) located in the example embodiment, after the direct path 107 location. However, human face echoes can be so weak that echoes from larger obstacles faraway can have comparable amplitudes. This makes the estimation unstable and leads to occasional location "jumping", thus outliers may arise in distance measurements. The dotted line in FIG. 5 shows the distance measurements from the acoustic while the device is moving back and forth from the face. Some outliers 110 form due to such "jumping" outliers 110. In order to solve this issue, a vision-aided major echo locating technique comprising two steps, is implemented as described herein below.

In FIG. 10B, the next step, Vision Measurement Calibration 186 is performed. Using the camera image projection principle, the closer the device 7 to the face 9, the larger the image and larger the distances between any respective facial landmarks 155, and vice versa. Thus, the distance from face 9 to device 7 dv can be formulated as $$d_v = \tau \cdot \frac{1}{d_p},$$

where $d_p$ is the distance between two facial landmarks and $\tau$ is an unknown scale factor specific to the user. In certain embodiments, the system selects $d_p$ as the pixel distance between two eye landmarks as they are more widely separated and can be detected reliably. In order to estimate the scale factor T, the system processor calculates $\tau_i$ for each pair-wise $d'_{v,i}$ from acoustic distance measurement and $d_{p,i}$ in pixels. In order to eliminate errors caused by acoustic distance measurement outliers, the system determines the major cluster of $\{\tau_i\}$ using for example, a density-based spatial clustering algorithm as DBSCAN.

DBSCAN is designed to discover arbitrary-shaped clusters in any database D and at the same time can distinguish noise points. More specifically, DBSCAN accepts a radius value Eps($\varepsilon$) based on a user defined distance measure and a value MinPts for the number of minimal points that should occur within Eps radius. Some concepts and terms to explain the DBSCAN algorithm can be defined as follows:

The problem of clustering can be defined as follows:

A database of n data objects D={o1, o2, . . . , on} is provided. The process of partitioning D into C={$C_1$, $C_2$, . . . , $C_k$} based on a certain similarity measure is called clustering, $C_i$'s are called clusters, wherein $C_i$ is defined by equation (11) provided below:

$$C_i \subseteq D, (i=1,2,\ldots,k), \cap_{i=1}^k C_i = \emptyset \text{ and } \cup_{i=1}^k C_i = D \quad \text{equation (11)}$$

Clustering algorithms can be categorized into five main definitions as further provided herein below as:

Definition 1 (Neighborhood). It is determined by a distance function (e.g., Manhattan Distance, Euclidean Distance) for two points p and q, denoted by dist(p,q).

Definition 2 (Eps-neighborhood). The Eps-neighborhood of a point p is defined by {q∈D|dist(p,q)≤Eps}.

Definition 3 (Core object). A core object refers to such point that its neighborhood of a given radius (Eps) has to contain at least a minimum number (MinPts) of other points (for example, as illustrated in FIG. 10G).

Definition 4 (Directly density-reachable). An object p is directly density-reachable from the object q if p is within the Eps-neighborhood of q, and q is a core object.

Definition 5 (Density-reachable). An object p is density-reachable from the object q with respect to Eps and MinPts if there is a chain of objects $p_1, \ldots, p_n$, $p_1=q$ and $p_n=q$ such that $p_{i+1}$ is directly density-reachable from $p_i$ with respect to Eps and MinPts, for 1≤i≤n, $p_i \in D$ (for example, as illustrated in FIG. 10E).

Definition 6 (Density-connected). An object p is density-connected to object q with respect to Eps and MinPts if there is an object o∈D such that both p and q are density-reachable from o with respect to Eps and MinPts (for example, as illustrated in FIG. 10E).

Definition 7 (Density-based cluster). A cluster C is a non-empty subset of D satisfying the following "maximality" and "connectivity" requirements:

(1) $\forall_{p,q}$: if q∈C and p is density-reachable from q with respect to Eps and MinPts, then p∈C.

(2) $\forall_{p,q} \in C$: p is density-connected to q with respect to Eps and MinPts.

Definition 8 (Border object). An object p is a border object if it is not a core object but density-reachable from another core object. The algorithm starts with the first point p in database D, and retrieves all neighbors of point p within Eps distance. If the total number of these neighbors is greater than MinPts—if p is a core object—a new cluster is created. The point p and its neighbors, are assigned into this new cluster. Then, the system iteratively collects the neighbors within Eps distance from the core points. The process is repeated until all of the points have been processed.

In accordance with yet another embodiment, the system implements ST-DBSCAN algorithm for density-based spatial clustering process, which requires four parameters Eps1, Eps2, MinPts, and $\Delta_\in$ because of the extensions to avoid problems of identifying adjacent clusters. Eps1 is the distance parameter for spatial attributes (latitude and longitude). Eps2 is the distance parameter for non-spatial attributes. A distance metric such as Euclidean, Manhattan or Minkowski Distance Metric can be used for Eps1 and Eps2. MinPts is the minimum number of points within Eps1 and Eps2 distance of a point. If a region is dense, then it should contain more points than MinPts value. A simple heuristic is presented which is effective in many cases to determine the parameters Eps and MinPts. The heuristic suggests MinPts≈ln(n) where n is the size of the database and Eps must be picked depending on the value of MinPts. The first step of the heuristic method is to determine the distances to the k-nearest neighbors for each object, where k is equal to MinPts. Then these k-distance values should be sorted in descending order. Then we should determine the threshold point which is the first "valley" of the sorted graph. Eps is selected to be a value less than the distance defined by the first valley. The last parameter $\Delta_\in$ is used to prevent the discovering of combined clusters because of the little differences in non-spatial values of the neighboring locations. The algorithm starts with the first point p in database D and retrieves all points density-reachable from p with respect to Eps1 and Eps2. If p is a core object (see for example, Definition 3 as defined hereinabove), a cluster is formed. If p is a border object (see for example Definition 8 as defined hereinabove, no points are density-reachable from p and the algorithm visits the next point of the database. The process is repeated until all of the points have been processed.

The algorithm begins with the first point in database D(i). After processing this point, it selects the next point in D. If the selected object does not belong to any cluster, Retrieve_Neighbors function is called. A call of Retrieve_Neighbors (object,Eps1,Eps2) returns the objects that have a distance less than Eps1 and Eps2 parameters to the selected object. In other words, Retrieve_Neighbors function retrieves all objects density-reachable (for example, definition 5) from the selected object with respect to Eps1, Eps2, and MinPts. The result set forms the Eps-Neighborhood (see for example definition 2) of the selected object. Retrieve_Neighbours (object, Eps1, Eps2) equals to the intersection of Retrieve_Neighbours(object, Eps1) and Retrieve_Neighbours(object, Eps2). If the total number of returned points in Eps-Neighborhood is smaller than MinPts input, the object is assigned as noise. This means that the selected point has not enough neighbors to be clustered. The points which have been marked to be noise may be changed later, if they are not directly density-reachable (see for example definition 4) but they are density-reachable (see for example definition 6) from some other point of the database. This occurs for border points of a cluster. If the selected point has enough neighbors within Eps1 and Eps2 distances—if it is a core object—then a new cluster is constructed. Then all directly density-reachable neighbors of this core object are also marked as new cluster label. Then the algorithm iteratively collects density-reachable objects from this core object by using a stack. The stack is necessary to find density-reachable objects from directly density-reachable objects. If the object is not marked as noise or it is not in a cluster, and the difference between the average value of the cluster and the new coming value is smaller than $\Delta_\in$, it is placed into the current cluster. After processing the selected point, the algorithm selects the next point in D and algorithm continues iteratively until all of the points have been processed.

When the algorithm searches the neighbors of any object by using Retrieve_Neighbors function, it takes into consideration both spatial and temporal neighborhoods. The non-spatial value of an object such as a temperature value is compared with the non-spatial values of spatial neighbors and also with the values of temporal neighbors (previous day in the same year, next day in the same year, and the same day in other years). By this way, non-spatial, spatial and temporal characteristics of data are used in clustering when the algorithm is applied on the table, which contains temporal values, beside spatial and non-spatial values. If two clusters C1 and C2 are very close to each other, a point p may belong to both, C1 and C2. In this case, the point p must be a border point in both C1 and C2. The algorithm assigns point p to the cluster discovered first.

Referring back to FIG. 5, following the implementation of the density-based spatial clustering algorithm, (for example DBSCAN described hereinabove) the system next leverages linear regression to find the best τ that minimizes the offset between: d'$_v$ and $$\tau \cdot \frac{1}{d_p}.$$

FIG. 5 illustrates that outliers 110 are removed in vision calibrated acoustic distance measurements 111,113 by implementation one of the above-described density-based spatial clustering algorithms in order to eliminate any errors.

Referring to FIG. 10B, during the signal segmentation 181 portion of acoustic signal pre-processing as shown in FIG. 10A, the system in certain embodiments, begins the process of signal segmentation by performing template signal calibration 183. This process is generally performed once initially. Due to imperfections in hardware of the device 7 (for example, speaker/microphone(s)), the received sound signal is generally slightly different from the designed emitting signal. In order to achieve an accurate "template" signal for cross-correlation, emitting and recording is performed in a quiet environment, so that the direct path signal 185 can be reliably detected and saved as a calibrated template for future cross-correlation.

The process next proceeds to fine-tune the received signal in step 184. As in template signal calibration 183, generally this process occurs initially once during acoustic signal pre-processing, particularly during signal segmentation 181. The system may apply Hanning window to the received signal, or perform "hanning of the signal" by applying the Hann window to it.

The Hann function is typically used as a window function in digital signal processing and used to select a subset of a series of samples in order to perform a Fourier transform or other type of calculations. The Hann window is a linear combination of modulated rectangular windows defined generally by $w_r=1_{[0,N-1]}$. The advantage of the Hann window is very low aliasing, and the tradeoff slightly is a decreased resolution (widening of the main lobe).

Alternatively, the system may implement manual tuning of the signal slightly to make the key peaks/valleys more prominent, which reduces cross-correlation ambiguity significantly. Generally, only the central portion (for example, 15 samples) of the template signal is used in cross-correlation, further enhancing resilience to residual noises.

In certain embodiments or aspects, the process of signal segmentation as provided in FIG. 10B, implements generally, two major steps (among other calibration and fine tuning steps, for examples as illustrated in steps 183-184 and 186) in order to extract the face region segment, specifically 1) locating the direct path segment in raw recordings as shown in step 185; and then locating the major echo in step 187 in order to identify the face region segment.

In the embodiment of FIG. 10B, in order find the major echo in a continuous recorded echo signal(s) 4, the system has to identify and use a "reference location" in the received echo signal 4. The direct path signal 107 is detected and used as the "reference location" as shown in step 185 of FIG. 10B. The direct path signal 107 generally refers to the acoustic signal 4 that travels from speaker (for example 101, 104) to the microphone 100 directly, which is considered the initial first "copy" of the echo signal recorded after an emission. After the direct path signal 107 is identified in step 185, its respective location refers to the time delay between direct path signal 107 and the major echo 109 along the x axis, which is a time element variable (referring to FIG. 4).

More particularly, the system next identifies the location of the major echo 109 on the time axis (as shown in FIG. 4) in step 187 of FIG. 10B. The system next determines the time delay between direct path signal 107 and the major echo 109. Given the time delay, the system can estimate the sound traveling distance, which is the time×speed of sound divided by 2 (as sound travels back and forth).

In particular, when the system is determining the location of the Direct Path signal 107 in step 185, a simple assumption that can be made, is that a constant gap exists between the emitting and recording signals, thus the direct path signal 107 can be generally located after that constant gap. However, both emitting and recording must go through multiple layers of hardware and software processing in the operating systems of a device 7, many of which exhibit unpredictable, varying delays. Thus locating the direct path 107 using a constant delay alone may prove to be unreliable.

Instead, since the direct path signal 107 usually is the signal that exhibits the highest amplitude, hence, using cross-correlation to locate the direct path signal 107, is more reliable. As described hereinabove, occasional offsets of the direct path signal 107 still happen after cross-correlation, due to ambiguities from comparable peak values in the cross-correlation result. Therefore, in order to enhance the stability of the direct path signal 107 after cross-correlation in step 185, the system implements the following steps: 1) template signal calibration in step 183 and 2) signal fine tuning in step 184, as described hereinabove. Generally since the received sound signal is usually slightly different from the designed emitting signal, in order to obtain an accurate "template" signal for cross-correlation, the system initially performs emitting and recording in a quiet environment (or other method to block out environmental noise or perform noise removal functions while emitting and recording the acoustic signals), so that the direct path signal 107 can be more reliably detected and saved as a calibrated template for future cross-correlation.

Hence, in step 185, the system uses template signal calibration 183 and signal-fine tuning techniques in step 184 in order to cross-correlate the signal after noise removal and find peak(s) of the correlated signal so the system can more easily and accurately detect the direct path signal 107 in step 185. So, as an example, the first copy of the recorded signal after an emission from the microphone to the facial area 9 of the user 3 is identified as a direct path signal 107, as shown in FIG. 4.

It is noted that in step 186 the system performs vision measurement calibration in step 186, by detecting facial landmarks 155 of the user 3, for example, two eye locations or corners of the mouth of the user 3. In the example embodiment, such vision measurement calibration 186 is used for the respective estimation of various facial geometries of the face 9 of user 3, in particular specific facial geometry of the user's 3 facial features and respective contours 10 of such facial features. The closer or further the user face 9 is from the camera, the system is able to estimate the distance of the user from the phone and determine which segment of sound or acoustic signal is emitted from the face 9 (rather than emitted from another object). Hence, a linear relationship is implemented to determine the scale value between pixel distances and real distances of the face 9 to the device 7, as described further herein below. This estimate can provide an estimation of the echo signal location, which helps in reducing outliers when cross-correlation is implemented.

Other contemplated geometries can be detected, for example, using the geometry of the hand of the user 3 may be another contemplated implementation instead of the user's 3 face 9.

As described in the foregoing, the step of vision measurement calibration 186 in the example embodiment, applies the camera image projection principle. The closer the device 7 is to the face 9 of the user 3, the larger the image and larger the distances between facial landmarks 113, and vice versa. Thus, the distance from face to device $d_v$ is formulated as:

$$d_v = \tau \cdot \frac{1}{d_p},$$

where $d_p$ is the distance between two facial landmarks and $\tau$ is an unknown scale factor specific to the user.

The system selects $d_p$ as the pixel distance between two landmarks, for example, two eye landmarks 155 as they are generally more widely separated and can be detected reliably. The system may detect the medial relationship and also use distance of the face 9 to camera 103 between the two landmark eye points 155. In order to estimate the scale factor $\tau$, the system calculates $\tau_i$ for each pair-wise $d'_{v,i}$ from the acoustic distance measurement and $d_{p,i}$ in pixels. In order to eliminate errors caused by acoustic distance measurement outliers 110 as shown in FIG. 5, the system first locates and identifies the major cluster of $\{\tau_i\}$ using a density-based spatial clustering algorithm, for example, DBSCAN, as described hereinabove. The system next leverages linear regression to find the best $\tau$ that minimizes the offset between $d'_v$ and $$\tau \frac{1}{d_p}.$$

FIG. 5 shows that outliers 110 are removed in the signals associated with vision calibrated acoustic distance measurements.

Next during step 187 of FIG. 10B, the system performs the step of locating the major echo using cross-correlation and vision measurement. In locating the major echo 187, the system determines the major echo 109 emanating from the face 9 by extracting the most information regarding the 3D geometry of the face and its respective landmarks 155. In the example embodiment, a straightforward way for locating the major echo 109 among all face region echoes 108, is to identify the cross-correlation peak location corresponding to typical phone holding distance (e.g., 25-50 cm) after the location of the direct path signal 107. However, human face echoes can be so weak that echoes from larger obstacles located further away can have comparable amplitudes. This can render the estimation unstable and may lead to occasional location "jumping", thus outliers 110 can arise in such distance measurements. The dotted line in FIG. 5 shows the distance measurements from acoustic signals while the device is moving back and forth from the face. As described hereinabove, some outliers 110 due to such "jumping" outliers are shown in FIG. 5. Hence, a vision-aided major echo locating technique may be implemented in order to reduce such outliers 110.

A vision-aided major echo locating technique can be used for estimation of 3D geometry of a user's face 9. However, vision based distance measurement while generally stable, cannot capture the error caused by rotations of smartphone or user's face 9. Thus, the vision calibrated distance measurement is used to narrow down the major echo searching range and reduce outliers 110 that are detected from the major echo signal 109. In the example embodiment, the system implements cross-correlation to find the exact major peak location within the relevant range of detected acoustic signals. Note that if the user face rotates to extreme angles, facial landmark 155 detection may not work properly.

In particular, during face region echoes detection in step 188, it is noted that the human face has a 3D surface and therefore a certain depth with respect to its various features, for example, eyes, nose, cheekbones, mouth, etc. The tip of the nose is generally the closest to the device 7, while the ears are generally the farthest, for a user 3 with an average human face 9. It is noted that an average human face generally has seven (7) depths from which the acoustic signals echo, for example, the nose, face, cheeks, forehead, eyes, chin, mouth. The nose is considered closest to the camera 103, while the face is furthest from the camera. The cheeks are generally considered about mid-way distance. Hence, the face is considered a 3D object with generally seven (7) depths. It is noted that these seven (7) depths and how the acoustic signals echo from each of the facial contours are all processed by the system to generate a unique echo-signature associated with an individual user 3 that has registered with the system via the user profile registration 21 process, as shown in FIG. 2A.

In theory, when detecting the major echo signal 109, the system assumes the face 9 is a flat surface. Hence, in order to cover the depth of the face, and detect all acoustic signals associated with the landmarks 155 (for training the CNN or SVM model dataset, and later implement respective acoustic and/or visual feature extraction for later user authentication), the system extends the major face signal to, for example, its two endpoints (for example, the line delineated by the two ears of a user 3). The system can extend 10 sample points before and after the major echo segment 109 in order to determine the echoes for the entire face region 108, thus allowing a depth range of approximately ~7 cm.

Hence during step 188, during the detection and identification of face region echoes 108 (which is used in generating the echo-signature associated with the user 3), since the depth of human face is limited, the system in the example embodiment, extends some time sample points, for example 10 sample points (as shown located on the time x-axis of FIG. 4), both before and after the major echo segment 109, in order to cover the entire face region (for example, allowing a depth range of ~7 cm).

More particularly, the acoustic signal is generally sampled at 48 KHz, which means 48,000 sampling points for each second. As shown in FIG. 4, the major echo 109 and face region echoes 108 comprise time sampling points (along the x-axis). The major echo 109 is a portion of and part of the larger face region echoes segment 108. The ten sampling points correspond to the difference between major echo and face region echoes. There are 10 sampling points before the major echo 109, and another 10 sampling points extended after the major echo 109, in the disclosed embodiment. These face region echoes 108 associated with their respective x-axis time sampling points, can be later used as input(s) for any implemented machine models (for example, CNN) used during user authentication 121 as illustrated for example, in FIG. 7.

Proceeding to step 188 in FIG. 10B, the system next determines the face region echoes 108 (as shown in FIG. 4) which acoustic signals are associated with generating a unique echo-signature print or representation or pattern associated with identifying and authenticating a particular user 3 (analogous to a fingerprint of the particular user 3). The system first located the direct path signal 107 by identifying maximum peak amplitude as described hereinabove with respect to step 185. Next the system identifies the location of the major echo segment 109 by using cross-correlation and vision measurements as described hereinabove with respect to step 187. Next, the system can now determine the face region echoes by essentially extending the major echo 109 sampling points as described hereinabove. The direct path signal 107 needs to be identified generally first, in the example embodiment of FIG. 10B, so that the system can determine and identify the major echo 109, which generally follows the direct path signal 107 as shown, along the x-axis of FIG. 4.

Figures 10C, 10D:
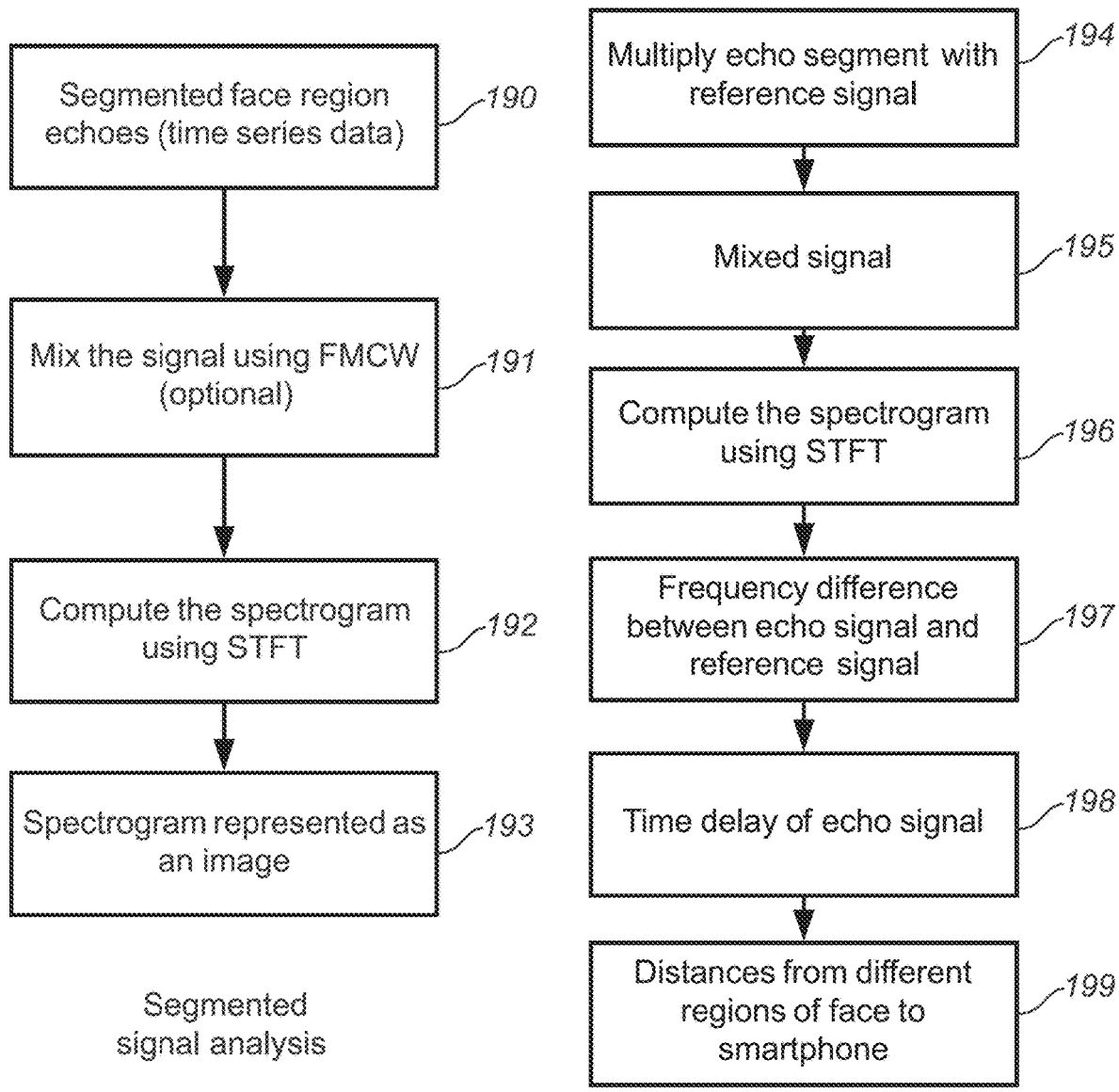
FIG. 10C illustrates a flowchart of any exemplary method of segmented signal analysis which forms part of the method of acoustic signal pre-processing illustrated in FIG. 10A, in accordance with an embodiment of the disclosed system and method.
FIG. 10D illustrates a flowchart of any exemplary method of FMCW which is an optional embodiment for performing a portion of segmented signal analysis as illustrated in FIG. 10C, in accordance with an embodiment of the disclosed system and method.
Figure 10E:
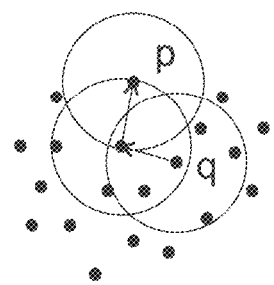
FIG. 10E illustrates a portion of an example algorithm for clustering spatial-temporal data used to eliminate errors in acoustic distance measurement outliers, specifically density-reachable from element q, in accordance with an embodiment of the disclosed system and method.
Figure 10F:
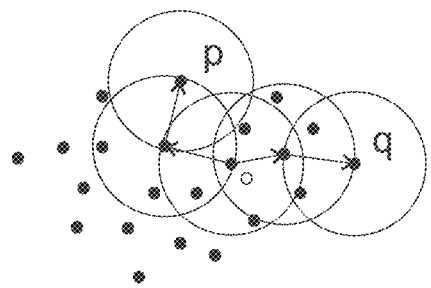
FIG. 10F illustrates a portion of an example algorithm for clustering spatial-temporal data used to eliminate errors in acoustic distance measurement outliers, specifically p and q density-connected to each other by element o, in accordance with an embodiment of the disclosed system and method.
Figure 10G:
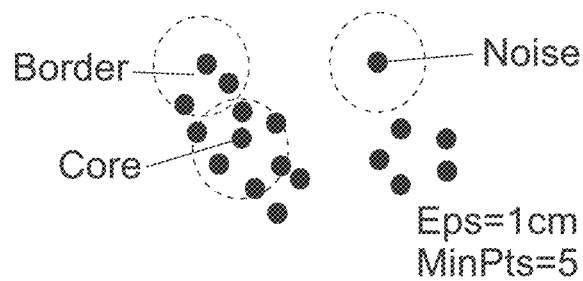
FIG. 10G illustrates a portion of an example algorithm for clustering spatial-temporal data used to eliminate errors in acoustic distance measurement outliers, specifically core object in its neighborhood of a given radius and relative to border object and noise, in accordance with an embodiment of the disclosed system and method.

FIG. 10C illustrates a flowchart of any exemplary method of segmented signal analysis, which forms part of the method of acoustic signal pre-processing illustrated in FIG. 10A, in accordance with an embodiment of the disclosed system and method.

Beginning with step 190 of FIG. 10C, the segmented face region echoes 108 are associated with time series data comprising numerous sampling points per second, as shown on the x-axis of FIG. 4. Because the face region echoes comprise a combination of individual echoes with different amplitudes and phases, isolating such individual echoes in the time domain can be onerous due to noise. The echoes from the face reflect the unique ridges and sub-ridges from a unique face 9. The echoes from the face is a compilation associated with many small surface areas and their respective geometries. The face region echoes segment is a quantified reconstructed value of complex and continuous acoustic signals as emitted from unique surface geometries of the user's face 9.

In the disclosed embodiment, the system measures the arrival time of each echo by a technique Frequency-Modulated Continuous Wave (FMCW) technique used in radars. In traditional FMCW, the speaker transmits continuous chirp signals with linear increasing frequency, from $f_{min}$ to $f_{max}$. In order to estimate the distance from an object, FMCW compares the frequency of the echo signal to that of a reference signal using a technique called signal mixing, as shown in step 191, to find the frequency shift $\Delta f$ (as shown in FIG. 6), which is proportional to the distance. Thus finding Δf provides the distance (i.e., Δf multiplying a constant coefficient).

In order to capture minute surface geometries on the face 9, the FMCW distance measurement resolution is critical. The resolution in Δf is equal to the size of one bin in the fast Fourier transform (FFT), which depends on the bandwidth used. The fast Fourier transform (FFT) is an example algorithm implemented by the embodiment, which samples a signal over a period of time (or space) and divides the signal into its frequency components.

Hence, the system implements a wide frequency for example, of 16-22 KHz, though it may be lightly audible to some users. As shown in FIG. 6, the FFT is taken over a duration of the face region with length T, and hence the size of one FFT bin is 1/T. Given a minimum measurable frequency shift $\Delta f_{min}=1/T$, the minimum measurable distance resolution can be computed using the slope of signals (shown in FIG. 6), which is the total swept bandwidth B divided by the sweep time T. Thus the distance resolution is defined by equation (2):

$$d_r = C\frac{TOF_{min}}{2} = C\frac{\Delta f_{min}}{2 \times \text{slope}} = \frac{C}{2B} \quad (2)$$

wherein C is the speed of sound. Assuming C=343 m/s at 20° Celsius, thus $d_r$ is $$\frac{343 \text{ m/s}}{2 \times 6000 \text{ s}^{-1}} = 2.88 \text{ cm.}$$

Note that this is the resolution at which FMCW can separate mixed echoes. The resolution of the major echo location corresponds to one single acoustic sample, which is $$\frac{C}{2Fs} = 3.7 \text{ mm,}$$

where $F_s$=KHz is the recording sampling frequency.

The short-time Fourier transform (STFT), is a Fourier-related transform used in the example embodiment, to determine the sinusoidal frequency and phase content of local sections of the signal as it changes over time. In practice, the procedure for computing STFTs is to divide a longer time signal into shorter segments of equal length and then compute the Fourier transform separately on each shorter segment. This reveals the Fourier spectrum on each shorter segment. One then usually plots the changing spectra as a function of time. Hence, a spectrogram is represented as an image or visual representation of the spectrum of the frequencies of the acoustic face region echoes signal as it varies over time. Spectrograms are sometimes referred to as sonographs, voiceprints, or voice-grams. When the data is represented in a 3D plot, they may also be referred to as waterfall representations.

The spectrogram of the segmented face region echoes is thus generated using STFT in step 192, after performing FMCW signal mixing in step 191. The spectrogram is then used as input for CNN training during authentication 121, as described hereinabove with respect to FIG. 7. Essentially the spectrogram of the segmented face region echoes signal is a conversion of time-series data to a spectrogram. The 2D values, including frequency and temporal data associated with respective amplitude values, are generated as an image representation. The spectrogram image of the segmented face region echoes is next transmitted to a CNN classifier to extract features associated with the acoustic face region and in particular, surface geometries are captured by the segmented face region echoes, during such segmented signal analysis. The CNN is classified in particular to train a model.

FIG. 10D illustrates a flowchart of any exemplary method of FMCW which is an optional embodiment for performing a portion of segmented signal analysis as illustrated in FIG. 10C, in accordance with an embodiment of the disclosed system and method. In step 194, the echo-signature processor multiplies the echo signal segment with a reference signal (for example as shown in FIG. 6. The signal is mixed in step 195, similar to the mixing of the segmented face region echoes signal step 191 shown in FIG. 10C using FMCW technique described hereinabove. The spectrogram using STFT is generated in step 196. The frequency difference between the echo signal and the reference signal is determined in step 197, similar to steps described hereinabove, also with respect to FIG. 6. As shown in FIG. 6, the time delay of the echo signal can be computed in step 198 using the data from the slopes, time data on x-axis and frequency values of the y-axis.

In particular, the system measures the arrival time of each echo by a Frequency-Modulated Continuous Wave (FMCW) technique used in radars. In traditional FMCW, the speaker transmits continuous chirp signals with linear increasing frequency, from $f_{min}$ to $f_{max}$. In order to estimate the distance from an object, FMCW compares the frequency of the echo signal to that of a reference signal using a technique called signal mixing, as shown in step 195, to find the frequency shift Δf and Δt (as illustrated in FIG. 6), which is proportional to the distance. Thus finding Δf provides the distance (i.e., Δf multiplying a constant coefficient). Given a minimum measurable frequency shift $\Delta f_{min}=1/T$, the minimum measurable distance resolution can be computed using the slope of signals (referring to slopes shown in FIG. 6), which is the total swept bandwidth B divided by the sweep time T (and implementing equation (2) listed hereinabove).

Hence, the computed time delay is used to compute the respective distance between the face 9 and the device 7 relative to different regions of the face as shown in step 199, of FIG. 10D.

Figures 11A, 11B:
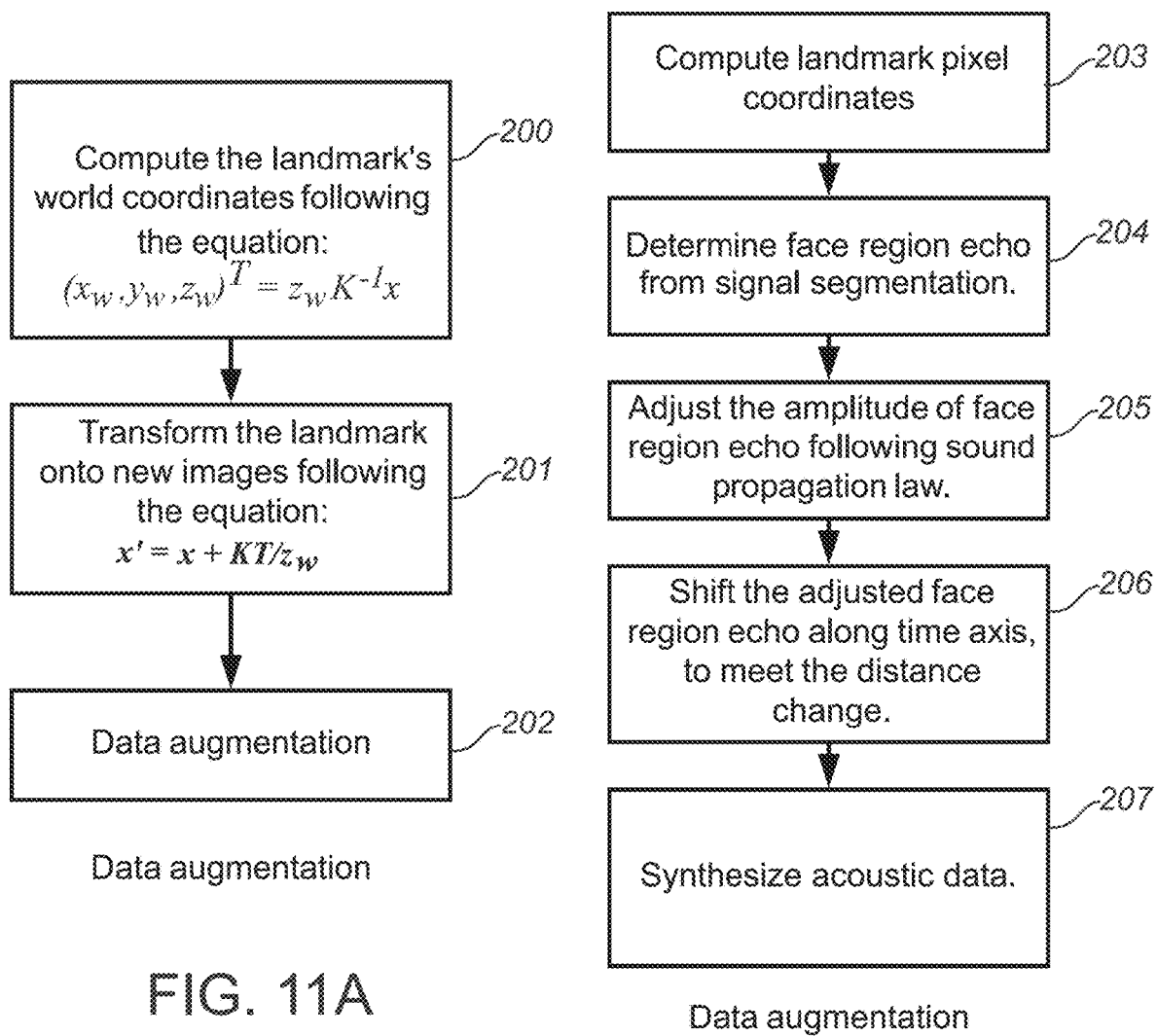
FIG. 11A illustrates a flowchart of an exemplary method of performing data augmentation in order to detect facial landmarks, as part of the process of authentication as shown in example FIG. 7, in accordance with an embodiment of the disclosed system and method.
FIG. 11B illustrates a flowchart of an exemplary method of performing data augmentation as shown in FIG. 11A, in order to detect facial landmarks and facial tracking, as part of the process of user authentication as shown in example FIG. 7, in accordance with an embodiment of the disclosed system and method.

FIG. 11A illustrates a flowchart of an exemplary method of performing data augmentation in order to detect facial landmarks, as part of the process of authentication as shown in example FIG. 7, in accordance with an embodiment of the disclosed system and method. In the example embodiment, FIG. 11A detects the landmark's world coordinates which are the coordinates of the location of the face in space.

The system implements a classification system to train a data set for later retrieval and use during authentication phase 22, 121 (referring to FIGS. 2A and 7). For example, one-class SVM is an unsupervised algorithm that learns a decision function for novelty detection and performs classifying new data as similar or different to the training set. Such one-class SVM detects the soft boundary of the training set so it can classify new samples as belonging to that set or not. In an embodiment, the system implements one-class SVM with radial basis function (RBF) kernel function for final classification. This permits the system to train an SVM classifying model for a new user 3 (or the same user in a different or modified look for example, wearing new hats or glasses) on mobile devices without requiring large amounts of training data as in CNN.

In order to more ideally accomplish this training set, a user 3 should move the device at various relative positions to the face 9 so as to collect sufficient training data during user registration 21. In practice, this imposes more efforts on the user, and it is difficult for the system to determine when sufficient data has been collected to capture such different user modes or looks. Insufficient training data will in effect, generate higher false negatives (i.e., denial of the legitimate user). Thus, in an embodiment shown in FIGS. 11A and 11B, the system performs a data augmentation technique, which populates the training data by generating "synthesized" training samples based on facial landmark transformation and acoustic signal prediction. During this augmentation process, the system transforms measured facial landmarks and acoustic signals into synthesized ones, by assuming (synthesizing) different poses of the phone 7. Hence, the system augments the training data set in order to accomplish the estimation of the projected images for a different camera pose of the user 9. In addition, the system estimate the respective coordinates of the facial landmarks 155, assuming that the camera poses indeed change.

Beginning with step 200, in FIG. 11A, the echo-signature processor or other contemplated computing device(s), echo-signature system engine, or processor(s), compute(s) the landmark's world coordinates by implementing equation (3 and (4) defined herein below (and previously described in connection with element 134, shown in FIG. 7).

The system first detects the 2D coordinates of facial landmarks 155 (for example, corners/tips of eyes, nose and mouth) on the image as features, using for example, the mobile vision API from Google on Android platform as shown in FIG. 8A. The face 9 shown in FIG. 8A is tracked by one or more bounding rectangles 151, 153 shown as dotted lines. These landmarks describe critical geometry features on the face 9, and their locations associated with the relative position from the device 7 to the face 9. The landmark coordinates in the example embodiment shown in step 200 of FIG. 11A, comprises computing synthesized facial landmark coordinates. Facial landmark coordinates of the image are detected from one particular viewing angle and distance. The system then leverages certain transformation functions to compute the landmark coordinates 155 assuming the image is taken from a different angle or distance.

More particularly, data augmentation 202 in FIG. 11A is the process used by the acoustic-based facial echo-signature system for determining the landmark transformation 201 between two or more camera positions as shown for example, in FIG. 8B and side-by side views of both FIGS. 8A and 8B. Applying projective geometry, the projection matrix P of a 3D point $(x_w, y_w, z_w)$ in the world coordinate system onto the image plane in the camera 103 is modeled as Equations (3) and (4) listed herein below:

$$\lambda \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} x_w \\ y_w \\ z_w \\ 1 \end{bmatrix} \quad (3)$$

$$= K \cdot [R|T] \cdot \begin{bmatrix} x_w \\ y_w \\ z_w \\ 1 \end{bmatrix} = P \cdot \begin{bmatrix} x_w \\ y_w \\ z_w \\ 1 \end{bmatrix} \quad (4)$$

where λ is the scale factor for homogeneous coordinates, (u,v) denotes its pixel coordinate on image, $$K = \begin{bmatrix} f_x & s & c_x \\ 0 & f_y & c_y \\ 0 & 0 & 1 \end{bmatrix}$$

is the intrinsic matrix of the camera, e.g., the focal length $f_x$ and $f_y$, skew s, and image center $(c_x, c_y)$ in pixels. [R|T] represents the extrinsic matrix of the camera, for example, the camera's pose in the world coordinate system, where R is a 3×3 matrix for its 3D orientation, and τ is a 3×1 matrix for its 3D translation.

As shown in FIG. 8B, in the example embodiment, two cameras take images of the same object at different distances/angles, and equation (5) defined herein below as:

$$x=[u,v,1]^T \text{ and } x'=[u',v',1]^T \quad (5)$$

represents the object's pixel coordinates on two images. Without loss of generality, the first camera is defined as the world origin, thus the projection matrix of two cameras are defined herein below by equation (6):

$$P=K[I|0], P'=K'[R|T] \quad (6)$$

wherein I is a 3×3 identity matrix.

Based on the above description of the projective geometry determination, the system transforms the landmark 155 pixel coordinates in one camera to those of any new camera pose of the user 3, thus augmenting a particular training set for one or more users.

In accordance with an embodiment, the system computes the landmark's world coordinates as shown in FIG. 8B. Given the projection matrix P and landmark pixel coordinates x of the first camera, the system can compute the landmark's world coordinates as $(x_w, y_w, z_w)^T = z_w K^{-1} x$, where $z_w$ is the distance of the landmark from camera center, which can be measured via acoustic sensing module.

The system next transforms the landmarks 155 onto new images as shown in step 201 of FIG. 11A. From the projection matrix of the new detected camera pose, the system can compute the corresponding pixel coordinates of the landmark by implementing the following equation defined as equation (7) herein below:

$$x'=K'RK^{-1}x+K'T/z_w \quad (7)$$

This transform equation (7) consists of two parts: the first term depends on the image position alone, i.e., x, but not the landmark's depth $z_w$; the second term depends on the depth and takes into account the camera translation. In the case of pure translation (R=I, K'=K), equation (7) reduces to equation (8) provided herein below $$x'=x+KT/z_w. \quad (8)$$

Proceeding to step 201 of FIG. 11A, the system processor transforms the landmark coordinates onto new image(s) by implementation of equation (8) defined above.

During the next step of authentication, data augmentation shown as step 202 in FIG. 11A, the echo-signature system and method, augments the created training set based on equation (8) listed hereinabove. Prior to such data collection and related processing, in the example embodiment of FIG. 11A, the system first calibrates the camera with a benchmark paper printing of a chessboard with a known size. Hence, the system is able to identify and generate its intrinsic matrix K. When a new camera pose is detected, the system identifies a value for θ, wherein θ=(T,φ), where T represents its 3D coordinates and φ=(α,β,γ) for any of its rotation angles along three axes of the smartphone. The system next transforms φ to the 3×3 rotation matrix R based on for example, using Rodrigues's Formula.

Accordingly, following the sound propagation inverse-square law, the face region signal segment is shifted by the same distances, with the amplitude adjusted by the scale equal to the inverse of the square of distance. Due to the omni-directional property of smartphone speaker and microphone, a slight device rotation at a fixed position causes negligible changes in the signal, thus only device position change accounts for acoustic signal transform.

During such data augmentation process shown in FIG. 11A, the system extracts lightweight visual features of the face to compliment acoustic ones. The vision techniques serve two purposes: 1) the detection of facial landmarks 155 which are later used as basic visual features; and 2) tracking the user's face 9 on the smartphone screen 105 so that the user can hold the device 7 within some "valid" zone (thus, distance and orientation are accounted for) during data collection and processing of visual and/or acoustics data for later authentication of the user 9.

Hence, the system augments the training data set in order to accomplish the estimation of the projected images for a different camera pose of the user 9. In addition, the system estimates the respective coordinates of the facial landmarks 155, assuming that the camera poses indeed change.

FIG. 11B illustrates a flowchart of an exemplary method of performing data augmentation as shown in FIG. 11A, in order to detect facial landmarks and facial tracking, as part of the process of user authentication as shown in example FIG. 7, in accordance with an embodiment of the disclosed system and method. FIG. 11B is implemented in an example embodiment in which the acoustic signal changes when the phone 7 is held at different angles or distances from the device 7. Data augmentation is implemented during the process shown in FIG. 11B in order to compute both facial landmarks and the acoustic signal, assuming that the device 7 is held at different angles and distances. This data augmentation technique creates a more robust training model so that the system can detect the user 3 face 9 in varied poses and/or even in different configurations (for example, wearing a hat, sunglasses, wearing make-up/more make-up, different hairstyle, with hair tied back, with full-bodied hairstyle, day/evening looks, etc.).

Beginning with step 203, in FIG. 11B, the echo-signature processor or other contemplated computing device(s), engine or processor(s), compute(s) the landmark pixel coordinates by implementing equation (3) and (4) defined herein below (and previously described in connection with element 134, shown in FIG. 7 and steps 200-201 in FIG. 11A). It is noted that determining the pixel coordinates in step 203, determines the location of the face 9 relative to the display or user interface 105 (rather than determine landmark coordinates of the face 9 relative to space).

The landmark coordinates in the example embodiment of step 203, comprises computing synthesized facial landmark pixel coordinates (relative to the user interface or display screen 105 of the device 7). Facial landmark pixel coordinates of the image are detected from one particular viewing angle and distance. The system then leverages certain transformation functions to compute the landmark coordinates 155 assuming the image is taken from a different angle or distance. In addition, FIG. 11B determines how the acoustic signal changes if the device 7 is situated at different angles or distances from the user face 9. Data augmentation is the process of computing both facial landmarks and acoustics signals, assuming the phone is situated at a different angle and distance from the user face 9, by synthesizing images from such different viewing angles and distances, such that the user 3 does not have to provide multiple poses during user profile registration phase 21. Hence, the process of data augmentation shown in FIG. 11B, facilitates augmenting the training data set so that multiple poses or images of the user in different poses and/or configuration or looks, are processed and become part of the trained set for later user authentication.

In an embodiment, the system first detects the 2D coordinates of facial landmarks (for example, corners/tips of eyes, nose and mouth) on the image as features, using for example, the mobile vision API from Google on Android platform, as shown in FIG. 8A. The face 9 shown in FIG. 8A is tracked by one or more bounding rectangles 151, 153 shown as dotted lines. These landmarks describe critical geometry features on the face 9, and their locations associated with the relative position from the device 7 to the face 9.

As described hereinabove, data augmentation 202 in FIG. 11A is the process used by the acoustic-based facial echo-signature system for determining the landmark transformation 201 between two or more camera positions as shown for example, in FIG. 8B and side-by side views of both FIGS. 8A and 8B. Applying projective geometry, the projection matrix P of a 3D point $(x_w, y_w, z_w)$ in the world coordinate system onto the image plane in the camera 103 is modeled as Equations (3) and (4) listed herein below:

$$\lambda \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} x_w \\ y_w \\ z_w \\ 1 \end{bmatrix} \quad (3)$$

$$= K \cdot [R|T] \cdot \begin{bmatrix} x_w \\ y_w \\ z_w \\ 1 \end{bmatrix} = P \cdot \begin{bmatrix} x_w \\ y_w \\ z_w \\ 1 \end{bmatrix} \quad (4)$$

wherein λ is the scale factor for homogeneous coordinates, (u,v) denotes its pixel coordinate on image, $$K = \begin{bmatrix} f_x & s & c_x \\ 0 & f_y & c_y \\ 0 & 0 & 1 \end{bmatrix}$$

is the intrinsic matrix of the camera, e.g., the focal length $f_x$ and $f_y$, skew s, and image center $(c_x, c_y)$ in pixels. [R|T] represents the extrinsic matrix of the camera, for example, the camera's pose in the world coordinate system, where R is a 3×3 matrix for its 3D orientation, and τ is a 3×1 matrix for its 3D translation.

As shown in FIG. 8B, in the example embodiment, two cameras take images of the same object at different distances/angles, and equation (5) defined herein below as:

$$x = [u, v, 1]^T \text{ and } x' = [u', v', 1]^T \quad (5)$$

where x represents the object's pixel coordinates on two images. Without loss of generality, the first camera is defined as the world origin, thus the projection matrix of two cameras are defined herein below by equation (6):

$$P = K[I|0], P' = K'[R|T] \quad (6)$$

wherein I is a 3×3 identity matrix.

Based on the above description of the projective geometry determination, the system transforms the landmark 155 pixel coordinates in one camera to those of any new camera pose of the user 3, thus augmenting a particular training set for one or more users.

In accordance with an embodiment, the system in step 203 of FIG. 11B computes the landmark's pixel coordinates (as also shown in FIG. 8B). The landmark coordinates in the example embodiment of step 203, comprises computing synthesized facial landmark coordinates. Facial landmark coordinates of the image are detected from one particular viewing angle and distance. The system then leverages certain transformation functions to compute the landmark coordinates 155 assuming the image is taken from a different angle or distance.

Given the projection matrix P and landmark pixel coordinates x of the first camera, the system can compute the landmark's world coordinates as $(x_w, y_w, z_w)^T = z_w K^{-1} x$, where $z_w$ is the distance of the landmark from camera center, which can be measured via acoustic sensing module.

The system next transforms the landmarks 155 onto new images as shown in step 201 of FIG. 11A. From the projection matrix of the new detected camera pose, the system can compute the corresponding pixel coordinates of the landmark by implementing the following equation defined as equation (7) herein below:

$$x' = K'RK^{-1}x + K'T/z_w \qquad (7)$$

This transform equation (7) consists of two parts: the first term depends on the image position alone, i.e., x, but not the landmark's depth $z_w$; the second term depends on the depth and takes into account the camera translation. In the case of pure translation (R=I, K'=K), equation (7) reduces to equation (8) provided herein below $$x' = x + KT/z_w. \qquad (8)$$

Proceeding to step 201 of FIG. 11A, the system processor transforms the landmark coordinates onto new image(s) by implementation of equation (8) defined above. The landmark coordinates in the example embodiment of step 203, comprises computing synthesized facial landmark coordinates. Facial landmark coordinates of the image are detected from one particular viewing angle and distance. The system then leverages certain transformation functions to compute the landmark coordinates 155 assuming the image is taken from a different angle or distance.

During the next step of authentication, data augmentation shown as step 202 in FIG. 11A, the echo-signature system and method, augments the created training set based on equation (8) listed hereinabove. Prior to such data collection and related processing, in the example embodiment of FIG. 11A, the system first calibrates the camera with a benchmark paper printing of a chessboard calibration which is a standard technique in computer vision with a known size. Hence, the system is able to identify and generate its intrinsic matrix K. When a new camera pose is detected, the system identifies a value for θ, wherein θ=(T,φ), where T represents its 3D coordinates and $\phi=(\alpha,\beta,\gamma)$ for any of its rotation angles along three axes of the smartphone. The system next transforms φ to the 3×3 rotation matrix R based on for example, using Rodrigues's Formula.

The system is able to computer such landmark pixel coordinates in step 203 by synthesizing image data of the user 3 as detected from different viewing angles and distances from the user 3. Hence, the system is able to generate synthesized images of the user 3, and computes the respective synthesized facial landmark coordinates taken from different particular viewing angles and distances. The system then leverages the transformation functions described hereinabove to compute the respective landmark coordinates, using the synthesized images that assume images of the user taken from different angles and/or distances from the device camera 103.

Referring to FIG. 11B step 204, the system next determines face region echoes 108 by implementation of the process of signal segmentation (as previously described in FIG. 10B).

In particular, step 204 of FIG. 11B comprises determining the face region echo segment 109 (as shown for example, in FIG. 4) by application of the method of signal segmentation including template signal calibration (step 183), signal fine-tuning (step 184), locating the direct path signal using cross-correlation 185, vision measurement calibration (step 186), locating the major echo using cross-correlation and vision measurement (step 187) and finally determining face regions echoes 188 (as previously described hereinabove in connection with FIG. 10B). The face regions echoes 188 are then used in generating a unique echo-signature print, representation or pattern associated with identifying and authenticating a particular user 3 (analogous to a fingerprint of the particular user 3).

More particularly, during signal segmentation 109 process as illustrated in example FIG. 10B, the direct path segment 107 is first determined and then the major echo segment 109 (located within the face region echoes segment 108) can next be determined, as shown in FIG. 4. In particular, during such signal segmentation process and referring back to FIG. 10B, during the signal segmentation 181 portion of acoustic signal pre-processing as shown in FIG. 10A, the system in certain embodiments, begins the process by performing template signal calibration 183. This process is generally performed once initially. Due to imperfections in hardware of the device 7 (for example, speaker/microphone(s)), the received sound signal is generally slightly different from the designed emitting signal. In order to achieve an accurate "template" signal for cross-correlation, emitting and recording is performed in a quiet environment, so that the direct path signal 185 can be reliably detected and saved as a calibrated template for future cross-correlation.

The process next proceeds to fine-tune the received signal in step 184. As in template signal calibration 183, generally this process occurs initially once during acoustic signal pre-processing, particularly during signal segmentation 181. The system may apply Hanning window to the received signal, or perform "hanning of the signal" by applying the Hann window to it.

The Hann function is typically used as a window function in digital signal processing and used to select a subset of a series of samples in order to perform a Fourier transform or other type of calculations. The Hann window is a linear combination of modulated rectangular windows defined generally by $w_r = 1_{[0,N-1]}$. The advantage of the Hann window is very low aliasing, and the tradeoff slightly is a decreased resolution (widening of the main lobe).

Alternatively, the system may implement manual tuning of the signal slightly to make the key peaks/valleys more prominent, which reduces cross-correlation ambiguity significantly. Generally, only the central portion (for example, 15 samples) of the template signal is used in cross-correlation, further enhancing resilience to residual noises.

In certain embodiments or aspects, the process of signal segmentation as provided in FIG. 10B, implements generally, two major steps (among other calibration and fine tuning steps, for examples as illustrated in steps 183-184 and 186) in order to extract the face region segment, specifically 1) locating the direct path segment in raw recordings as shown in step 185; and then locating the major echo in step 187, in order to identify the face region segment.

In the embodiment of example process FIG. 10B, in order to find the major echo 109 in a continuous recorded echo signal(s) 4, the system has to identify and use a "reference location" in the received echo signal 4. The direct path signal 107 is detected and used as the "reference location" as shown in step 185 of FIG. 10B. The direct path signal 107 generally refers to the acoustic signal 4 that travels from speaker (for example 101, 104) to the microphone 100 directly, which is considered the initial first "copy" of the echo signal recorded after an emission. After the direct path signal 107 is identified in step 185, its respective location refers to the time delay between direct path signal 107 and the major echo 109 along the x axis, which is a time element variable (referring to FIG. 4).

More particularly, the system next identifies the location of the major echo 109 on the time axis (as shown in FIG. 4) in step 187 of FIG. 10B. The system next determines the time delay between direct path signal 107 and the major echo 109. Given the time delay, the system can estimate the sound traveling distance, which is the time×speed of sound divided by 2 (as sound travels back and forth).

In particular, when the system is determining the location of the Direct Path signal 107 in step 185, a simple assumption that can be made, is that a constant gap exists between the emitting and recording signals, thus the direct path signal 107 can be generally located after that constant gap. However, both emitting and recording must go through multiple layers of hardware and software processing in the operating systems of a device 7, many of which exhibit unpredictable, varying delays. Thus locating the direct path 107 using a constant delay alone may prove to be unreliable.

Instead, since the direct path signal 107 usually is the signal that exhibits the highest amplitude, hence, using cross-correlation to locate the direct path signal 107, is more reliable. As described hereinabove, occasional offsets of the direct path signal 107 still happen after cross-correlation, due to ambiguities from comparable peak values in the cross-correlation result. Therefore, in order to enhance the stability of the direct path signal 107 after cross-correlation in step 185, the system implements the following steps: 1) template signal calibration in step 183 and 2) signal fine-tuning in step 184, as described hereinabove. Generally, since the received sound signal is usually slightly different from the designed emitting signal, in order to obtain an accurate "template" signal for cross-correlation, the system initially performs emitting and recording in a quiet environment (or other method to block out environmental noise or perform noise removal functions while emitting and recording the acoustic signals), so that the direct path signal 107 can be more reliably detected and saved as a calibrated template for future cross-correlation.

Hence, in step 185, the system uses template signal calibration 183 and signal-fine tuning techniques in step 184 in order to cross-correlate the signal after noise removal and find peak(s) of the correlated signal so the system can more easily and accurately detect the direct path signal 107 in step 185. So, as an example, the first copy of the recorded signal after an emission from the microphone to the facial area 9 of the user 3 is identified as a direct path signal 107, as shown in FIG. 4.

It is noted that in step 186 the system performs vision measurement calibration in step 186, by detecting facial landmarks 155 of the user 3, for example, two eye locations or corners of the mouth of the user 3. In the example embodiment, such vision measurement calibration 186 is used for the respective estimation of various facial geometries of the face 9 of user 3, in particular specific facial geometry of the user's 3 facial features and respective contours 10 of such facial features. The closer or further the user face 9 is from the camera, the system is able to estimate the distance of the user from the phone and determine which segment of sound or acoustic signal is emitted from the face 9 (rather than emitted from another object). Hence, a linear relationship is implemented to determine the scale value between pixel distances and real distances of the face 9 to the device 7, as described further herein below. This estimate can provide an estimation of the echo signal location, which helps in reducing outliers when cross-correlation is implemented. It is noted that other contemplated geometries can be detected, for example, using the geometry of the hand of the user 3 may be another contemplated implementation instead of the user's 3 face 9.

As described in the foregoing, the step of vision measurement calibration 186 in the example embodiment, applies the camera image projection principle. The closer the device 7 is to the face 9 of the user 3, the larger the image and larger the distances between facial landmarks 113, and vice versa. Thus, the distance from face to device $d_v$ is formulated as:

$$d_v = \tau \frac{1}{d_p},$$

where $d_p$ is the distance between two facial landmarks and $\tau$ is an unknown scale factor specific to the user.

The system selects $d_p$ as the pixel distance between two landmarks, for example, two eye landmarks 155 as they are generally more widely separated and can be detected reliably. The system may detect the medial relationship and also use distance of the face 9 to camera 103 between the two landmark eye points 155. In order to estimate the scale factor $\tau$, the system calculates $\tau_i$ for each pair-wise $d'_{v,i}$ from the acoustic distance measurement and $d_{p,i}$ in pixels. In order to eliminate errors caused by acoustic distance measurement outliers 110 as shown in FIG. 5, the system first locates and identifies the major cluster of $\{\tau_i\}$ using a density-based spatial clustering algorithm, for example, DBSCAN, as described hereinabove. The system next leverages linear regression to find the best $\tau$ that minimizes the offset between $d'_v$ and $$\tau \cdot \frac{1}{d_p}.$$

FIG. 5 shows that outliers 110 are removed in the signals associated with vision calibrated acoustic distance measurements.

Next during step 187 of FIG. 10B, the system performs the step of locating the major echo 109 using cross-correlation and vision measurement. In locating the major echo 187, the system determines the major echo 109 emanating from the face 9 by extracting the most information regarding the 3D geometry of the face and its respective landmarks 155. In the example embodiment, a straightforward way for locating the major echo 109 among all face region echoes 108, is to identify the cross-correlation peak location corresponding to typical phone holding distance (e.g., 25-50 cm) after the location of the direct path signal 107. However, human face echoes can be so weak that echoes from larger obstacles located further away can have comparable amplitudes. This can render the estimation unstable and may lead to occasional location "jumping", thus outliers 110 can arise in such distance measurements. The dotted line in FIG. 5 shows the distance measurements from acoustic signals while the device is moving back and forth from the face. As described hereinabove, some outliers 110 due to such "jumping" outliers are shown in FIG. 5. Hence, a vision-aided major echo locating technique may be implemented in order to reduce such outliers 110.

A vision-aided major echo locating technique can be used for estimation of 3D geometry of a user's face 9. However, vision based distance measurement while generally stable, it cannot capture the error caused by rotations of smartphone or user's face 9. Thus, the vision calibrated distance measurement is used to narrow down the major echo searching range and reduce outliers 110 that are detected from the major echo signal 109. In the example embodiment, the system implements cross-correlation to find the exact major peak location within the relevant range of detected acoustic signals. Note that if the user face rotates to extreme angles, facial landmark 155 detection may not work properly.

In particular, during face region echoes detection in step 188, it is noted that the human face has a 3D surface and therefore a certain depth with respect to its various features, for example, eyes, nose, cheekbones, mouth, etc. The tip of the nose is generally the closest to the device 7, while the ears are generally the farthest, for a user 3 with an average human face 9. In theory, when detecting the major echo signal 109 assumes, the system assumes the face is a flat surface. Hence, in order to cover the depth of the face, the system extends the major face signal to cover its two ends (for example, line delineated by the two ears of a user 3). The system can extend 10 sample points before and after the major echo segment 109 in order to determine the echoes for the entire face region 108, thus allowing a depth range of approximately ~7 cm for processing such images. Hence, during step 188 in FIG. 10B, during the detection and identification of face region echoes segment 108, since the depth of human face is limited, the system in the example embodiment, extends some time sample points, for example 10 sample points (as shown located on the time x-axis of FIG. 4), both before and after the major echo segment 109, in order to cover the entire face region (including the face's seven (7) depths for example, nose, face, cheeks, forehead, mouth, eyes, ears) (for example, allowing a depth range of ~7 cm).

As described hereinabove, the face regions echoes 188 are then used in generating a unique echo-signature print, representation or pattern associated with identifying and authenticating a particular user 3 (analogous to a fingerprint of the particular user 3).

Referring back to FIG. 11B, once the system has determined the face region echo 108 (and hence, the unique echo-signature print, representation or pattern associated with identifying and authenticating a particular user 3) in step 204, using example signal segmentation process illustrated in FIG. 10B, the system next adjusts the amplitude of the face region echo segment 108 by application of the sound propagation law in step 205. During step 204, the system essentially zooms the view (referring to FIG. 4) of the echo signals, so that face region echoes 108 can be deciphered and identified relative to the x-axis.

The direct path segment 107 is the emitting signal traveling from speaker to the microphone directly, which ideally should be a copy of the emitting signal and has the highest amplitude. The major echo 109 corresponds to the mix of echoes from the major surfaces (for example, cheeks and forehead) of the face. Other surfaces of the face (for example, nose and chin) at different distances to the phone 7 also produce echoes, arriving earlier/later than the major echo. The face region echoes 108 include all these echoes, capturing the full information of the face. Hence, accurate segmenting of the face region echoes during signal segmentation in step 204 is important to minimize the disturbances from dynamic clutters around the phone 7, and reduce the data dimension for model training and performance.

During signal segmentation step 204 in FIG. 11B, generally there are two steps implemented in extracting the face region segment: locating the direct path segment in raw recordings, then locating the major echo 109 and face region segment 108 which is generally located on a time-sampling axis (referring to FIG. 4) after the direct path segment 107.

Accordingly, following the sound propagation inverse-square law in step 205 of FIG. 11B, the face region signal segment 108 is shifted by the same distances, with the amplitude adjusted by the scale equal to the inverse of the square of distance. Due to the omni-directional property of smartphone speaker 101, 104 and microphone 8, a slight device 7 rotation at a fixed position, causes negligible changes in the echoes acoustic signal, thus only device position changes account for any acoustic signal transform. The sound propagation law assumes equi-distances, and thus generates data assuming that any different distances from the direct path signal is determined by adjusting amplitudes of the signal.

Next in step 206, the system shifts the adjusted face region echo 108 along time axis in order to meet any distance changes associated any of the synthesized images that assume different viewing angles and distances of the camera 103 to the user 3 face 9. It is noted that because face 9 may be situated further from the device 7, the echoes that reflect from the user face 9 are generally weaker and delayed. If you shift the user to the right or to the left, the amplitude may be higher if the echoes are stronger signals (depending on which direction would render the user closer to the phone). If the echoes are weakening, the echoes reflected from the user face 9 are generally more delayed and weaker—such echo signals are received with a greater delay relative to stronger echo signals. If the echoes are stronger as the user 3 is closer to the device 7, the echo signals are received sooner and are stronger. The respective amplitudes of such echo signals are higher and the echoes would be stronger.

Finally, in step 207 of FIG. 11B, the system synthesizes the acoustics data and outputs for system input of a unique echo-signature print, representation or pattern associated with identifying and authenticating a particular user 3 (analogous to a fingerprint of the particular user 3). Such unique echo-signature print is input into a pre-trained CNN model and/or SVM model used in SVM prediction 131 and/or two-factor authentication 121 (as shown in example FIG. 7)

The joint acoustic and visual features representation 132 which is associated with a unique echo-signature print, representation or pattern associated with identifying and authenticating a particular user 3 (analogous to a fingerprint of the particular user 3), is used for two-factor authentication 121 (as shown for example, in FIG. 7). It is noted that for classification in certain embodiments, a one-class SVM is an unsupervised algorithm that learns a decision function for novelty detection by classifying new data as similar or different to the training set. SVM detects the soft boundary of the training set so as to classify new samples as belonging to that set or not. In certain embodiments, one-class SVM is implemented with radial basis function (RBF) kernel function for final classification. This implementation allows the system to train an SVM classifying model for a new user (or the same user wearing new hats or glasses) on mobile devices easily, without requiring large amounts of training data as in CNN. This trained classifying model which is based on such data augmentation process is used in generating a unique echo-signature print, representation or pattern associated with identifying and authenticating a particular user 3 (analogous to a fingerprint of the particular user 3).

During the data augmentation process of FIG. 11B, the system accounts for synthesized images of a user 3 moving the device at various relative positions to the face so as to collect sufficient training data during user registration 21 (rather than have the user manually input different poses during user registration 21). In practice, this imposes more efforts on the user, and it is hard to tell when sufficient data has been collected. Insufficient training data will cause higher false negatives (for example, more instances of denial of the legitimate user 3). Thus, the system implements the data augmentation technique, which populates the training data by generating "synthesized" training samples based on facial landmark transformation and acoustic signal prediction (as described in greater particularity hereinabove). During this process, the system transforms measured facial landmarks and acoustic signals into synthesized ones which are output in step 207 of FIG. 11B, by assuming different poses relative to the device 7 during the augmentation process as illustrated in FIG. 11B. Such synthesized facial landmarks and acoustic signals are used in generating a unique echo-signature print, representation or pattern associated with identifying and authenticating a particular user 3 (analogous to a fingerprint of the particular user 3) in step 207 of FIG. 11B.

FIG. 12 illustrates a flowchart of exemplary method of user profile registration (which is illustrated in element 21 of FIG. 2A) which is associated with generating a unique echo-signature print, representation or pattern associated with identifying a particular user 3 (analogous to a fingerprint of the particular user 3), during user profile registration 21 (as shown for example in FIG. 2A), and for subsequent retrieval and implementation during user authentication 22 (as shown for example in FIG. 2A). FIG. 2A, shows the joint features 29 representation being used in performing SVM training 30 which is stored in user profile database 31 as the echo-signature acoustics print of the user 3 (similar to a unique fingerprint of the user 3) but based on acoustic features that are extracted by acoustics sensing 23/acoustics signal processing 24, and extracted visual facial landmarks 28 (rather than based on a unique fingerprint biometric of the user 3).

Figure 24:
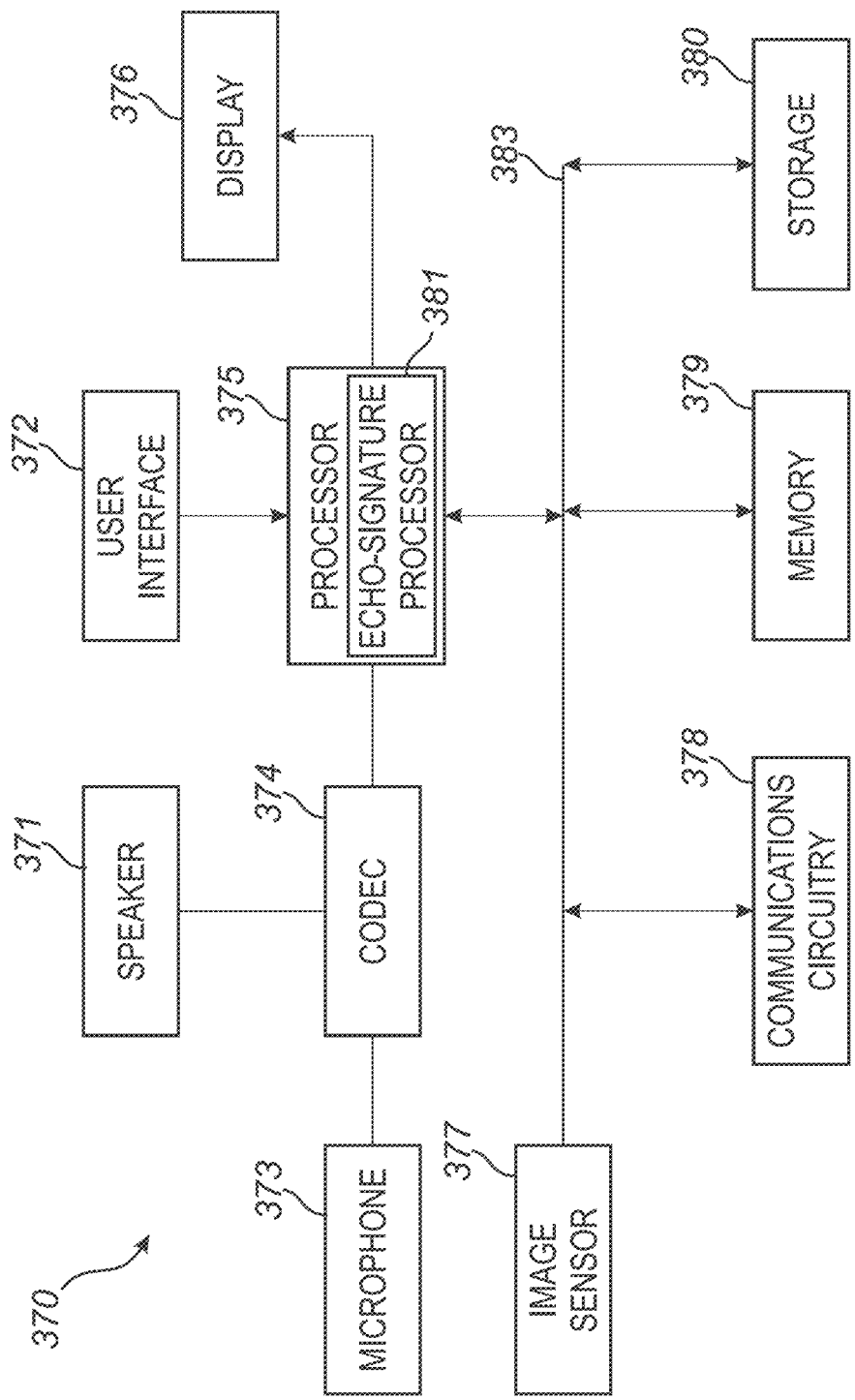
FIG. 24 illustrates a system block diagram including constituent components of an example mobile device, in accordance with an embodiment of the acoustic-based echo-signature system, including an example computing system.

Beginning with acoustic signal processing in step 210 of FIG. 12, the process of user registration commences with detection of acoustic signal that is originally emitted from the earpiece speaker that illuminates the user's face 9 with nearly inaudible sound signals 4 (as shown for example, in FIG. 1) that are in turn reflected from the unique facial contours (or at least seven depths of the user's face 9) as unique acoustic signals 5 that are transmitted to and received by a receiver associated with the device 7 for processing by the echo-signature processor 381 (as shown in example embodiment of FIG. 24).

The system proceeds to perform background noise removal in step 211 (as described in connection with FIG. 10A, step 180. In an example, the raw acoustic signal is transmitted through a 16-22 KHz Butterworth band-pass filter. The system next proceeds to perform the process of signal segmentation as described in connection with step 181, FIG. 10A. The system in step 212 performs the step of signal segmentation by extracting the face region segment 108 by initially locating the direct path segment 107 in raw recordings (as shown in FIG. 4), and next locating the major echo segment 109 (with the face region segment 108 being located on a time-sampled axis, after the direct path segment 107) (as described in connection with steps 185-187) in FIG. 10B. The system may locate the direct path signal 107 using cross-correlation 185, perform vision measurement calibration 186 and locate the major echo 109 using cross-correlation and vision measurement techniques 187. A spectrogram 213 is next generated using for example STFT as shown and described in connection with step 196 of FIG. 10D. A spectrogram is computed using STFT in step 213, which provides a representation in image or visual form of the spectrum of frequencies associated with the acoustic face region echoes signal as it varies over time.

Hence, a spectrogram is represented as an image or visual representation of the spectrum of the frequencies of the acoustic face region echoes signal 108 as it varies over time. Spectrograms are sometimes referred to as sonographs, voiceprints, or voice-grams. When the data is represented in a 3D plot they may also be referred to as waterfall representations. The spectrogram of the segmented face region echoes 108 is thus generated using for example, STFT shown in step 192, after performing FMCW signal mixing in step 191 as shown in FIG. 10C. The spectrogram is then used as input for CNN training during authentication 121, as described hereinabove with respect to FIG. 7. Essentially the spectrogram of the segmented face region echoes signal is a conversion of time-series data to a spectrogram. The 2D values, including frequency and temporal data associated with respective amplitude values, are generated as an image representation. As shown in step 214 of FIG. 12, the spectrogram image of the segmented face region echoes is next transmitted to a CNN classifier to extract features associated with the acoustic face region and in particular, unique surface geometries that are captured by the segmented face region echoes 108 during such segmented signal analysis. The CNN is classified in particular to train a model.

A parallel track of image processing that is used for visual feature extraction for the user registration process, occurs as shown in steps 215-218 of FIG. 12. The image processing features extraction begins with camera preview in step 215 using a device 7 camera 103. Next the system performs facial landmark detection and face tracking in step 216 (as previously described in example embodiments FIG. 11A, step 200 and FIG. 11B step 203). The system processor performs processing of detected facial landmarks and face tracking (as shown and described in example FIG. 8A) and determines respective landmark(s) transformation between camera positions (camera #1 and camera #2) from an original image to a shifted image (as shown and described in example FIG. 8B).

Next in step 217 the system performs face alignment. The step of face alignment 217 is required for initial user registration 21 and later user authentication 22. It may be inconvenient to users to hold the phone in varied positions, however, the process of data augmentation is able to supplement the CNN or SVM training set with varied user positions with respect to the device 7 camera 103, such that facial alignment 217 is less onerous on the user 3. The acoustic-based facial echo-signature system implements detection 27 of visual facial landmarks 28 for face alignment, which is also important for robust acoustic sensing 23 during joints features extraction 29. While such facial landmarks are not intended alone to significantly improve recognition accuracy, the echo-signature system as an acoustic based approach, can incorporate more sophisticated facial features, e.g., features from a deep neural network trained on a huge face image dataset, which improves prior art facial based authentication systems.

The system next merges in step 219, the acoustic features extraction performed in step 214 with the visual features extraction performed in step 218. This merging of acoustics and facial features is similar to joint features representation 29 described in example FIG. 2.

A pre-trained CNN model may be used as general acoustic feature extractor in step 214 which can be fed to an SVM based classifier for authentication (for example as shown in steps 129 SVM training and SVM model 130 described in authentication model 212 in FIG. 7). In FIG. 12, classifier training is performed in step 220, which can be a CNN or SVM, based classification model that is trained. The trained model including the echo-signature acoustic print associated with the user 3 is stored in the user profile database 221 during user registration (and used for authentication as described herein below in connection with FIG. 14).

Figure 13A:
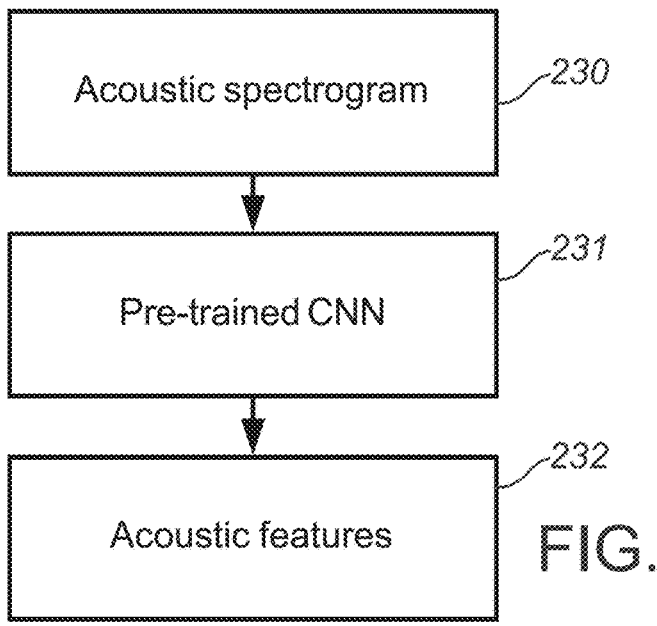
FIG. 13A illustrates a flowchart of an exemplary method of acoustics features extraction, also described in connection with FIG. 2A, in accordance with an embodiment of the disclosed system and method.

FIG. 13A illustrates a flowchart of an exemplary method of acoustics features extraction and visual features extraction, also described in FIG. 2A, in accordance with an embodiment of the disclosed system and method. The acoustic features extraction process defined by FIG. 13A begins with generating an acoustic spectrogram representation in step 230. As described hereinabove, in accordance with the embodiment shown in FIG. 7, a CNN based neural network is implemented which takes the acoustic spectrogram of the segmented signal as input, and trains it on a large data set collected from users. Hence, a spectrogram is represented as an image or visual representation of the spectrum of the frequencies of the acoustic face region echoes signal as it varies over time. Spectrograms are sometimes referred to as sonographs, voiceprints, or voicegrams. When the data is represented in a 3D plot, they may also be referred to as waterfall representations.

The spectrogram of the segmented face region echoes is thus generated using STFT in step 192, after performing FMCW signal mixing in step 191. The spectrogram is then used as input for CNN training during authentication 121, as described hereinabove with respect to FIG. 7. Essentially the spectrogram of the segmented face region echoes signal is a conversion of time-series data to a spectrogram. The 2D values, including frequency and temporal data associated with respective amplitude values, are generated as an image representation. The spectrogram image of the segmented face region echoes is transmitted to a pre-trained CNN classifier in step 231 in order to extract features associated with the acoustic face region and in particular, unique surface geometries captured by the segmented face region echoes 109 during such segmented signal analysis. The CNN is classified in particular to train a model. Hence, the system is able to extract acoustic features in step 232 that is used in training a model (for example, CNN or SVM models) or even in performing respective SVM prediction 131 as shown in authentication model 121 of FIG. 7.

Figure 13B:
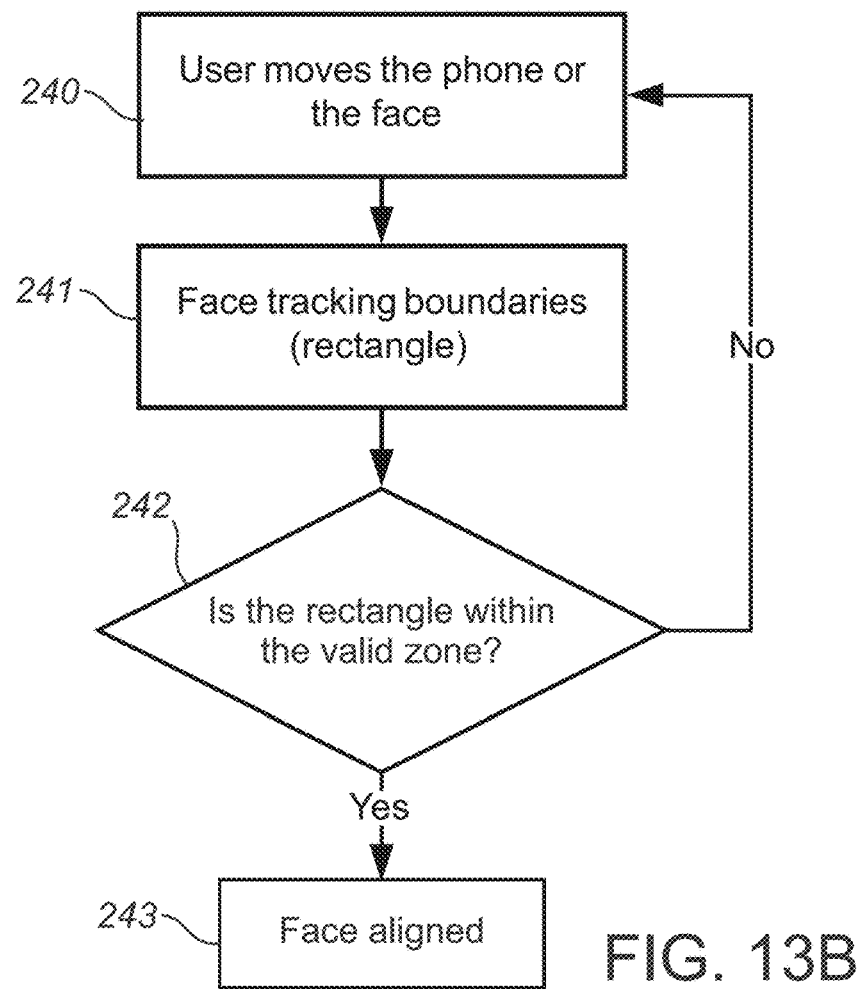
FIG. 13B illustrates a flowchart of an exemplary method of facial alignment implemented during user authentication, also described in connections with FIGS. 8A and 9, in accordance with an embodiment of the disclosed system and method.

FIG. 13B illustrates a flowchart of an exemplary method of facial alignment implemented during user authentication, also shown in FIGS. 8A and 9, in accordance with an embodiment of the disclosed system and method. Beginning with step 240 the user 3 move the device 7 or his/her face during the facial alignment process. The system next performs tracking of the face by tracking boundary lines (described herein below are bounding rectangles as shown in FIGS. 8A and 9. The system next detects whether the rectangle is within a valid zone (see for example FIG. 9, rectangles 170, face valid areas). The bounding rectangle 171 defines a detected face area as shown in FIG. 9. If the system detects that the rectangle is indeed within a valid zone in step 242, the system determines that the face is indeed aligned in step 243. Such face alignment process of FIG. 13B can be used for authentication as shown in FIG. 9, for example.

More particularly, some example implementations of the facial alignment process of FIG. 13B, includes an example two-factor one-pass authentication process, in which the system implements a mode in which the user 3 must hold the phone properly to align his face within the valid area rectangle 151, 153, as shown on the screen 105 (referring to for example, further description herein below in connection with FIGS. 8A & 9). As described hereinabove, both visual facial landmarks from camera images (including landmark coordinates) 134 and acoustic features 133 extracted by the trained CNN 135 are fed to the SVM 130 for recognition.

More particularly, in accordance with another embodiment, during facial landmark detection 27, the disclosed acoustic-based facial echo-signature system, extracts lightweight visual features of the face in order to complement the extracted acoustic features and process both features during authentication 22. The visual techniques serve two purposes: 1) detecting facial landmarks which are later used as basic visual features; and 2) tracking the user's face 9 on the smartphone screen device 7 so that the user 3 can hold the device within some "valid" zone relative to the distance as illustrated for example by rectangles 151, 153 shown in FIG. 8A. The valid zone 151, 153 comprises distance and/or orientation relative to the user face 9 and smart device 7 for respective data collection and processing in user profile registration 21 and then user authentication 22.

Yet another example implementation of facial alignment process of FIG. 13B is shown in FIGS. 8A and 9, (including side-by-side poses in following drawing sheets) is an image snapshot 150 including a middle (red) rectangle denoted as solid rectangle 152 that denotes the detected facial area 9 of the device user 3, and two (green) rectangles denoted as dotted line rectangles 153, 151 are considered the inner bounds 158 and outer bounds 157 of face valid areas 153, 151, which are fixed. In an example embodiment, the user face 9 is aligned within the two (green) dotted line rectangles 153, 151, during data collection and processing. Otherwise, if the face 9 fails to align within the boundaries of the two (green) dotted line rectangles 153, 151, the acoustic data are discarded and the process begins again at step 240 as shown in FIG. 13B. The landmark dots 155 as shown in FIG. 8A, and the lighter (yellow) dots 155 as shown in FIG. 9, are the system detected facial landmarks, that are saved as pixel coordinates, for example, generally in 2D (x,y) pixel coordinate pairs or alternatively 3D (x,y,z) coordinates.

In order to implement Facial Landmark Detection, the system may use for example, Google® mobile vision API for real-time facial landmark detection and face tracking.

The frame rate is set at 30 fps with a resolution of 1024×768. The bounding middle (red) darker shaded rectangle 171 (as shown in example FIG. 9) defines the detected face area 9 of the user 3 within the boundary lines of user interface 177. The two (green) lighter shaded rectangles 170 define the inner and outer bounds of face valid areas 170, which are fixed in the shown example embodiment. The user face 9 is aligned within the two (green) dotted rectangles 170 shown in FIG. 9 during user registration and/or user authentication and related data collection; otherwise, the acoustics data is discarded, as the system requires the user face 9 be aligned, in order to perform authentication accurately. In this two-factor authentication mode, the user 3 must hold the phone 7 properly to align his face within the valid area rectangle 170 as shown on the screen 177 of FIG. 9. The lighter circled dots (yellow dots) 155 shown in FIG. 9 are the detected facial landmarks 155, that are identified and saved by the system processor as pixel coordinates.

Another described example is during two-factor one-pass authentication power mode, in which the user 3 must hold the phone 7 properly to align his face within the valid area rectangles 170 shown as dotted rectangles on the user interface screen 177 of FIG. 9. Both visual facial landmarks from camera images and acoustic features extracted by the trained CNN are transmitted to the SVM for facial and/or user recognition. This mode may require more computation, energy costs, but providing the highest security level suitable for scenarios such as phone unlock, account log in, other security-based features, etc. During such example mode, both acoustic and visual features are used. The extracted facial and acoustic features 132 are compared against pre-trained CNN features 135 that occurs during two-factor authentication 121, during real-time prediction 122,131 using the SVM model 130, as shown for example in FIG. 7.

Figure 14:
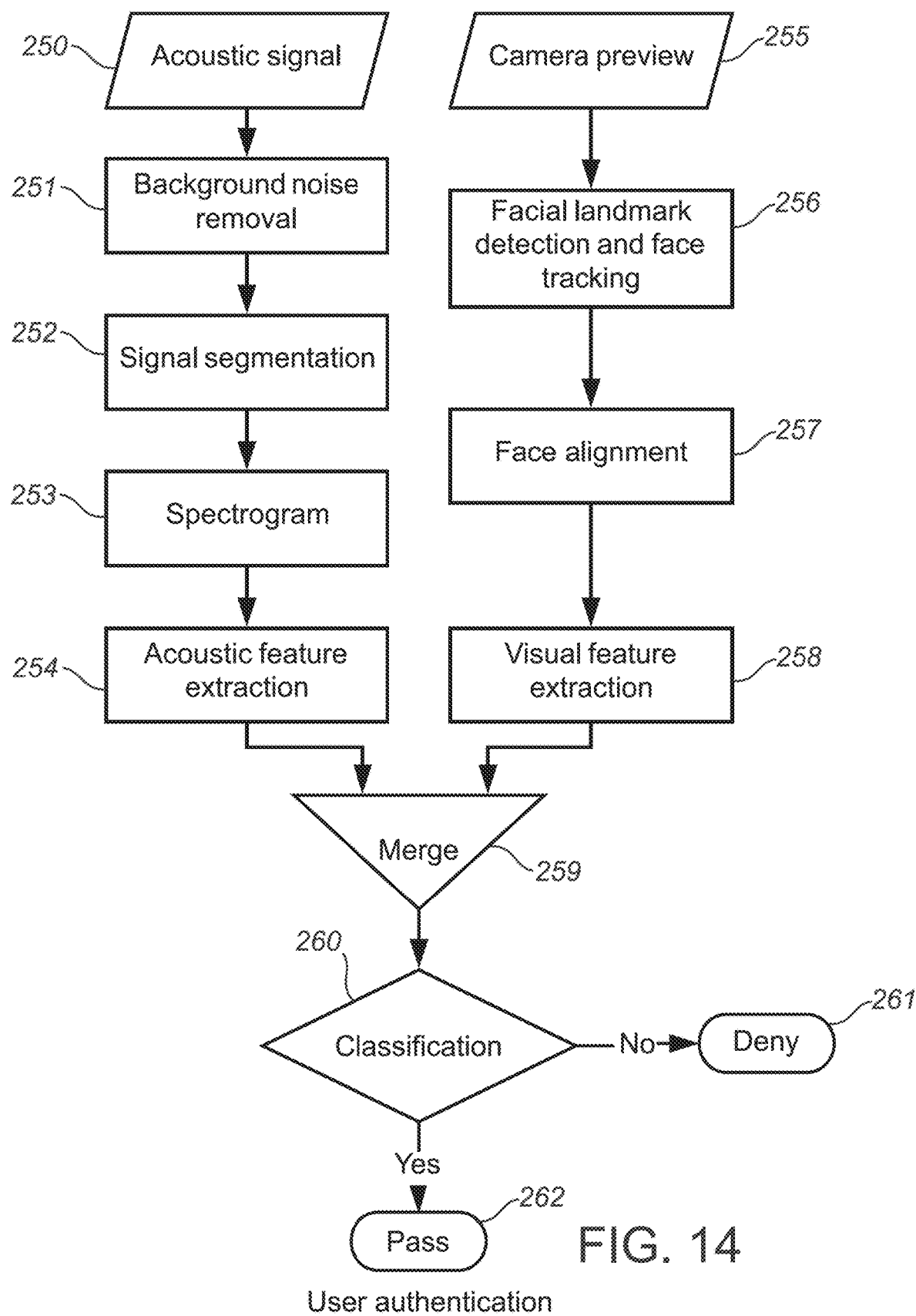
FIG. 14 illustrates a flowchart of an exemplary method of user authentication, also described in connection with FIG. 2A, in accordance with an embodiment of the disclosed system and method.

FIG. 14 illustrates a flowchart of an exemplary method of user authentication, also described in connection with FIG. 2A, in accordance with an embodiment of the disclosed system and method.

In particular, FIG. 14 illustrates a flowchart of an exemplary method of acoustics features extraction and visual features extraction, also described in FIG. 2A, in accordance with an embodiment of the disclosed system and method.

FIG. 14 illustrates a flowchart of exemplary method of user authentication (which is illustrated in element 22 of FIG. 2A) which is associated with generating a unique echo-signature print, representation or pattern associated with identifying a particular user 3 (analogous to a fingerprint of the particular user 3), during user profile registration 21 (as shown for example in FIG. 2A) and for subsequent retrieval and implementation during user authentication 22 (as shown for example in FIG. 2A). FIG. 2A shows the joint features 29 representation being used in performing SVM training 30 which is stored in user profile database 31 as the echo-signature acoustics print of the user 3 (similar to a unique fingerprint of the user 3) but based on acoustic features that are extracted by acoustics sensing 23/acoustics signal processing 24 and extracted visual facial landmarks 28 (rather than based on a unique fingerprint biometric of the user 3).

Beginning with acoustic signal processing in step 250 of FIG. 10, the process of user authentication commences with detection of acoustic signal that is originally emitted from the earpiece speaker that illuminates the user's face 9 with nearly inaudible sound signals 4 (as shown for example, in FIG. 1) that are in turn reflected from the unique facial contours (or at least seven depths of the user's face 9) as unique acoustic signals 5 that are transmitted to and received by a receiver associated with the device 7 for processing by the echo-signature processor 381 (as shown in example embodiment of FIG. 24).

The system proceeds to perform background noise removal in step 251 (as described in connection with FIG. 10A, step 180). In an example, the raw acoustic signal is transmitted through a 16-22 KHz Butterworth band-pass filter. The system next proceeds to perform the process of signal segmentation as described in connection with step 181, FIG. 10A. The system in step 252 performs the step of signal segmentation by extracting the face region segment 108 by initially locating the direct path segment 107 in raw recordings (as shown in FIG. 4), and next locating the major echo segment 109 (with the face region segment 108 being located on a time-sampled axis, after the direct path segment 107) (as described in connection with steps 185-187) in FIG. 10B. The system may locate the direct path signal 107 using cross-correlation 185, perform vision measurement calibration 186 and locate the major echo 109 using cross-correlation and vision measurement techniques 187. A spectrogram 213 is next generated using for example STFT as shown and described in connection with step 196 of FIG. 10D. A spectrogram is computed using STFT in step 213, which provides a representation in image or visual form of the spectrum of frequencies associated with the acoustic face region echoes signal as it varies over time.

Hence, a spectrogram is represented as an image or visual representation of the spectrum of the frequencies of the acoustic face region echoes signal 108 as it varies over time. Spectrograms are sometimes called sonographs, voiceprints, or voicegrams. When the data is represented in a 3D plot, they may also be referred to as waterfall representations. The spectrogram of the segmented face region echoes 108 is thus generated using for example, STFT shown in step 192, after performing FMCW signal mixing in step 191 as shown in FIG. 10C. The spectrogram is then used as input for CNN training during authentication 121, as described hereinabove with respect to FIG. 7. Essentially the spectrogram of the segmented face region echoes signal is a conversion of time-series data to a spectrogram. The 2D values, including frequency and temporal data associated with respective amplitude values, are generated as an image representation. As shown in step 253 of FIG. 14, the spectrogram image of the segmented face region echoes is next transmitted to a CNN classifier to extract features associated with the acoustic face region and in particular, unique surface geometries that are captured by the segmented face region echoes 108 during such segmented signal analysis. The CNN is classified in particular to train a model.

A parallel track of image processing that is used for visual feature extraction for the user authentication process, occurs as shown in steps 255-258 of FIG. 12. The image processing features extraction begins with camera preview in step 255 using a device 7 camera 103. Next the system performs facial landmark detection and face tracking in step 256 (as previously described in example embodiments FIG. 11A, step 200 and FIG. 11B step 203). The system processor performs processing of detected facial landmarks and face tracking (as shown and described in example FIG. 8A) and determines respective landmark(s) transformation between camera positions (camera #1 and camera #2) from an original image to a shifted image (as shown and described in example FIG. 8B).

Next in step 257 the system performs face alignment. The step of face alignment 257 is required for initial user registration 21 and later user authentication 22. It may be inconvenient to users to hold the phone in varied positions, however, the process of data augmentation is able to supplement the CNN or SVM training set with varied user positions with respect to the device 7 camera 103, such that facial alignment 257 is less onerous on the user 3. The acoustic-based facial echo-signature system implements detection 27 of visual facial landmarks 28 for face alignment, which is also important for robust acoustic sensing 23 during joints features extraction 29. While such facial landmarks are not intended alone to significantly improve recognition accuracy, the echo-signature system as an acoustic based approach, can incorporate more sophisticated facial features, e.g., features from a deep neural network trained on a huge face image dataset, which improves prior art facial based authentication systems.

The system next merges in step 259, the acoustic features extraction performed in step 254 with the visual features extraction performed in step 258. This merging of acoustics and facial features is similar to generating the joint features representation 29 described in example FIG. 2.

A pre-trained CNN model may be used as general acoustic feature extractor in step 254 which can be fed to an SVM based classifier for authentication (for example as shown in SVM training step 120 and SVM Model 130 of authentication model 212 in FIG. 7). In FIG. 14, classification is performed in step 260, which can be based on a SVM based classification model that is trained. An SVM classified is trained in the embodiment, to authentication a registered user. The trained model including the echo-signature acoustic print associated with the user 3 was stored in the user profile database 221 during user registration described in connection with FIG. 12 (and implemented during authentication as described herein during the user authentication process of FIG. 14). If the classification step 260 fails to match the user profile model with the acoustic and visual features profile just generated, then the system denies access to the user 3 in step 261. If the classification indeed passes in step 260, and indeed matches the user profile model, then the system allows access to the device in step 262.

Essentially, during the authentication phase, the user just needs to hold the smartphone in front of his/her face 9 for facial landmarks detection and acoustic sensing. The joint features are extracted and fed into the trained SVM classifier for final authentication. If the system fails to find a match with a stored profile, then the system denies access and user authentication fails in step 261.

One-class SVM classification is an unsupervised algorithm that learns a decision function for novelty detection and classifying new data as similar or different to the training set. It detects the soft boundary of the training set so as to classify new samples as belonging to that set or not. In an example method, SVM with radial basis function (RBF) kernel function for final classification is implemented. This permits the system to train an SVM classifying model for a new user (or the same user wearing new hats or glasses) on mobile devices more easily, without requiring large amounts of training data as in CNN.

Ideally, a user should move the device at various relative positions to the face so as to collect sufficient training data during user registration. In practice, this imposes more efforts on the user, and it is hard to tell when sufficient data has been collected. Insufficient training data will cause higher false negatives (i.e., denial of the legitimate user). Thus, the data augmentation technique(s) described for example, in FIGS. 11A and 11B are used, which populate the training data by generating "synthesized" training samples based on facial landmark transformation and acoustic signal prediction. During this augmentation process, the system transforms measured facial landmarks and acoustic signals into synthesized ones, by assuming different poses of the phone so thereby creating a more robust training set that covers many poses and/or varied visual looks of the particular user 3.

Evaluation studies were performed to evaluate the performance levels of the echo-signature based authentication system and method. In an example study, 45 participants of different ages, genders, and skin tones were recruited in experiments in accordance with guidelines. The diversity in physical appearances of participant faces helped to capture sufficient data to create a strong feature extraction model. Also included in the studies were five (5) non-human classes: printed/displayed human faces on different materials such as paper, desktop monitor, photo on paper box, wall and a marble sculpture. During data collection, each participant is requested to hold the smartphone in front of his/her face to ensure face alignment. In order to accommodate slight phone movements, participants are encouraged to move the phone slowly to cover different poses. Any data captured while the face is out of the valid area are discarded automatically.

About 120 seconds of data is captured from each user, at around 7-8 MB and containing ~2000 samples. In order to ensure diversity, the data was collected in multiple uncontrolled environments (e.g., quiet laboratories, noisy classrooms, and outdoor environments) under different background noises and lighting conditions. A portion of the participants who are more accessible collected data in multiple sessions at different times and locations. Facial landmarks were also detected and recorded simultaneously, but no facial images were recorded to protect the participants' privacy. In total, the data set contains 91708 valid samples from 50 classes. The data set was divided into three parts: 70% for model training, 15% each for model validation and testing. Additionally, 12 more volunteers join as new users for model evaluation.

FIGS. 15A and 15B illustrate a graphical representation of different classifiers performance on extracted features from CNN, and SVM performance using different features. In Particular, FIG. 15A illustrates a graphical representation of different classifiers performance on extracted features from CNN, in accordance with an embodiment of the disclosed system and method.

FIG. 15B illustrates a graphical representation of SVM performance using different features, in accordance with an embodiment of the disclosed system and method. The performance of different classifiers and feature extraction methods was compared using the test data set. In particular, regarding different classifiers, the last fully connected layer of our trained CNN was removed so that the remaining network is used as a general feature extractor. Such extracted features are then fed to different classifiers for final classification. Linear Regression (LR), Linear Discriminant Analysis (LDA), K-Nearest Neighbor (KNN), Decision Tree (DT), Naive Bayesian (NB), Support Vector Machine (SVM) and a standalone Neural Network (NN) are each compared. The box plot in FIG. 15A shows the lower and upper quartiles, and the median. The whiskers extend from the box show the range of accuracy, and outliers beyond the whiskers are marked as circles. It is determined that SVM outperforms all other classifiers, and it takes shorter time (15.06 s compared to 65.38 s of NN, which has second best performance) for training. Thus, SVM was selected as the final classifier for authentication.

In addition, the performance of different feature extraction methods using the test data set were compared. Different commonly used acoustic features were compared: spectrogram (SPEC), mel-frequency cepstral coefficients (MFCC), chromagram (CHRO), spectral contrast (CONT) and CNN features. FIG. 15B provides a representation of their accuracies using the SVM classifier. The CNN extractor outperforms all other features and achieves the highest accuracy of ~95%, which show the effectiveness and necessity of the CNN feature extractor. Spectrogram has less accuracy at ~85%, and chromagram 67%. MFCC and CONT have much lower accuracy ~30%, which is what was expected because they are mostly used for human voice recognition, not active acoustic sensing used in the echo-signature print system and method. Besides, the 15.06 s using CNN features to train the SVM model is a fraction of the 134 s needed when training with spectrogram. This is a significant improvement when training a model on resource-constraint mobile devices, which is critical for the speed of user registration.

Authentication Accuracy was also reviewed. In a binary classification problem, there are four results: true positive (TP), positive samples correctly classified as positive class; true negative (TN), negative samples correctly classified as negative class; false positive (FP), negative samples wrongly classified as positive class; and false negative (FN), positive sample wrongly classified as negative class. Specifically, in authentication scenarios, a high TP means the authorized user can get access easily, and a high TN means the system can block most attacks. The worst case is high FP, which means unauthorized users gain access. A high FN means the authorized user may be denied access, which is generally annoying and not user-friendly. In this evaluation, a one-class SVM was trained for each subject and the model attached using the data from the rest users. Note that the model was trained on positive samples only, it does not have negative samples from attackers during training.

Precision, Recall, F-score and balanced accuracy (BAC) were introduced as metrics. Precision is the fraction of true positives among all samples classified as positive, defined as $$P = \frac{TP}{TP+FP};$$

recall is the fraction of true positives among all positive samples, defined as $$R = \frac{TP}{TP+FN}.$$

A high precision metric means the authorized user can pass easily, and a high recall means the authorized user is seldom denied. When the class distribution is imbalanced, precision and recall alone can be misleading. Also introduced are F-score and balanced accuracy (BAC), both insensitive to class distribution. F-score is the harmonic mean of precision and recall with a best value of 1 and worst value of 0, defined as $$F-\text{score} = 2\frac{PR}{P+R}.$$

BAC is the average of true positive rate $$\left(TPR = \frac{TP}{TP+FN}\right)$$

and true negative rate $$\left(TNR = \frac{TN}{TN+FP}\right),$$

defined as BAC=½·(TPR+TNR). A BAC of 1 means no false positive (i.e., successful attack) or false negative (i.e., denied access of legitimate users).

FIG. 15C shows the mean and median accuracies using vision, acoustic, and joint features. Vision (2D coordinates of a few facial landmarks like the corners/tips of eyes, nose and mouth) is the worse result with a low average precision of ~72%. Acoustic achieves 86%, and joint features further increase it to 88%, while also decreasing recall by ~6%. That is because simple 2D coordinates of facial features do not capture the full characteristics of the face, thus alone they do not perform well when many test subjects exist. They can help "block" unauthorized users, which may exhibit similar acoustic features, thus increasing precision. However, they also make it harder for the authorized user to pass, thus decreasing recall. Both acoustic and joint features have an average F-score~85% and BAC above 90%. The vision features used are not sophisticated and detailed visual features (e.g., the contour of face) of facial appearances as used in state-of-the art vision-based face recognition systems. These basic face landmarks are mainly used for face alignment, which is critical for robust acoustic sensing. While such facial landmarks are not intended to greatly improve recognition accuracy, the echo-signature system as an acoustic based approach, is free to incorporate more sophisticated facial features, e.g., features from a deep neural network trained on a huge face image dataset. Those would have a much higher impact on performance improvements.

FIG. 15C provides a representation of mean/median accuracy with vision, acoustic and joint features. FIG. 16A provides a graphical representation of the precision, recall, F-score and BAC of one-class SVM model using acoustic features only. FIG. 16B provides a graphical representation of the precision, recall, F-score and BAC of one-class SVM model using joint features only.

Note that the median precision (~99%) and F-score (~94%) for both acoustic and joint features are much higher than the respective average (83~88%). This is caused by outliers. FIG. 16A provides a graphical representation of the precision, recall, F-score and BAC of one-class SVM model using acoustic features only. FIG. 16B provides a graphical representation of the precision, recall, F-score and BAC of one-class SVM model using joint features only.

FIGS. 16A and 16B show the box plot of all four metrics of acoustic and joint features. A few outlier classes with very low precision cause low average but do not affect the median. Such outliers are mainly non-human noise classes or human classes with very limited valid samples. When such outliers are excluded, the averages will increase significantly to above ~95%.

The performance on new users was also evaluated to determine how well the pre-trained CNN can extract features for new users. The evaluation involved twelve (12) additional volunteers whose data was not used in CNN training. Each volunteer followed the same data collection process for ~2 minutes' data, half of which are used for SVM training and the other half for testing. A one-class SVM model was trained for each volunteer, and the model tested with positive samples from the user and negative samples from all other users, including the data from 50 classes used in CNN training. FIG. 16C shows that the average precision is over 98%, about 10% increase compared to results in FIG. 15C due to the absence of outlier classes. Similarly, the average recall, F-score and BAC are all improved compared to those in FIG. 15C.

FIG. 16C provides a tabular representation of authentication accuracy of new users.

Data augmentation evaluation was performed in order to determine how effective data augmentation can improve the performance by generating "synthesized" training samples when training data is limited. The evaluation split 20% samples from the 2 min. data as testing set, and vary the size of training set from 20% to 80%. The data set is shuffled before the splitting to make it more balanced.

Figure 17A:
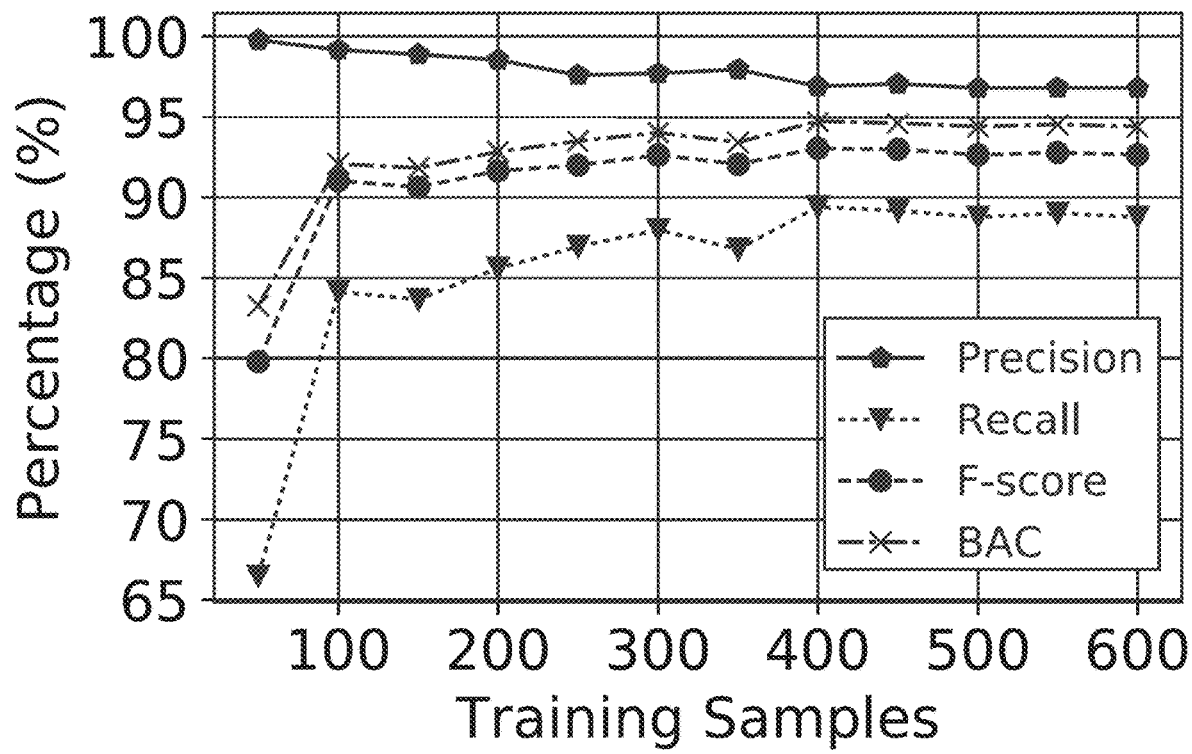
FIG. 17A provides a graphical representation of the classification performance comparison of data augmentation (DA) under different training data amounts, specifically without DA.
Figure 17B:
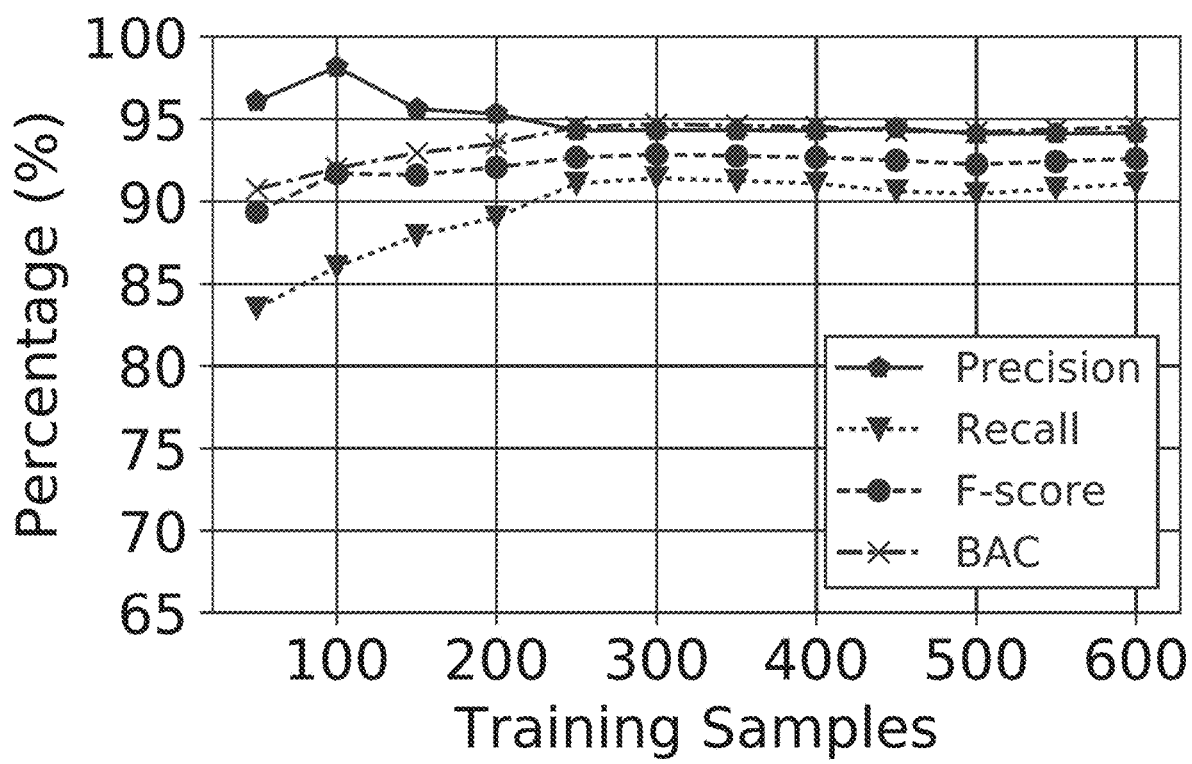
FIG. 17B provides a graphical representation of the classification performance comparison of data augmentation (DA) under different training data amounts, specifically with DA.

FIG. 17A provides a tabular representation of classification performance comparison of data augmentation (DA) under different training data amounts. In particular, in FIGS. 17A and 17B, the precision, recall, F-score and BAC are indicated under different amounts of training samples from 50 to 600, which are tested against another 1054 positive testing samples and all the 91708 negative samples from existing 50 classes. It is apparent that data augmentation improves recall significantly, thus F-score and BAC, especially when the training samples are very limited (e.g., <100). As the size grows, the recall with data augmentation is always higher. However the precision decreases to ~95%, which is because "synthesized" training samples have more noises, making it easier to have false positives. The performance becomes stable with more than 400 training samples, which can be collected within one minute when registering a new user.

Continuous modes evaluation was also performed. Specifically evaluated were the two continuous modes of presence detection and continuous authentication that uses only acoustics.

In addition, presence detection was evaluated. During evaluation, the smartphone was placed at different locations as well as held in front of the user's face. The detection result is shown on the screen in real-time so that the correctness level is apparent. Based on the experiments, the system can differentiate being placed on a table verses being held in front of the user with nearly 100% accuracy with unnoticeable delay. Holding of the device in the air sometimes may be detected as user presence when the device is close to some major objects, which may affect timely screen lockup.

Continuous authentication was also evaluated. In order to ensure friendly user experience during continuous authentication, a low false negative rate is very important. One volunteer participates in this experiment with a trained model using data when the face is aligned. In the authentication phase, the volunteer keeps using the device as normal and tries to keep it within positions where the face is aligned, with the camera disabled. Evaluated are the precision, recall, F-score and BAC when multiple authentication trials were conducted for each cycle. The authentication trial happens every 100 ms thus one verdict from multiple trials is fast enough, causing no noticeable delay to the user. At least one trial must pass in a cycle to declare authentication success.

Figure 18:
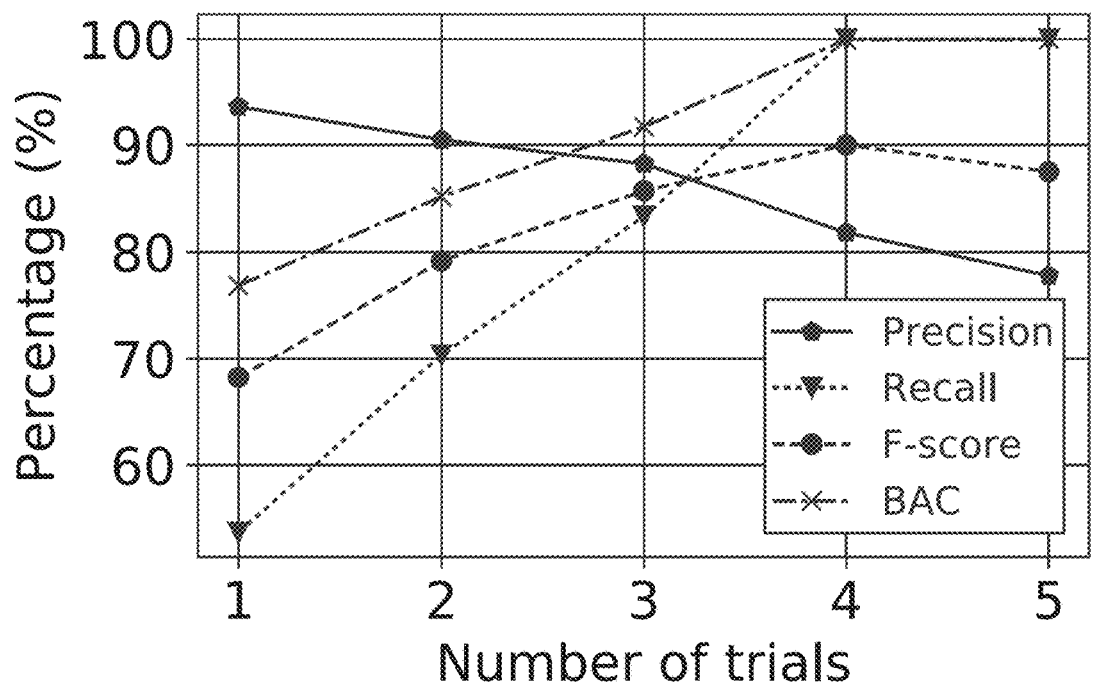
FIG. 18 provides a graphical representation of continuous authentication performance with different number of trials.

FIG. 18 shows a graphical representation showing a continuous authentication performance with different number of trials. In particular, FIG. 18 shows that more trials increase the recall rapidly while decreasing the precision. This is because more trials give the user more chances to pass, thus reducing denials while increasing false positives. Three (3) trials were selected for each authentication circle to balance all the metrics.

Figure 19:
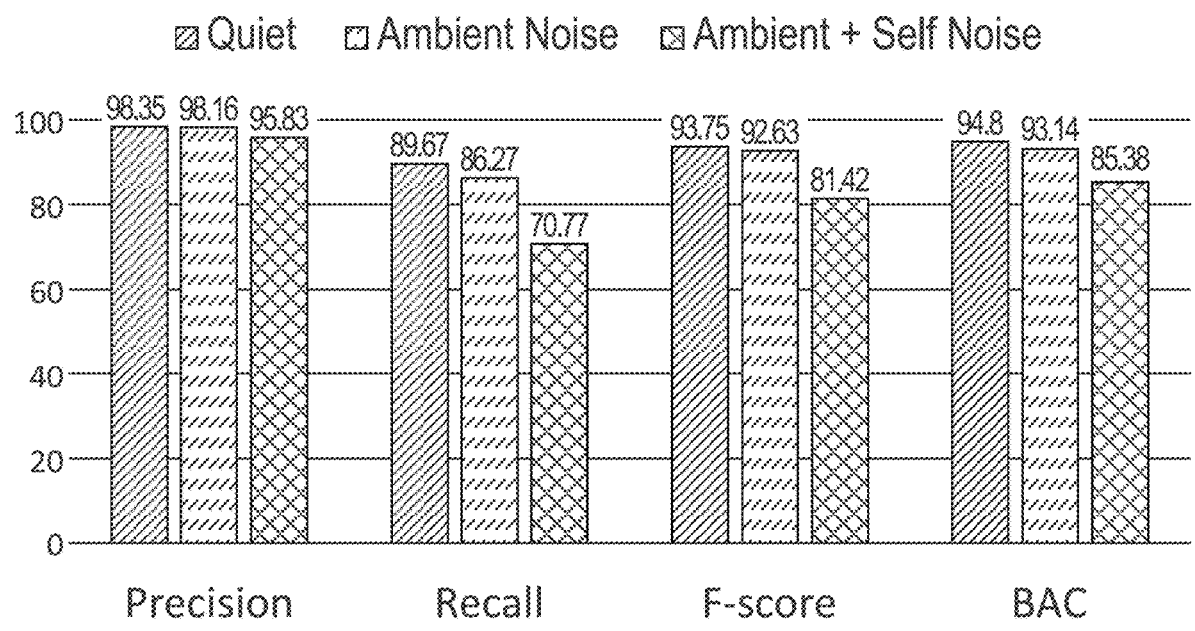
FIG. 19 provides a tabular representation of performance under different type of noises.

Additionally evaluated were the following factors that have direct impacts on practical usage. FIG. 19 provides a tabular representation with columns indicating performance under different type of noises.

The robustness against background noise was evaluated. In particular, the robustness against background noise was evaluated under different conditions: quiet room, with ambient noise (playing pop music nearby), and with ambient plus self-noise (playing music through earpiece speaker on the same device during data collection, an extreme condition). FIG. 19 provides the results. Except for a slightly lower recall, there is no major difference between quiet and ambient noise conditions, which demonstrates the echo-signature system is very robust relative to ambient noise. The ambient plus self-noise brings down to recall to ~70%, but the precision remains above 95%.

Also evaluated were image spoofing attacks. For this evaluation, color photos of five volunteers were printed in 10 different sizes on paper, and also displayed are the photos on desktop monitors while zooming in/out gradually, both at various distances between 20-50 cm to the smartphone device. It was determined that the printed and displayed photos can easily pass the system if only vision features are used, but none of them can pass the acoustic or two-factor authentication.

Figures 20, 20A, 20B:
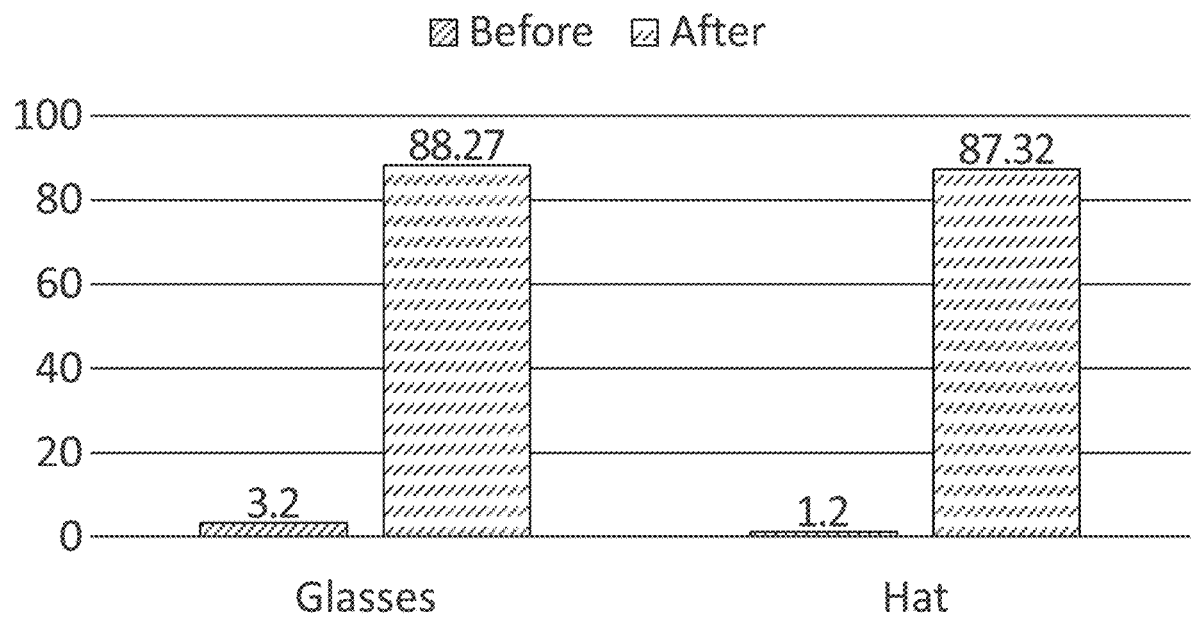
FIG. 20 is a graphical representation in tabular format showing the average recall of five (5) users with different appearance changes before/after the model update using additional ~1 minute's data.
FIG. 20A is a representation in tabular format of mean/max resource consumption.
FIG. 20B is a representation in tabular format of power consumption of different modes.

User appearance changes such as wearing glasses and/or hats can cause changes in the reflected acoustic signals, thus generating more false negatives and low recall. In order to combat such problems, the SVM model was re-trained with data samples of new appearances in addition to the existing training data. FIG. 20 is a graphical representation in tabular format showing the average recall of 5 users with different appearance changes before/after model update using additional ~1 minute's data. It is noted that without re-training, the recall values were reduced to single digits. After the re-training, the values increased back to normal levels, so correct users can pass easily. This indicates that re-training is effective at combating such changes.

An evaluation was also conducted regarding User Experience. A survey was conducted with 20 users (mostly graduate and undergraduate students) to collect their feedback, mainly on two aspects that directly affect user experience: 1) the sensitivity to the emitted sound signal; and 2) the effort for new user registration. Out of 20 users, only four reported being able to hear the high frequency sound from the earpiece while holding the smartphone at a normal distance. Out of 20 users, nine rated the echo-signature system equally easy to register as other authentication systems such as image-based face recognition and fingerprint sensor, six users rated it more difficult to register and five users rated it easier.

An evaluation was also performed regarding Resource Consumption. In particular, evaluated were the memory, CPU usage using the Android Studio IDE Profiler tool, and power consumption using Qualcomm's Trepn Profiler tool on Samsung S7 edge, Samsung S8, and Huawei P9.

FIG. 20A is a graphical representation in tabular format of Mean/max resource consumption. In particular, the results in tabular format for memory and CPU resource consumption is shown. FIG. 20A shows the resource consumption on three smartphones. The memory consumption has an average~22 MB and max~50 MB, which appears when CNN feature extraction using tensorflow inference, is running.

The average amount of time for the CPU to complete all the machine learning inferences is low on all phones (5~7 ms). The max CPU time is around ~30 ms, which is still very low. Such low memory and CPU usage makes it possible to deploy the echo-signature system on most existing devices.

The Response Delay was also evaluated. The response delay is the time needed for the system to produce an authentication result after the raw input signal is ready (referring to FIG. 20A). Samsung S8 exhibits the least delay with an average of ~15 ms, and the other two devices (Samsung S7 Edge, and Huawei P9) exhibit a delay of 32-45 ms. The delay approaches maximum when the user keeps moving the phone in seeking to align the face in the valid area, which incurs a lot of camera preview refreshing and rendering. The delay is generally also affected by other computation heavy background applications. For real-time continuous authentication, the delay between consecutive sound signal emitting is 50 ms. Preferably, in echo-signature system, authentication is performed every other instance of sound signal emitting, leaving sufficient time for processing.

Power Consumption was also evaluated. Tested were three modes and pure vision based authentication using 2D coordinates of facial landmarks, each for 30 minutes to measure power consumption on Samsung S7 Edge, S8 and Huawei P9. The Qualcomm Trepn Profiler tool was used for such evaluation, which provides power consumption in mW for a chosen application. The background power consumption was subtracted while the screen was on, with the increased power consumption caused by different modes are shown in FIG. 20B.

FIG. 20B shows the power consumption of different modes, such as ULP (mW), LP (mW), Two-Factor (mW) and Vision (mW). The results indicate that presence detection consumes minimum power, while low power continuous authentication takes less than that of pure lightweight vision based authentication. Two-factor authentication exhibits the highest battery consumption; but is also designed for occasional one-pass authentication completing in just a few seconds, not an extended period continuous operation. The slight power increase of vision based mode over LP is due to the simple form of facial landmarks used, which are much lighter weight compared to more sophisticated ones such as those in OpenFace®.

Smartphone Authentication. Personal Identification Number (PIN) or a text/graphical password are the earliest and still most widely used smartphone user authentication methods. Despite the simplicity, the PIN or password can be easily peeked by someone close by the user device 7. Speech recognition is easy to spoof when the voice is recorded, or closely imitated by advanced learning algorithms. BreathPrint® senses the user's breath sound, which may change significantly when the user has intense exercises. Vision based face recognition is vulnerable to camouflaged images. Although eye blinks can enhance its security, a recorded video can still spoof the system. Fingerprint sensors have achieved great security and convenience. However, the sensor takes a lot of precious space, and forging one from fingerprints left by the user is proven practical. More advanced fingerprint sensors use ultrasonics to penetrate the skin and construct 3D imaging, but such sensors are unavailable on most smartphones. Apple's FaceID® uses special TrueDepth® sensors, bringing extra hardware costs and requiring significant design changes. Intel's RealSense® is a similar technology, but it is costly and power-computation heavy, unsuitable for mobile devices. Unlike all the above solutions, the echo-signature acoustic based system is the first to leverage active acoustic sensing combined with visual features for user authentication. It achieves high balanced accuracy (~95%) using existing hardware.

Acoustic-based Face Recognition. Acoustics has been used for face recognition in some prior work. I. E. Dror et al. recognize a limited number of five human faces with an accuracy over 96% and the gender of 16 faces with an accuracy of 88% using bat-like sonar input from special ultrasonic sensors. K. Kalgaonkar et al. propose a sensing mechanism based on the Doppler effect to capture the patterns of motion of talking faces using ultrasound. K. K. Yoong et al. classify up to 10 still faces with an accuracy of 99.73% using hand-crafted features from ultrasound echo signals. Compared to all the above work using special ultrasonic sensors, which are not available in consumer electronics, echo-signature based authentication system uses commodity smartphone speakers and microphones not intended for ultrasonic frequencies. This places many challenges on the signal design and processing, and much more experiments and tests to find out the best acoustic signal design providing required sensing resolution within hardware limitations, while minimizing the audibility to users. Besides, such prior work uses pure ultrasonic sensing without the aid from vision, thus creating major limitations (e.g., requiring the user to move the head at a fixed location and angle). On the other hand, echo-signature system leverages the vision to align faces using face-tracking algorithms for practical two-factor vision-acoustic authentication. Echo-signature is the first mobile device based approach. New users can register using a pre-trained CNN model to extract features and train a standalone SVM model on-device. While prior work uses handcrafted features or needs re-training of the entire neural network, inefficient and infeasible on mobile devices.

Acoustic sensing is widely used for distance measurement, thus applications in localization, tracking, stress and encounter detection. Beep-Beep and SwordFight measure the distance between two smartphones directly; Liu et al. leverage cross-correlation to compute the arrival time difference for keystroke snooping; Yang et al. detect driver phone usage in a vehicle; Echo-signature tag recognizes different locations and BatMapper builds indoor floor plans using echo signals. Besides, acoustic ranging can significantly improve smartphone localization accuracy, e.g., adding constraints among peer phones, deploying an anchor network that transmits spatial beacon signals, or enabling high-precision infrastructure-free mobile device tracking. UbiK, AAMouse, FingerIO, and LLAP leverage phase shift in received signals for near field finger gesture tracking, achieving ~1 cm or higher accuracy. StressSense detects personal stress using smartphones in unconstrained acoustic environments. ApenaApp monitors the minute chest and abdomen breathing movements using FMCW, and Sonar-Beat monitors breathing beat using signal phase shifts. CAT leverages FMCW with external speakers for smartphone movement tracking and achieves mm-level accuracy. DopEnc extracts acoustic features to identify encountered persons. Compared to them, echo-signature system leverages acoustic features from deep neural networks for a different purpose of user authentication.

Leveraging Sophisticated Vision Features. Echo-signature system is configurable to be integrated with the state-of-the-art image-based face recognition algorithms for more practical use, such as OpenFace®, a state-of-the-art open source face recognition system based on neural networks. A preliminary prototype leveraging OpenFace®, can be implemented in which a 128-dimensional feature vector is generated as the image representation.

This prototype was evaluated with five (5) volunteers and attack the system with user images printed on paper or images/videos displayed on desktop monitor. Despite the 100% accuracy in recognizing each face, OpenFace® has almost no capability of identifying images against real human faces. In contrast, the two-factor authentication approach used in echo-signature blocks all images attacks due to the significant differences in acoustic features, while retaining high recognition accuracy.

FaceID® is a mature commercial product that works generally well with the drawbacks described hereinabove. However, echo-signature based system is an alternative low-cost acoustic-based approach that exhibits promising similar performance with much lower costs, and some advantages over FaceID®. For example, FaceID® may fail in direct sunlight while the echo-signature based system uses acoustics and is not affected by strong sunlight. There is great space for further increase of robustness and for further improvements in that can be made by obtaining data from large populations to train a more robust model, incorporating acoustic data from many different angles, all of which will further improve and expand its intended commercial performance.

The echo-signature acoustics based system, which leverages acoustics and vision on commodity smartphones for two-factor authentication combats the requirement for manual phone pose changes. It is able to extract reliable acoustic features that best distinguishes different users, with a convolutional neural network being trained on a large acoustic data set. The CNN is then used as general acoustic feature extractor to feed an SVM based classifier for authentication. Experiments show that the echo-signature system achieves 93.75% balanced accuracy and 93.50% F-score, while the average precision is 98.05%.

Figure 21:
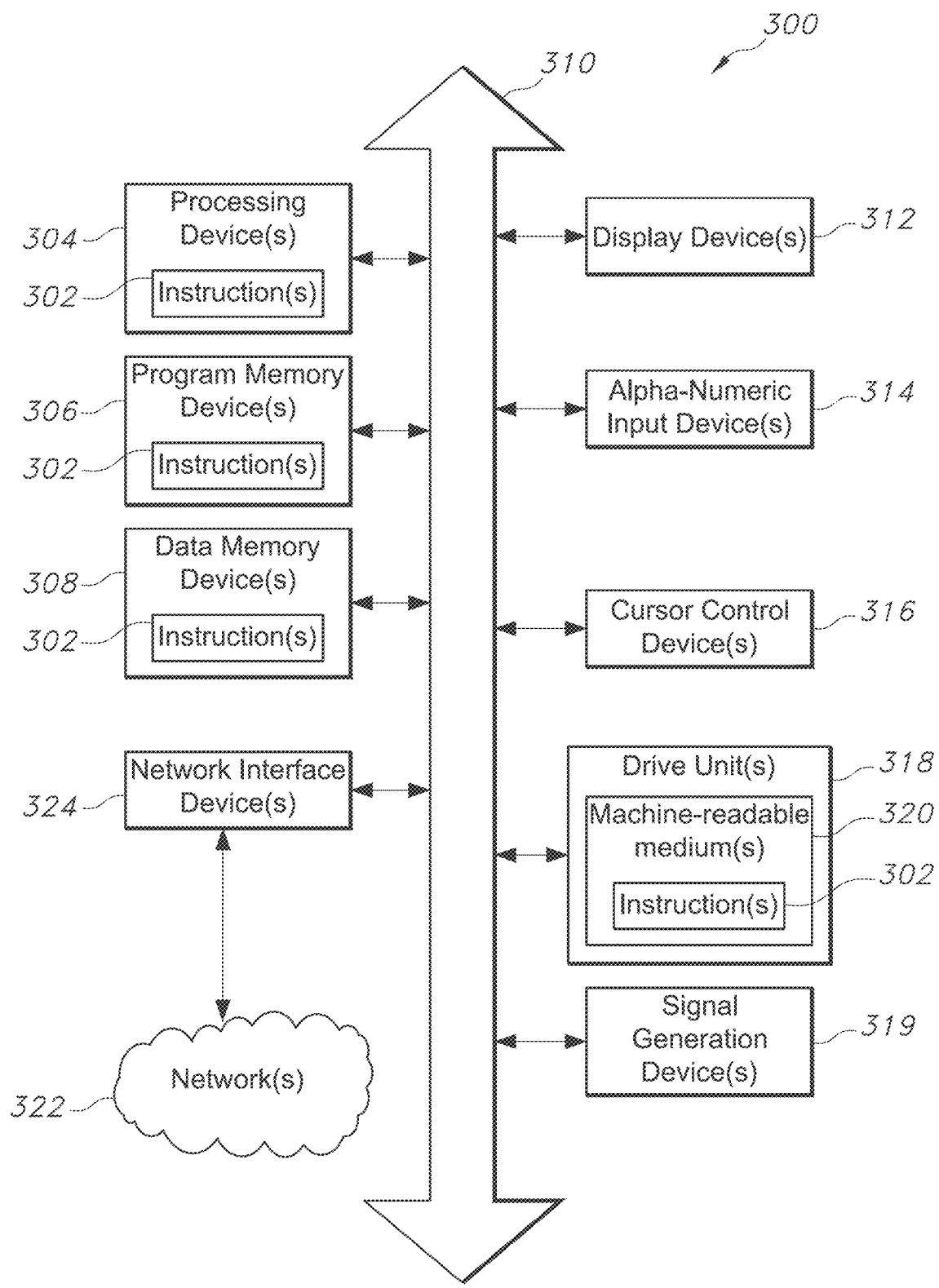
FIG. 21 is a block diagram showing a portion of an exemplary machine in the form of a computing system that performs methods according to one or more embodiments.

FIG. 21 is a block diagram of an illustrative embodiment of a general computing system 300. The computing system 300 can include a set of instructions that can be executed to cause the computing system 300 to perform any one or more of the methods or computer based functions disclosed herein. The computing system 300, or any portion thereof, may operate as a standalone device or may be connected, e.g., using a network 322 or other connection, to other computing systems or peripheral devices.

The computing system 300 may also be implemented as or incorporated into various devices, such as a personal computer (PC), a tablet PC, a personal digital assistant (PDA), a mobile device, a palmtop computer, a laptop computer, a desktop computer, a communications device, a control system, a web appliance, or any other machine capable of executing a set of instructions (sequentially or otherwise) that specify actions to be taken by that machine. Further, while a single computing system 300 is illustrated, the term "system" shall also be taken to include any collection of systems or sub-systems that individually or jointly execute a set, or multiple sets, of instructions to perform one or more computer functions.

As illustrated in FIG. 21, the computing system 300 may include a processor 304, e.g., a central processing unit (CPU), a graphics-processing unit (GPU), or both. Moreover, the computing system 300 may include a main memory and/or program memory 306 and a static memory and/or data memory 308 that can communicate with each other via a bus 310. As shown, the computing system 300 may further include a video display unit 312, such as a liquid crystal display (LCD), an organic light emitting diode (OLED), a flat panel display, a solid state display, or a cathode ray tube (CRT). Additionally, the computing system 300 may include an input device 314, such as a keyboard, and a cursor control device 316, such as a mouse. The computing system 300 can also include a disk drive unit 318, a signal generation device 319, such as a speaker or remote control, and a network interface device 324.

In a particular embodiment or aspect, as depicted in FIG. 21, the disk drive unit 318 may include a machine-readable or computer-readable medium 320 in which one or more sets of instructions 302, e.g., software, can be embedded, encoded or stored. Further, the instructions 302 may embody one or more of the methods or logic as described herein. In a particular embodiment or aspect, the instructions 302 may reside completely, or at least partially, within the main memory 306, the static memory 308, and/or within the processor 304 during execution by the computing system 300. The main memory 306 and the processor 304 also may include computer-readable media.

The above-described methods for the disclosed quality assessment of segmentation system and method may be implemented on a computer, using well-known computer processors, memory units, storage devices, computer software, and other components.

Figure 22:
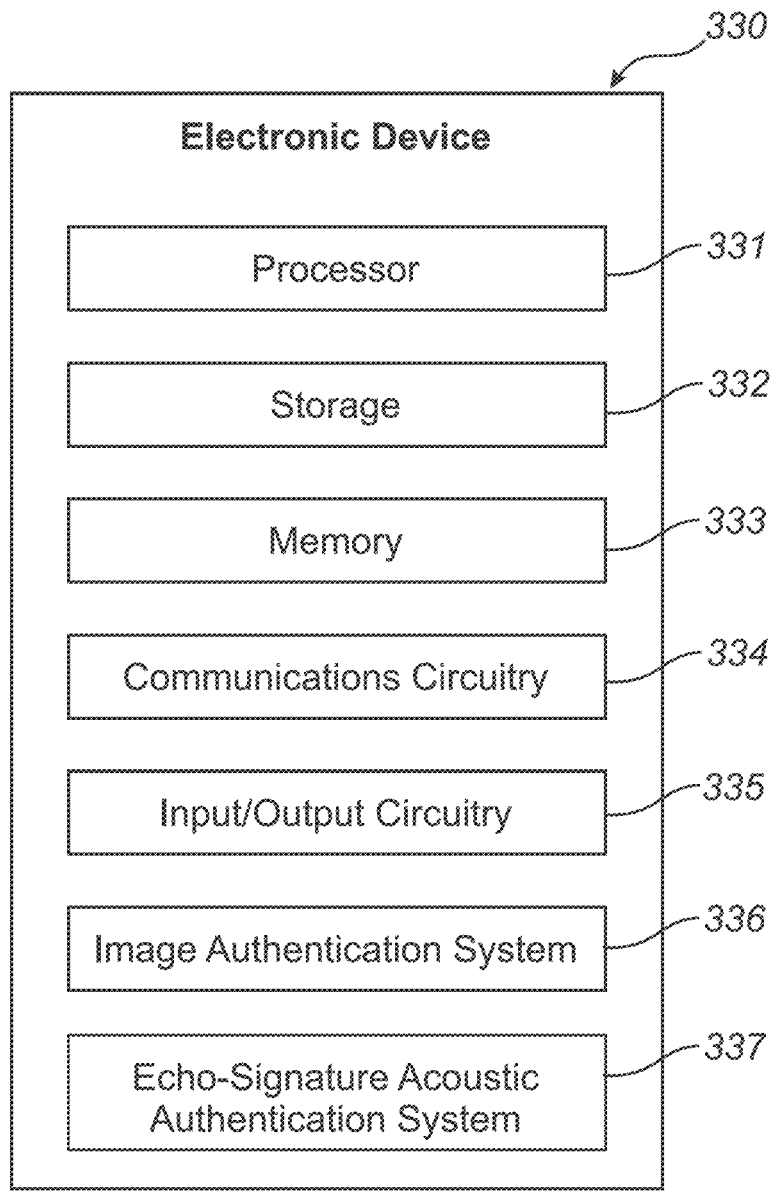
FIG. 22 illustrates a system block diagram including constituent components of an example electronics device associated with an authentication system, in accordance with an embodiment of the acoustic-based echo-signature system.

FIG. 22 is a schematic view of an illustrative electronic device for use with an authentication system in accordance with one embodiment of the invention. Electronic device 330 may include processor 331, storage 332, memory 333, communications circuitry 334, input/output circuitry 335, image authentication system 336, echo-signature acoustic authentication system 337 and power supply. In some embodiments, one or more of electronic device components 330 may be combined or omitted (e.g., combine storage 332 and memory 333). In some embodiments, electronic device 330 may include other components not combined or included in those shown in FIG. 22 (e.g., a display, bus, or input mechanism), or several instances of the components shown in FIG. 22. For the sake of simplicity, only one of each of the components is shown in FIG. 22.

Processor 331 may include any processing circuitry operative to control the operations and performance of electronic device 330. For example, processor 331 may be used to run operating system applications, firmware applications, media playback applications, media editing applications, or any other application. In some embodiments, a processor may drive a display and process inputs received from a user interface.

Storage 332 may include, for example, one or more storage mediums including a hard-drive, solid state drive, flash memory, permanent memory such as ROM, any other suitable type of storage component, or any combination thereof. Storage 332 may store, for example, media data (e.g., music and video files), application data (e.g., for implementing functions on device 100), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that may enable electronic device 330 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 333 can include cache memory, semi-permanent memory such as RAM, and/or one or more different types of memory used for temporarily storing data. In some embodiments, memory 333 can also be used for storing data used to operate electronic device applications, or any other type of data that may be stored in storage 332. In some embodiments, memory 333 and storage 332 may be combined as a single storage medium.

Communications circuitry 334 can permit device 330 to communicate with one or more servers or other devices using any suitable communications protocol. Electronic device 330 may include one more instances of communications circuitry 334 for simultaneously performing several communications operations using different communications networks, although only one is shown in FIG. 22 to avoid overcomplicating the drawing. For example, communications circuitry 334 may support Wi-Fi (e.g., an 802.11 protocol), Ethernet, Bluetooth™ (which is a trademark owned by Bluetooth Sig, Inc.), radio frequency systems, cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof.

Input/output circuitry 335 may be operative to convert (and encode/decode, if necessary) analog signals and other signals into digital data. In some embodiments, input/output circuitry can also convert digital data into any other type of signal, and vice-versa. For example, input/output circuitry 335 may receive and convert physical contact inputs (e.g., from a multi-touch screen), physical movements (e.g., from a mouse or sensor), analog audio signals (e.g., from a microphone), or any other input. The digital data can be provided to and received from processor 331, storage 332, memory 333, or any other component of electronic device 330. Although input/output circuitry 335 is illustrated in FIG. 22 as a single component of electronic device 330, several instances of input/output circuitry can be included in electronic device 330.

Electronic device 330 may include any suitable mechanism or component for allowing a user to provide inputs to input/output circuitry 335. For example, electronic device 330 may include any suitable input mechanism, such as for example, a button, keypad, dial, a click wheel, or a touch screen. In some embodiments, electronic device 330 may include a capacitive sensing mechanism, or a multi-touch capacitive sensing mechanism.

In some embodiments, electronic device 330 can include specialized output circuitry associated with output devices such as, for example, one or more audio outputs. The audio output may include one or more speakers (e.g., mono or stereo speakers) built into electronic device 330, or an audio component that is remotely coupled to electronic device 330 (e.g., a headset, headphones or earbuds that may be coupled to communications device with a wire or wirelessly).

In some embodiments, I/O circuitry 335 may include display circuitry (e.g., a screen or projection system) for providing a display visible to the user. For example, the display circuitry may include a screen (e.g., an LCD screen) that is incorporated in electronics device 330. As another example, the display circuitry may include a movable display or a projecting system for providing a display of content on a surface remote from electronic device 330 (e.g., a video projector). In some embodiments, the display circuitry can include a coder/decoder (Codec) to convert digital media data into analog signals. For example, the display circuitry (or other appropriate circuitry within electronic device 330) may include video Codecs, audio Codecs, or any other suitable type of Codec.

The display circuitry also can include display driver circuitry, circuitry for driving display drivers, or both. The display circuitry may be operative to display content (e.g., media playback information, application screens for applications implemented on the electronic device, information regarding ongoing communications operations, information regarding incoming communications requests, or device operation screens) under the direction of processor 331.

Image authentication system 336 and/or echo-signature acoustic authentication system or engine 337 (which may be integrated as one discrete component, or alternatively as shown, as discrete segregated components of the electric device 330) may include any suitable system or sensor operative to receive or detect an input identifying the user of device 330. For example, image authentication system 336 may include a skin-pattern sensing mechanism, an optical system for identifying users based on their facial patterns, eye features (e.g., retinas), or vein patterns, or any other sensor for detecting any other unique biometric feature or attribute of a user. As another example, authentication system 336 may be operative to receive secret or confidential entries identifying the user (e.g., gestures on the device, or touching a particular pattern of objects or colors on a display). As still another example, authentication system 336 may be operative to detect particular movements or vibrations of the device caused by the user. Authentication system 336 may be combined or embedded in any other element of electronic device 330 (e.g., a display or a camera), or use events detected by various sensors of the electronic device (e.g., an accelerometer or proximity sensor). In some embodiments, several types of authentication systems may be combined or implemented in the electronic device.

Echo-signature acoustic authentication system 337 may be configured to detect and receive acoustic echo signals as emitted or reflected from the user 3 unique facial contours or other contours of for example, hand, in response to emission of audible or nearly inaudible acoustic signals as generated from input/output circuitry 335 such as an earpiece speaker of the electronic device 330. Such acoustic echo signals are operative in identifying the user (for example, based on a determined face regions echo 108 segment) as processed by the authentication system 337. In some embodiments, one or more types of authentication systems may be combined or implemented with the echo-signature acoustic authentication system 337 in the electronic device 330.

In some embodiments, electronic device 330 may include a bus operative to provide a data transfer path for transferring data to, from, or between control processor 331, storage 332, memory 333, communications circuitry 334, input/output circuitry 335 authentication system 336, echo-signature acoustic authentication system 337, and any other component included in the electronic device 330.

In order to prevent unauthorized access to data or information stored in memory or storage, the electronic device may direct an authentication system to identify the user and authorize access to requested resources. The electronic device may require authorization prior to providing access to any electronic device resource. In some embodiments, the electronic device may require different levels of authorization before providing access to different applications or different data or files associated with different applications. For example, the electronic device may require a user to satisfy several authentication systems prior to providing access to an application or data (e.g., a secondary authentication, for example using biometrics, in addition to a first or initial authentication, for example a pass code used to unlock the device, acoustic echo-signature be matched, image based authentication, and other contemplated iterations of authentication).

Figure 23:
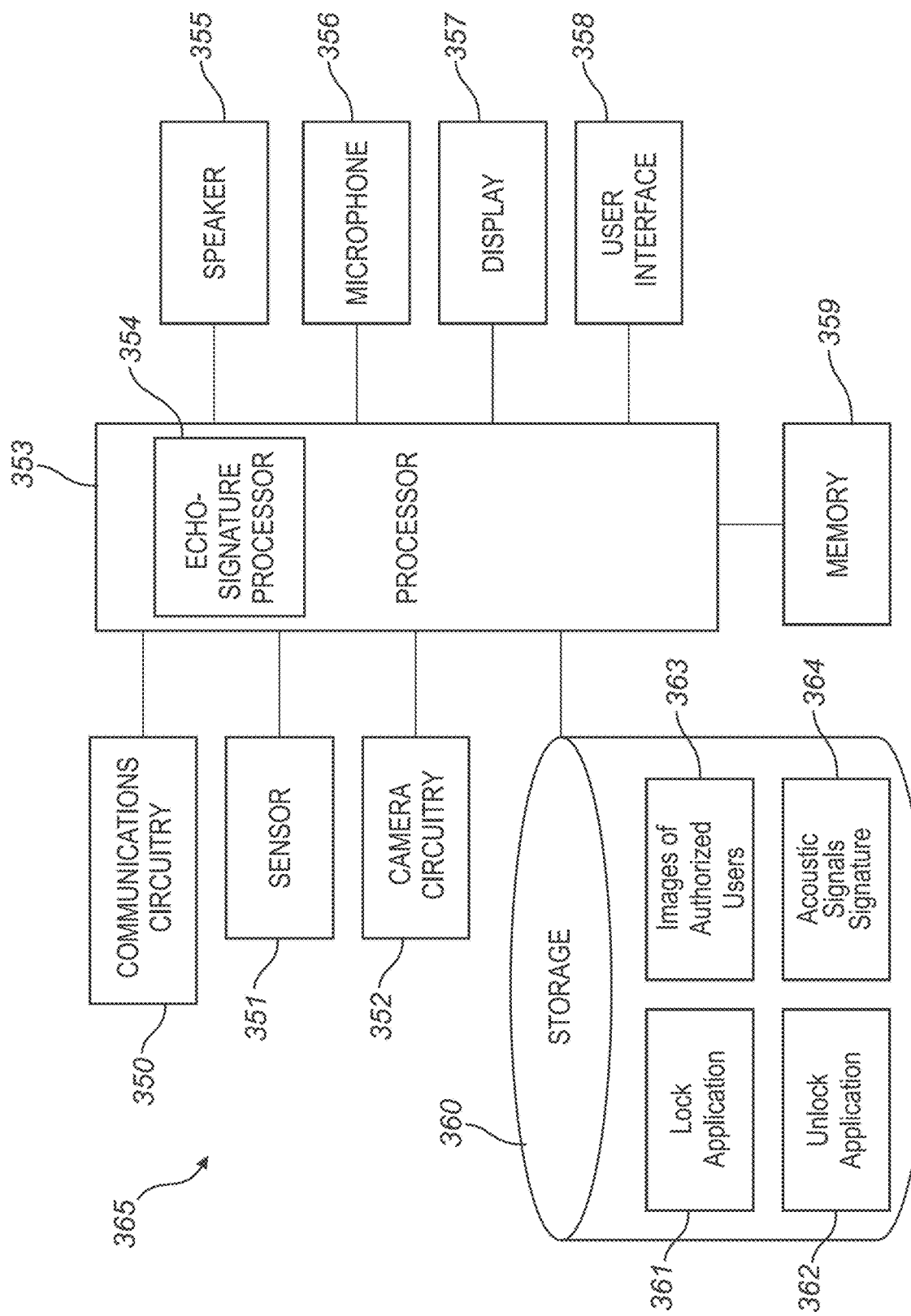
FIG. 23 illustrates a system block diagram including constituent components of an example mobile device, in accordance with an embodiment of the acoustic-based echo-signature system, including an example computing system.

FIG. 23 illustrates a system block diagram including constituent components of an example mobile device, in accordance with an embodiment of the acoustic-based echo-signature system, including an example computing system.

The device 365 in FIG. 23 includes a main processor 353 that interacts with a motion sensor 351, camera circuitry 352, storage 360, memory 359, display 357, and user interface 358. The device 365 may also interact with communications circuitry 350, a speaker 355, and a microphone 356. The various components of the device 365 may be digitally interconnected and used or managed by a software stack being executed by the main processor 353. Many of the components shown or described here may be implemented as one or more dedicated hardware units and/or a programmed processor (software being executed by a processor, e.g., the main processor 353).

The main processor 353 controls the overall operation of the device 365 by performing some or all of the operations of one or more applications implemented on the device 365, by executing instructions for it (software code and data) that may be found in the storage 360. The processor may, for example, drive the display 357 and receive user inputs through the user interface 358 (which may be integrated with the display 357 as part of a single, touch sensitive display panel, e.g., display panel 105 of FIG. 3, on the front face of the mobile device 365). The main processor 353 may also control the locking and unlocking functions of the device 365.

Storage 360 provides a relatively large amount of "permanent" data storage, using nonvolatile solid state memory (e.g., flash storage) and/or a kinetic nonvolatile storage device (e.g., rotating magnetic disk drive). Storage 360 may include both local storage and storage space on a remote server. Storage 360 may store data, such as image data of authorized users 363 and data of movement patterns and/or acoustics signal data associated with an echo-signature of the user 364, and software components that control and manage, at a higher level, the different functions of the device 365. For instance, there may be a locking application 361 and an unlocking application 362 that configure the camera circuitry 352 to capture images for detection of a user's face.

In addition to storage 360, there may be memory 359, also referred to as main memory or program memory, which provides relatively fast access to stored code and data that is being executed by the main processor 353 and/or echo-signature processor or echo-signature engine 354. Memory 359 may include solid state random access memory (RAM), e.g., static RAM or dynamic RAM. There may be one or more processors, e.g., main processor 353 and/or echo-signature processor 354, that run or execute various software programs, modules, or sets of instructions (e.g., applications) that, while stored permanently in the storage 360, have been transferred to the memory 359 for execution, to perform the various functions described above. It should be noted that these modules or instructions need not be implemented as separate programs, but rather may be combined or otherwise rearranged in various combinations. In addition, the enablement of certain functions could be distributed amongst two or more modules, and perhaps in combination with certain hardware.

The device 365 may include communications circuitry 350. Communications circuitry 350 may include components used for wired or wireless communications, such as two-way conversations and data transfers. For example, communications circuitry 350 may include RF communications circuitry that is coupled to an antenna, so that the user of the device 365 can place or receive a call through a wireless communications network. The RF communications circuitry may include a RF transceiver and a cellular baseband processor to enable the call through a cellular network. In another embodiment, communications circuitry 350 may include Wi-Fi communications circuitry so that the user of the device 365 may place or initiate a call using voice over Internet Protocol (VOIP) connection, through a wireless local area network.

The device 365 may include a motion sensor 351, also referred to as an inertial sensor, that may be used to detect movement of the device 365. The motion sensor 351 may include a position, orientation, or movement (POM) sensor, such as an accelerometer, a gyroscope, a light sensor, an infrared (IR) sensor, a proximity sensor, a capacitive proximity sensor, an acoustic sensor, a sonic or sonar sensor, a radar sensor, an image sensor, a video sensor, a global positioning (GPS) detector, an RP detector, an RF or acoustic doppler detector, a compass, a magnetometer, or other like sensor. For example, the motion sensor 351 may be a light sensor that detects movement or absence of movement of the device 365, by detecting the intensity of ambient light or a sudden change in the intensity of ambient light. The motion sensor 351 generates a signal based on at least one of a position, orientation, and movement of the device 365. The signal may include the character of the motion, such as acceleration, velocity, direction, directional change, duration, amplitude, frequency, or any other characterization of movement. The processor 353 receives the sensor signal and controls one or more operations, e.g., the unlocking function described below, of the device 365 based in part on the sensor signal.

In one embodiment, the device 365 may include movement patterns and/or acoustic signals associated with a user echo-signature pattern 364 that are stored in storage 360. A movement pattern may be associated with a function, e.g., the unlocking function, of the device 365. For example, the processor 353 may compare the sensor signal with the stored movement patterns 364 to determine whether the user moved the device 365 to a use position, i.e., a position that indicates that the user is likely to want to use the device. The comparing function may include employing a pattern recognition algorithm or technique or a statistical model. In another embodiment, the processor 353 may use the sensor signal to infer or calculate tilt or inclination of the device 365 relative to a static, linear acceleration (i.e., gravity) by correlating tilt angles with detected linear acceleration. In this way, the processor 353 may calculate or infer when the device 365 is subjected to dynamic accelerations by, for example, the hand of the user. In yet another embodiment, the motion sensor 351 may include other signal processing circuits such as a low pass filter, a threshold detector, an amplitude detector, or a frequency detector to remove signals representing unintended movement of the device 365. For example, a low pass filter may be used to remove or block noise or spurious signals representing brief, unintended movement of the device or other movement of the device that may occur during, for example, walking, jogging, or bouncing in a moving vehicle.

In another embodiment, the motion sensor 351 may be used in combination with a grip detector or a proximity sensor (not shown) in the unlocking function of the device 365. The grip detector may be used to recognize when the user is holding the device 365, touching the display screen 105, or pressing a button. The grip detector may include one or more switches and/or buttons to detect the presence of at least one finger. The proximity sensor may sense when the device 365 is in the user's hand so that the device 365 can ignore changes in position, orientation, or movement that are not based on the user's hand movements and/or positioning. By requiring the user to explicitly interact with a portion of the device 365 while moving the device 365, the possibility of inadvertently initiating the unlocking function is minimized or eliminated.

The device 365 also includes camera circuitry 352 that implements the digital camera functionality of the device 365. One or more solid-state image sensors are built into the device 365, and each may be located at a focal plane of an optical system that includes a respective lens. An optical image of a scene within the camera's field of view is formed on the image sensor, and the sensor responds by capturing the scene in the form of a digital image or picture consisting of pixels that may then be stored in storage 360. The camera circuitry 352 may be used to capture the images that are analyzed by the processor 353 and/or echo-signature processor 354 in the locking or unlocking functionality of the device 365. For example, the camera circuitry 352 may capture an image of a facial profile of an authorized user of the device 365, and this image may be stored with the images of authorized users 363 in the storage 360. When the camera circuitry 352 subsequently captures an image of a user who wants to unlock the device 365, the processor 353 and/or echo-signature processor 354 may compare the facial profile (or stored acoustics and vision features representation that trains the SVM model 364) in the subsequently captured image with the facial profiles in each image of the images of authorized users 363 (or stored acoustics and vision features representation that trains the SVM model 364) to determine whether the user is an authorized user. This may be accomplished using suitable facial recognition software that matches faces that look like the same person. This also may be accomplished in addition to facial recognition or alternatively by implementing the acoustics-based echo-signature authentication as processed by echo-signature processor 354, which determines the echo-signature profile of a user during user registration and stores the echo-signature profile in the acoustic signal echo-signature profile 364 of the storage 360. The echo-signature profile and/or including acoustic signals signature 364 may also include visual features representation combined with acoustic features representation (i.e. joints features representation) with the respective trained SVM model that is implemented during SVM prediction 131 process.

FIG. 24 illustrates a system block diagram including constituent components of an example mobile device, in accordance with an embodiment of the acoustic-based echo-signature system, including an example computing system.

More particularly, shown in FIG. 24 is a personal computing device 370 according to an illustrative embodiment of the invention. The block diagram provides a generalized block diagram of a computer system such as may be employed, without limitation, by the personal computing device 370. The personal computing device 370 may include a processor 375 and/or echo-signature processor 381 integrated with processor 375 and/or as a segregated discrete component or module 381, storage device 380, user interface 372, display 376, CODEC 374, bus 383, memory 379, communications circuitry 378, a speaker or transducer 371, a microphone 373, and an image sensor 377. Processor 375 and/or echo-signature processor 381 may control the operation of many functions and other circuitry included in personal computing device 370. Processor 375, 381 may drive display 376 and may receive user inputs from the user interface 372.

Storage device 380 may store media (e.g., music and video files), software (e.g., for implanting functions on device 370), preference information (e.g., media playback preferences), lifestyle information (e.g., food preferences), personal information (e.g., information obtained by exercise monitoring equipment), transaction information (e.g., information such as credit card information), word processing information, personal productivity information, wireless connection information (e.g., information that may enable a media device to establish wireless communication with another device), subscription information (e.g., information that keeps track of podcasts or television shows or other media a user subscribes to), and any other suitable data. Storage device 380 may include one more storage mediums, including, for example, a hard-drive, permanent memory such as ROM, semi-permanent memory such as RAM, or cache.

Memory 379 may include one or more different types of memory, which may be used for performing device functions. For example, memory 379 may include cache, ROM, and/or RAM. Bus 383 may provide a data transfer path for transferring data to, from, or between at least storage device 380, memory 379, and processor 375, 381. Coder/decoder (CODEC) 374 may be included to convert digital audio signals into analog signals for driving the speaker 371 to produce sound including voice, music, and other like audio. The CODEC 374 may also convert audio inputs from the microphone 373 into digital audio signals. The CODEC 374 may include a video CODEC for processing digital and/or analog video signals.

User interface 372 may allow a user to interact with the personal computing device 370. For example, the user input device 372 can take a variety of forms, such as a button, keypad, dial, a click wheel, or a touch screen. Communications circuitry 378 may include circuitry for wireless communication (e.g., short-range and/or long-range communication). For example, the wireless communication circuitry may be wi-fi enabling circuitry that permits wireless communication according to one of the 802.11 standards. Other wireless network protocol standards could also be used, either in alternative to the identified protocols or in addition to the identified protocols. Other network standards may include Bluetooth, the Global System for Mobile Communications (GSM), and code division multiple access (CDMA) based wireless protocols. Communications circuitry 378 may also include circuitry that enables device 300 to be electrically coupled to another device (e.g., a computer or an accessory device) and communicate with that other device.

In one embodiment, the personal computing device 370 may be a portable computing device dedicated to processing media such as audio and video. For example, the personal computing device 370 may be a media device such as media player (e.g., MP3 player), a game player, a remote controller, a portable communication device, a remote ordering interface, an audio tour player, or other suitable personal device. The personal computing device 370 may be battery-operated and highly portable so as to allow a user to listen to music, play games or video, record video or take pictures, communicate with others, and/or control other devices. In addition, the personal computing device 370 may be sized such that it fits relatively easily into a pocket or hand of the user. By being handheld, the personal computing device 370 (or electronic device 330 shown in FIG. 22) is relatively small and easily handled and utilized by its user and thus may be taken practically anywhere the user travels.

As discussed previously, the relatively small form factor of certain types of personal computing devices 370, e.g., personal media devices, enables a user to easily manipulate the device's position, orientation, and movement. Accordingly, the personal computing device 370 may provide for improved techniques of sensing such changes in position, orientation, and movement to enable a user to interface with or control the device 370 by affecting such changes. Further, the device 370 may include a vibration source, under the control of processor 375, 381, for example, to facilitate sending acoustic signals, motion, vibration, and/or movement information to a user related to an operation of the device 370 including for user authentication. The personal computing device 370 may also include an image sensor 377 that enables the device 370 to capture an image or series of images (e.g., video) continuously, periodically, at select times, and/or under select conditions.

Face detection and recognition are different processes. Face detection includes the process of detection and/or locating a face or faces within an image. Face recognition includes the process of recognizing that a detected face is associated with a particular person or user. Face recognition, however, is typically performed along with and/or after face detection.

Face detection and recognition are known in technology fields such as robotics and computer vision. However, there are numerous advantageous applications of this technology that enable more efficient control and interaction between a user and a personal computing system. In certain embodiments, a personal computing device such as devices 330 and 370, include an image sensor, e.g., a camera, that is orientated such that it is capable of sensing the presence of a user's face while the user is interfacing, either passively or actively, with the personal computing device. For example, the image sensor may be embedded within a display 105 of the device 7. Alternatively, the image sensor may be connected with and/or mounted on a display 105 of device 7. Thus, the image sensor, in certain embodiments, operating with the personal computing device's processor, acts as a user presence sensor and/or user authenticator depending on the requirements of an application running on the personal computing device.

In particular, for acoustic echo-signature based user authentication, the device 370, facilitates the emitting of nearly inaudible sound signals from the earpiece speaker 371 to illuminate the user's face so that acoustic echo signals can be reflected from unique facial contours 10 of the user's face 9, hence used in the creation of a unique echo-signature profile that is based on the acoustic echo signals of the user during user registration. The echo-signature profile may be stored in storage 380 and retrieved during user authentication when a user seeks to unlock a device 370.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

In an alternative embodiment or aspect, dedicated hardware implementations, such as application specific integrated circuits, programmable logic arrays and other hardware devices, can be constructed to implement one or more of the methods described herein. Applications that may include the apparatus and systems of various embodiments or aspects can broadly include a variety of electronic and computing systems. One or more embodiments or aspects described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments or aspects, the methods described herein may be implemented by software programs tangibly embodied in a processor-readable medium and may be executed by a processor. Further, in an exemplary, non-limited embodiment or aspect, implementations can include distributed processing, component/object distributed processing, and parallel processing. Alternatively, virtual computing system processing can be constructed to implement one or more of the methods or functionality as described herein.

It is also contemplated that a computer-readable medium includes instructions 302 or receives and executes instructions 302 responsive to a propagated signal, so that a device connected to a network 322 can communicate voice, video or data over the network 322. Further, the instructions 302 may be transmitted or received over the network 322 via the network interface device 324.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing or encoding a set of instructions for execution by a processor or that cause a computing system to perform any one or more of the methods or operations disclosed herein.

In a particular non-limiting, example embodiment or aspect, the computer-readable medium can include a solid-state memory, such as a memory card or other package, which houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture and store carrier wave signals, such as a signal communicated over a transmission medium. A digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments or aspects, the methods described herein may be implemented as one or more software programs running on a computer processor. Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein, and other equivalents and successor media, in which the software implementations herein may be stored, are included herein.

Thus, a system and method associated with method associated with generating an acoustics-based echo-signature profile associated with an original user of a device that is implemented during prediction for authentication of the current user of a device. Even more particularly, the present invention relates to a novel system and method that trains and augments a classification model in order to predict the respective authentication of a joint features representation including acoustic features and visual landmark features of the user during authentication of a user of the device. Even more particularly, a system and method for implementing a novel system and method that trains an SVM classification model that is associated with generating a unique echo-signature profile associated with an original owner/user of the device and later implemented during SVM prediction process to determine whether the user profile based on extracted acoustics and vision features representation, matches the echo-signature profile associated with the actual owner of the device during user authentication, has been described.

Although specific example embodiments or aspects have been described, it will be evident that various modifications and changes may be made to these embodiments or aspects without departing from the broader scope of the invention. Accordingly, the specification and drawings are to be regarded in an illustrative rather than a restrictive sense. The accompanying drawings that form a part hereof, show by way of illustration, and not of limitation, specific embodiments or aspects in which the subject matter may be practiced. The embodiments or aspects illustrated are described in sufficient detail to enable those skilled in the art to practice the teachings disclosed herein. Other embodiments or aspects may be utilized and derived therefrom, such that structural and logical substitutions and changes may be made without departing from the scope of this disclosure. This Detailed Description, therefore, is not to be taken in a limiting sense, and the scope of various embodiments or aspects is defined only by the appended claims, along with the full range of equivalents to which such claims are entitled.

Such embodiments or aspects of the inventive subject matter may be referred to herein, individually and/or collectively, by the term "invention" or "embodiment" merely for convenience and without intending to voluntarily limit the scope of this application to any single invention or inventive concept if more than one is in fact disclosed. Thus, although specific embodiments or aspects have been illustrated and described herein, it should be appreciated that any arrangement calculated to achieve the same purpose may be substituted for the specific embodiments or aspects shown. This disclosure is intended to cover any and all adaptations or variations of various embodiments or aspects. Combinations of the above embodiments or aspects, and other embodiments or aspects not specifically described herein, will be apparent to those of skill in the art upon reviewing the above description.

In the foregoing description of the embodiments or aspects, various features are grouped together in a single embodiment for the purpose of streamlining the disclosure. This method of disclosure is not to be interpreted as reflecting that the claimed embodiments or aspects have more features than are expressly recited in each claim. Rather, as the following claims reflect, inventive subject matter lies in less than all features of a single disclosed embodiment or aspect. Thus the following claims are hereby incorporated into the Detailed Description, with each claim standing on its own as a separate example embodiment or aspect. It is contemplated that various embodiments or aspects described herein can be combined or grouped in different combinations that are not expressly noted in the Detailed Description. Moreover, it is further contemplated that claims covering such different combinations can similarly stand on their own as separate example embodiments or aspects, which can be incorporated into the Detailed Description.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Those skilled in the relevant art will appreciate that aspects of the invention can be practiced with other computer system configurations, including Internet appliances, hand-held devices, cellular or mobile phones, multi-processor systems, microprocessor-based or programmable consumer electronics, network PCs, client-server environments including thin clients, mini-computers, mainframe computers and the like. Aspects of the invention can be embodied in a special purpose computer or data processor that is specifically programmed, configured or constructed to perform one or more of the computer-executable instructions or modules explained in detail below. Indeed, the term "computer" as used herein refers to any data processing platform or device.

Aspects of the invention can also be practiced in distributed computing environments, where tasks or modules are performed by remote processing devices, which are linked through a communications network. In a distributed computing environment, program modules or sub-routines may be located in both local and remote memory storage devices, such as with respect to a wearable and/or mobile computer and/or a fixed-location computer. Aspects of the invention described below may be stored and distributed on computer-readable media, including magnetic and optically readable and removable computer disks, as well as distributed electronically over the Internet or over other networks (including wireless networks). Those skilled in the relevant art will recognize that portions of the invention may reside on a server computer or server platform, while corresponding portions reside on a client computer. For example, such a client server architecture may be employed within a single mobile computing device, among several computers of several users, and between a mobile computer and a fixed-location computer. Data structures and transmission of data particular to aspects of the invention are also encompassed within the scope of the invention.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. A system associated with predicting authentication of a device user based on a joint features representation relative to an echo-signature associated with the device, the system comprising:

an echo-signature engine including a processor that performs the following operations:
emitting acoustic signals in response to a request for processing of a profile associated with the device;
receiving a set of echo acoustic signals that are tailored based on reflection of the acoustic signals from unique contours of one or more depth portions associated with the user relative to a discrete epoch;
extracting one or more region segments associated with the echo acoustic signals in order to train a classification model;
generating the classification model based on the one or more region segments as extracted;
extracting a joint features representation based on the classification model, the joint features representation comprising acoustic features and visual landmark features of the user obtained simultaneously during the discrete epoch;
generating a vector-based classification model used in the prediction of the joint features representation; and
determining whether the joint features representation is associated with the echo-signature based on the prediction of the joint features representation.

2. The system as recited in claim 1, wherein the joint features representation associated with the user profile includes extracted landmark coordinates associated with the unique contours of one or more depth portions relative to the discrete epoch.

3. The system as recited in claim 2, wherein generating the joint features representation associated with the user profile further comprises augmenting the joint features representation with synthesized acoustics features and augmented landmark coordinates associated with the unique contours of one or more depth portions associated with the user relative to a varied discrete epoch.

4. The system as recited in claim 3, wherein one or more varied vector features associated with the synthesized acoustic features and/or augmented landmark coordinates are extracted for generating the joint features representation relative to the varied discrete epoch.

5. The system as recited in claim 1, wherein the joint features representation associated with the user profile includes extracted acoustic features associated with the unique contours of one or more depth portions relative to the discrete epoch.

6. The system as recited in claim 1, wherein the request for processing of the profile associated with a computing device comprises initial registration of an original user profile or authentication of a user profile relative to a current epoch for access to a computing device.

7. The system as recited in claim 6, wherein the request for processing of the profile associated with the computing device further comprises: authenticating a current user profile for access to the computing device by comparison of vector features associated with the joint feature representation of the original user profile with vector features associated with the joint feature representation of the current user profile relative to the current epoch.

8. The system as recited in claim 7, wherein the wherein the operations further comprise authenticating the current user profile based on whether the vector features associated with the joint feature representation of the current user profile is above a threshold with respect similarity to vector features associated with the joint feature representation of the original user profile.

9. The system as recited in claim 1, wherein the operation of extracting the one or more region segments associated with the echo acoustic signals further comprises identifying a direct path segment in the one or more region segments associated with received acoustic echo signals.

10. The system as recited in claim 1, wherein the operation of extracting the one or more region segments associated with the echo acoustic signals further comprises identifying a major echo segment in the one or more region segments associated with the received echo acoustic signals.

11. A method associated with predicting authentication of a device user based on a joint features representation relative to an echo-signature associated with the device, the method comprising:
an echo-signature engine including a processor that performs the following operations:
emitting acoustic signals in response to a request for processing of a profile associated with the device;
receiving a set of echo acoustic signals that are tailored based on reflection of the acoustic signals from unique contours of one or more depth portions associated with the user relative to a discrete epoch;
extracting one or more region segments associated with the echo acoustic signals in order to train a classification model;
generating the classification model based on the one or more region segments as extracted;
extracting a joint features representation based on the classification model, the joint features representation comprising acoustic features and visual landmark features of the user obtained simultaneously during the discrete epoch;
generating a vector-based classification model used in the prediction of the joint features representation; and
determining whether the joint features representation is associated with the echo-signature based on the prediction of the joint features representation.

12. The method as recited in claim 11, wherein the joint features representation associated with the user profile includes extracted landmark coordinates associated with the unique contours of one or more depth portions relative to the discrete epoch.

13. The method as recited in claim 12, wherein the operation of generating the joint features representation associated with the user profile further comprises: augmenting the joint features representation with synthesized acoustics features and augmented landmark coordinates associated with the unique contours of one or more depth portions associated with the user relative to a varied discrete epoch.

14. The method as recited in claim 13, wherein one or more varied vector features associated with the synthesized acoustic features and/or augmented landmark coordinates are extracted for generating the joint features representation relative to the varied discrete epoch.

15. The method as recited in claim 11, wherein the joint features representation associated with the user profile includes extracted acoustic features associated with the unique contours of one or more depth portions relative to the discrete epoch.

16. The method as recited in claim 11, wherein the request for processing of the profile associated with a computing device comprises initial registration of an original user profile or authentication of a user profile relative to a current epoch for access to the computing device.

17. The method as recited in claim 16, wherein the request for processing of the profile associated with the computing device further comprises: authenticating a current user profile for access to the computing device by comparison of vector features associated with the joint feature representation of the original user profile with vector features associated with the joint feature representation of the current user profile relative to the current epoch.

18. The method as recited in claim 17, wherein the operations further comprise authenticating the current user profile based on whether the vector features associated with the joint feature representation of the current user profile is above a threshold with respect similarity to vector features associated with the joint feature representation of the original user profile.

19. The method as recited in claim 11, wherein the operation of extracting the one or more region segments associated with the echo acoustic signals further comprises identifying a direct path segment in the one or more region segments associated with received acoustic echo signals.

20. The method as recited in claim 11, wherein the operation of extracting the one or more region segments associated with the echo acoustic signals further comprises identifying a major echo segment in the one or more region segments associated with the received echo acoustic signals.

21. A computer program product comprising a non-transient computer readable storage medium having computer readable program code embodied thereon, the computer readable program code, when executed by a processing device, performing operations comprising:

emitting acoustic signals in response to a request for processing of a profile associated with the device;

receiving a set of echo acoustic signals that are tailored based on reflection of the acoustic signals from unique contours of one or more depth portions associated with the user relative to a discrete epoch;

extracting one or more region segments associated with the echo acoustic signals in order to train a classification model;

generating the classification model based on the one or more region segments as extracted;

extracting a joint features representation based on the classification model, the joint features representation comprising acoustic features and visual landmark features of the user obtained simultaneously during the discrete epoch;

generating a vector-based classification model used in the prediction of the joint features representation; and determining whether the joint features representation is associated with the echo-signature based on the prediction of the joint features representation.

22. The computer program product as recited in claim 21, wherein the joint features representation associated with the user profile includes extracted landmark coordinates associated with the unique contours of one or more depth portions relative to the discrete epoch.

23. The computer program product as recited in claim 21, wherein the joint features representation associated with the user profile includes extracted acoustic features associated with the unique contours of one or more depth portions relative to the discrete epoch.

* * * * *